United States Patent
Huntington et al.

(10) Patent No.: US 10,161,312 B2
(45) Date of Patent: Dec. 25, 2018

(54) SYSTEM AND METHOD FOR DIFFUSION COMBUSTION WITH FUEL-DILUENT MIXING IN A STOICHIOMETRIC EXHAUST GAS RECIRCULATION GAS TURBINE SYSTEM

(71) Applicants: General Electric Company, Schenectady, NY (US); ExxonMobil Upstream Research Company, Houston, TX (US)

(72) Inventors: Richard A. Huntington, Houston, TX (US); Sulabh K. Dhanuka, Houston, TX (US); Ilya Aleksandrovich Slobodyanskiy, Greenville, SC (US)

(73) Assignees: General Electric Company, Schenectady, NY (US); ExxonMobil Upstream Research Company, Spring, TX (US)

( * ) Notice: Subject to any disclaimer, the term of this patent is extended or adjusted under 35 U.S.C. 154(b) by 663 days.

(21) Appl. No.: 14/067,537

(22) Filed: Oct. 30, 2013

(65) Prior Publication Data
US 2014/0123668 A1  May 8, 2014

Related U.S. Application Data

(60) Provisional application No. 61/722,118, filed on Nov. 2, 2012, provisional application No. 61/722,115, filed
(Continued)

(51) Int. Cl.
*F02C 7/22* (2006.01)
*F23D 14/58* (2006.01)
(Continued)

(52) U.S. Cl.
CPC ............... *F02C 7/22* (2013.01); *F02C 1/005* (2013.01); *F02C 1/08* (2013.01); *F02C 3/30* (2013.01);
(Continued)

(58) Field of Classification Search
CPC ...... F02C 3/20; F02C 3/30; F02C 3/34; F02C 7/22; F02C 1/005; F02C 1/08;
(Continued)

(56) References Cited

U.S. PATENT DOCUMENTS

| 2,488,911 A | 11/1949 | Hepburn et al. |
| 2,884,758 A | 5/1959 | Oberle |

(Continued)

FOREIGN PATENT DOCUMENTS

| CA | 2231749 | 9/1998 |
| CA | 2645450 | 9/2007 |

(Continued)

OTHER PUBLICATIONS

Ahmed, S. et al. (1998) "Catalytic Partial Oxidation Reforming of Hydrocarbon Fuels," *1998 Fuel Cell Seminar*, Nov. 16-19, 1998, 7 pgs.

(Continued)

*Primary Examiner* — Gerald L Sung
*Assistant Examiner* — Alain Chau
(74) *Attorney, Agent, or Firm* — Fletcher Yoder P.C.

(57) ABSTRACT

A system is provided with a turbine combustor having a first diffusion fuel nozzle, wherein the first diffusion fuel nozzle has first and second passages that separately inject respective first and second flows into a chamber of the turbine combustor to produce a diffusion flame. The first flow includes a first fuel and a first diluent, and the second flow includes a first oxidant. The system includes a turbine driven by combustion products from the diffusion flame in the
(Continued)

turbine combustor. The system also includes an exhaust gas compressor, wherein the exhaust gas compressor is configured to compress and route an exhaust gas from the turbine to the turbine combustor along an exhaust recirculation path.

21 Claims, 13 Drawing Sheets

Related U.S. Application Data on Nov. 2, 2012, provisional application No. 61/722,114, filed on Nov. 2, 2012, provisional application No. 61/722,111, filed on Nov. 2, 2012.

(51) Int. Cl.

| | |
|---|---|
| *F02C 1/08* | (2006.01) |
| *F02C 3/30* | (2006.01) |
| *F23D 14/20* | (2006.01) |
| *F23C 9/08* | (2006.01) |
| *F02C 3/34* | (2006.01) |
| *F23L 7/00* | (2006.01) |
| *F23R 3/34* | (2006.01) |
| *F02C 1/00* | (2006.01) |
| *F23D 14/22* | (2006.01) |
| *F23R 3/28* | (2006.01) |
| *F23K 5/00* | (2006.01) |
| *F23C 9/00* | (2006.01) |
| *F23R 3/40* | (2006.01) |

(52) U.S. Cl.
CPC .............. *F02C 3/34* (2013.01); *F23C 9/00* (2013.01); *F23C 9/08* (2013.01); *F23D 14/20* (2013.01); *F23D 14/22* (2013.01); *F23D 14/58* (2013.01); *F23K 5/007* (2013.01); *F23L 7/00* (2013.01); *F23L 7/005* (2013.01); *F23R 3/28* (2013.01); *F23R 3/40* (2013.01); *F05D 2260/61* (2013.01); *F05D 2270/08* (2013.01); *F23C 2202/20* (2013.01); *F23C 2202/30* (2013.01); *F23L 2900/07002* (2013.01); *F23R 3/343* (2013.01); *Y02E 20/16* (2013.01); *Y02T 50/677* (2013.01)

(58) Field of Classification Search
CPC .... F23C 2202/10; F23C 2202/20; F23C 9/00; F23C 9/08; F23C 2202/00; F23C 2202/30; F23R 3/28; F23R 3/286; F23R 3/40; F23N 2021/12; F23D 14/20; F23D 14/22; F23D 14/58
USPC ........................................................ 60/39.52
See application file for complete search history.

(56) References Cited

U.S. PATENT DOCUMENTS

| | | | |
|---|---|---|---|
| 3,631,672 A | 1/1972 | Gentile et al. | |
| 3,643,430 A | 2/1972 | Emory et al. | |
| 3,705,492 A | 12/1972 | Vickers | |
| 3,841,382 A | 10/1974 | Gravis, III et al. | |
| 3,949,548 A | 4/1976 | Lockwood, Jr. | |
| 4,018,046 A | 4/1977 | Hurley | |
| 4,043,395 A | 8/1977 | Every et al. | |
| 4,050,239 A | 9/1977 | Kappler et al. | |
| 4,066,214 A | 1/1978 | Johnson | |
| 4,077,206 A | 3/1978 | Ayyagari | |
| 4,085,578 A | 4/1978 | Kydd | |
| 4,092,095 A | 5/1978 | Straitz, III | |
| 4,101,294 A | 7/1978 | Kimura | |
| 4,112,676 A | 9/1978 | DeCorso | |
| 4,117,671 A | 10/1978 | Neal et al. | |
| 4,160,640 A | 7/1979 | Maev et al. | |
| 4,165,609 A | 8/1979 | Rudolph | |
| 4,171,349 A | 10/1979 | Cucuiat et al. | |
| 4,204,401 A | 5/1980 | Earnest | |
| 4,222,240 A | 9/1980 | Castellano | |
| 4,224,991 A | 9/1980 | Sowa et al. | |
| 4,236,378 A | 12/1980 | Vogt | |
| 4,253,301 A | 3/1981 | Vogt | |
| 4,271,664 A | 6/1981 | Earnest | |
| 4,344,486 A | 8/1982 | Parrish | |
| 4,345,426 A | 8/1982 | Egnell et al. | |
| 4,352,269 A | 10/1982 | Dineen | |
| 4,380,895 A | 4/1983 | Adkins | |
| 4,399,652 A | 8/1983 | Cole et al. | |
| 4,414,334 A | 11/1983 | Hitzman | |
| 4,434,613 A | 3/1984 | Stahl | |
| 4,435,153 A | 3/1984 | Hashimoto et al. | |
| 4,442,665 A | 4/1984 | Fick et al. | |
| 4,445,842 A | 5/1984 | Syska | |
| 4,479,484 A | 10/1984 | Davis | |
| 4,480,985 A | 11/1984 | Davis | |
| 4,488,865 A | 12/1984 | Davis | |
| 4,498,288 A | 2/1985 | Vogt | |
| 4,498,289 A | 2/1985 | Osgerby | |
| 4,528,811 A | 7/1985 | Stahl | |
| 4,543,784 A | 10/1985 | Kirker | |
| 4,548,034 A | 10/1985 | Maguire | |
| 4,561,245 A | 12/1985 | Ball | |
| 4,569,310 A | 2/1986 | Davis | |
| 4,577,462 A | 3/1986 | Robertson | |
| 4,602,614 A | 7/1986 | Percival et al. | |
| 4,606,721 A | 8/1986 | Livingston | |
| 4,613,299 A | 9/1986 | Backheim | |
| 4,637,792 A | 1/1987 | Davis | |
| 4,651,712 A | 3/1987 | Davis | |
| 4,653,278 A | 3/1987 | Vinson et al. | |
| 4,681,678 A | 7/1987 | Leaseburge et al. | |
| 4,684,465 A | 8/1987 | Leaseburge et al. | |
| 4,753,666 A | 6/1988 | Pastor et al. | |
| 4,762,543 A | 8/1988 | Pantermuehl et al. | |
| 4,817,387 A | 4/1989 | Lashbrook | |
| 4,858,428 A | 8/1989 | Paul | |
| 4,895,710 A | 1/1990 | Hartmann et al. | |
| 4,898,001 A | 2/1990 | Kuroda et al. | |
| 4,946,597 A | 8/1990 | Sury | |
| 4,976,100 A | 12/1990 | Lee | |
| 5,014,785 A | 5/1991 | Puri et al. | |
| 5,044,932 A | 9/1991 | Martin et al. | |
| 5,073,105 A | 12/1991 | Martin et al. | |
| 5,084,438 A | 1/1992 | Matsubara et al. | |
| 5,085,274 A | 2/1992 | Puri et al. | |
| 5,098,282 A | 3/1992 | Schwartz et al. | |
| 5,123,248 A | 6/1992 | Monty et al. | |
| 5,135,387 A | 8/1992 | Martin et al. | |
| 5,141,049 A | 8/1992 | Larsen et al. | |
| 5,142,866 A | 9/1992 | Yanagihara et al. | |
| 5,147,111 A | 9/1992 | Montgomery | |
| 5,154,596 A | 10/1992 | Schwartz et al. | |
| 5,183,232 A | 2/1993 | Gale | |
| 5,195,884 A | 3/1993 | Schwartz et al. | |
| 5,197,289 A | 3/1993 | Glevicky et al. | |
| 5,238,395 A | 8/1993 | Schwartz et al. | |
| 5,255,506 A | 10/1993 | Wilkes et al. | |
| 5,259,184 A * | 11/1993 | Borkowicz ............. F23D 14/00 60/39.55 |
| 5,265,410 A | 11/1993 | Hisatome | |
| 5,271,905 A | 12/1993 | Owen et al. | |
| 5,275,552 A | 1/1994 | Schwartz et al. | |
| 5,295,350 A | 3/1994 | Child | |
| 5,304,362 A | 4/1994 | Madsen | |
| 5,325,660 A | 7/1994 | Taniguchi et al. | |
| 5,332,036 A | 7/1994 | Shirley et al. | |
| 5,344,307 A | 9/1994 | Schwartz et al. | |
| 5,345,756 A | 9/1994 | Jahnke et al. | |
| 5,355,668 A | 10/1994 | Weil | |
| 5,359,847 A | 11/1994 | Pillsbury et al. | |
| 5,361,586 A | 11/1994 | McWhirter et al. | |
| 5,388,395 A | 2/1995 | Scharpf et al. | |
| 5,394,688 A | 3/1995 | Amos | |

(56) References Cited

U.S. PATENT DOCUMENTS

| | | | |
|---|---|---|---|
| 5,402,847 A | 4/1995 | Wilson et al. |
| 5,444,971 A | 8/1995 | Holenberger |
| 5,457,951 A | 10/1995 | Johnson |
| 5,458,481 A | 10/1995 | Surbey et al. |
| 5,468,270 A | 11/1995 | Borszynski |
| 5,490,378 A | 2/1996 | Berger et al. |
| 5,542,840 A | 8/1996 | Surbey et al. |
| 5,566,756 A | 10/1996 | Chaback et al. |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |
| 5,680,764 A | 10/1997 | Viteri |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A | 3/1998 | Golomb et al. |
| 5,725,054 A | 3/1998 | Shayegi et al. |
| 5,740,786 A | 4/1998 | Gartner |
| 5,743,079 A | 4/1998 | Walsh et al. |
| 5,765,363 A | 6/1998 | Mowill |
| 5,771,867 A | 6/1998 | Amstutz et al. |
| 5,771,868 A | 6/1998 | Khair |
| 5,819,540 A | 10/1998 | Massarani |
| 5,832,712 A | 11/1998 | Ronning et al. |
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson, Jr. et al. |
| 5,956,937 A | 9/1999 | Beichel |
| 5,968,349 A | 10/1999 | Duyvesteyn et al. |
| 5,974,780 A | 11/1999 | Santos |
| 5,992,388 A | 11/1999 | Seger |
| 6,016,658 A | 1/2000 | Willis et al. |
| 6,032,465 A | 3/2000 | Regnier |
| 6,035,641 A | 3/2000 | Lokhandwala |
| 6,062,026 A | 5/2000 | Woollenweber et al. |
| 6,079,974 A | 6/2000 | Thompson |
| 6,082,093 A | 7/2000 | Greenwood et al. |
| 6,089,855 A | 7/2000 | Becker et al. |
| 6,094,916 A | 8/2000 | Puri et al. |
| 6,101,983 A | 8/2000 | Anand et al. |
| 6,148,602 A | 11/2000 | Demetri |
| 6,170,264 B1 | 1/2001 | Viteri et al. |
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Åsen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon, IV |
| 6,263,659 B1 | 7/2001 | Dillon, IV et al. |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,666 B1 * | 9/2001 | Ginter ............... F01D 25/285 |
| | | 60/39.55 |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Åsen et al. |
| 6,301,888 B1 | 10/2001 | Gray, Jr. |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen |
| 6,370,870 B1 | 4/2002 | Kamijo et al. |
| 6,374,591 B1 | 4/2002 | Johnson |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,724 B1 | 7/2002 | Cheng |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray, Jr. |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,505,683 B2 | 1/2003 | Minkkinen et al. |
| 6,508,209 B1 | 1/2003 | Collier, Jr. |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,644,041 B1 | 11/2003 | Eyermann |
| 6,655,150 B1 | 12/2003 | Åsen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Dalla Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |

(56) References Cited

U.S. PATENT DOCUMENTS

| | | |
|---|---|---|
| 6,790,030 B2 | 9/2004 | Fischer et al. |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier, Jr. |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol, Sr. |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakka et al. |
| 7,059,152 B2 | 6/2006 | Oakey et al. |
| 7,065,953 B1 | 6/2006 | Kopko |
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |
| 7,089,745 B2 * | 8/2006 | Roby ................ F02C 3/24 60/39.52 |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |
| 7,137,623 B2 | 11/2006 | Mockry |
| 7,143,572 B2 | 12/2006 | Ooka et al. |
| 7,143,606 B2 | 12/2006 | Tranier |
| 7,146,969 B2 | 12/2006 | Weirich |
| 7,147,461 B2 | 12/2006 | Neary |
| 7,148,261 B2 | 12/2006 | Hershkowitz et al. |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,183,328 B2 | 2/2007 | Hershkowitz et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,217,303 B2 | 5/2007 | Hershkowitz et al. |
| 7,225,623 B2 | 6/2007 | Koshoffer |
| 7,237,385 B2 | 7/2007 | Carrea |
| 7,284,362 B2 | 10/2007 | Marin et al. |
| 7,299,619 B2 | 11/2007 | Briesch |
| 7,299,868 B2 | 11/2007 | Zapadinski |
| 7,302,801 B2 | 12/2007 | Chen |
| 7,305,817 B2 | 12/2007 | Blodgett et al. |
| 7,305,831 B2 | 12/2007 | Carrea et al. |
| 7,313,916 B2 | 1/2008 | Pellizzari |
| 7,318,317 B2 | 1/2008 | Carrea |
| 7,343,742 B2 | 3/2008 | Wimmer et al. |
| 7,353,655 B2 | 4/2008 | Bolis et al. |
| 7,357,857 B2 | 4/2008 | Hart et al. |
| 7,363,756 B2 | 4/2008 | Carrea et al. |
| 7,363,764 B2 | 4/2008 | Griffin et al. |
| 7,381,393 B2 | 6/2008 | Lynn |
| 7,401,577 B2 | 7/2008 | Saucedo et al. |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,468,173 B2 | 12/2008 | Hughes et al. |
| 7,472,550 B2 | 1/2009 | Lear, Jr. et al. |
| 7,481,048 B2 | 1/2009 | Harmon et al. |
| 7,481,275 B2 | 1/2009 | Olsvik et al. |
| 7,482,500 B2 | 1/2009 | Johann et al. |
| 7,485,761 B2 | 2/2009 | Schindler et al. |
| 7,488,857 B2 | 2/2009 | Johann et al. |
| 7,490,472 B2 | 2/2009 | Lynghjem et al. |
| 7,491,250 B2 | 2/2009 | Hershkowitz et al. |
| 7,492,054 B2 | 2/2009 | Catlin |
| 7,493,769 B2 | 2/2009 | Jangili |
| 7,498,009 B2 | 3/2009 | Leach et al. |
| 7,503,178 B2 | 3/2009 | Bucker et al. |
| 7,503,948 B2 | 3/2009 | Hershkowitz et al. |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. |
| 7,520,134 B2 | 4/2009 | Durbin et al. |
| 7,523,603 B2 | 4/2009 | Hagen et al. |
| 7,536,252 B1 | 5/2009 | Hibshman, II et al. |
| 7,536,873 B2 | 5/2009 | Nohlen |
| 7,540,150 B2 | 6/2009 | Schmid et al. |
| 7,559,977 B2 | 7/2009 | Fleischer et al. |
| 7,562,519 B1 | 7/2009 | Harris et al. |
| 7,562,529 B2 | 7/2009 | Kuspert et al. |
| 7,566,394 B2 | 7/2009 | Koseoglu |
| 7,574,856 B2 | 8/2009 | Mak |
| 7,591,866 B2 | 9/2009 | Bose |
| 7,594,386 B2 | 9/2009 | Narayanan et al. |
| 7,610,752 B2 | 11/2009 | Dalla Betta et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,634,915 B2 | 12/2009 | Hoffmann et al. |
| 7,635,408 B2 | 12/2009 | Mak et al. |
| 7,637,093 B2 | 12/2009 | Rao |
| 7,644,573 B2 | 1/2010 | Smith |
| 7,650,744 B2 | 1/2010 | Varatharajan et al. |
| 7,654,320 B2 | 2/2010 | Payton |
| 7,654,330 B2 | 2/2010 | Zubrin et al. |
| 7,655,071 B2 | 2/2010 | De Vreede |
| 7,670,135 B1 | 3/2010 | Zink et al. |
| 7,673,454 B2 | 3/2010 | Saito et al. |
| 7,673,685 B2 | 3/2010 | Huntley Shaw et al. |
| 7,674,443 B1 | 3/2010 | Davis |
| 7,677,309 B2 | 3/2010 | Shaw et al. |
| 7,681,394 B2 | 3/2010 | Haugen |
| 7,682,597 B2 | 3/2010 | Blumenfeld et al. |
| 7,690,204 B2 | 4/2010 | Drnevich et al. |
| 7,691,788 B2 | 4/2010 | Tan et al. |
| 7,695,703 B2 | 4/2010 | Sobolevskiy et al. |
| 7,717,173 B2 | 5/2010 | Grott |
| 7,721,543 B2 | 5/2010 | Massey et al. |
| 7,726,114 B2 | 6/2010 | Evulet |

(56) References Cited

U.S. PATENT DOCUMENTS

| | | |
|---|---|---|
| 7,734,408 B2 | 6/2010 | Shiraki |
| 7,739,864 B2 | 6/2010 | Finkenrath et al. |
| 7,749,311 B2 | 7/2010 | Saito et al. |
| 7,752,848 B2 | 7/2010 | Balan et al. |
| 7,752,850 B2 | 7/2010 | Laster et al. |
| 7,753,039 B2 | 7/2010 | Harima et al. |
| 7,753,972 B2 | 7/2010 | Zubrin et al. |
| 7,762,084 B2 | 7/2010 | Martis et al. |
| 7,763,163 B2 | 7/2010 | Koseoglu |
| 7,763,227 B2 | 7/2010 | Wang |
| 7,765,810 B2 | 8/2010 | Pfefferle |
| 7,788,897 B2 | 9/2010 | Campbell et al. |
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,802,434 B2 | 9/2010 | Varatharajan et al. |
| 7,815,873 B2 | 10/2010 | Sankaranarayanan et al. |
| 7,815,892 B2 | 10/2010 | Hershkowitz et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,846,401 B2 | 12/2010 | Hershkowitz et al. |
| 7,861,511 B2 | 1/2011 | Chillar et al. |
| 7,874,140 B2 | 1/2011 | Fan et al. |
| 7,874,350 B2 | 1/2011 | Pfefferle |
| 7,875,402 B2 | 1/2011 | Hershkowitz et al. |
| 7,882,692 B2 | 2/2011 | Pronske et al. |
| 7,886,522 B2 | 2/2011 | Kammel |
| 7,895,822 B2 | 3/2011 | Hoffmann et al. |
| 7,896,105 B2 | 3/2011 | Dupriest |
| 7,906,304 B2 | 3/2011 | Kohr |
| 7,909,898 B2 | 3/2011 | White et al. |
| 7,914,749 B2 | 3/2011 | Carstens et al. |
| 7,914,764 B2 | 3/2011 | Hershkowitz et al. |
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,955,403 B2 | 6/2011 | Ariyapadi et al. |
| 7,966,822 B2 | 6/2011 | Myers et al. |
| 7,976,803 B2 | 7/2011 | Hooper et al. |
| 7,980,312 B1 | 7/2011 | Hill et al. |
| 7,985,399 B2 | 7/2011 | Drnevich et al. |
| 7,988,750 B2 | 8/2011 | Lee |
| 8,001,789 B2 | 8/2011 | Vega et al. |
| 8,029,273 B2 | 10/2011 | Paschereit et al. |
| 8,036,813 B2 | 10/2011 | Tonetti et al. |
| 8,038,416 B2 | 10/2011 | Ono et al. |
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Dion Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,567,200 B2 | 10/2013 | Brook et al. |
| 8,616,294 B2 | 12/2013 | Zubrin et al. |
| 8,627,643 B2 | 1/2014 | Chillar et al. |
| 2001/0000049 A1 | 3/2001 | Kataoka et al. |
| 2001/0004827 A1* | 6/2001 | Vandervort ............... F23R 3/14 |
| | | 60/39.55 |
| 2001/0029732 A1 | 10/2001 | Bachmann |
| 2001/0045090 A1 | 11/2001 | Gray, Jr. |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0187449 A1 | 12/2002 | Doebbeling et al. |
| 2003/0005698 A1 | 1/2003 | Keller |
| 2003/0131582 A1 | 7/2003 | Anderson et al. |
| 2003/0134241 A1 | 7/2003 | Marin et al. |
| 2003/0221409 A1 | 12/2003 | McGowan |
| 2004/0006994 A1 | 1/2004 | Walsh et al. |
| 2004/0068981 A1 | 4/2004 | Siefker et al. |
| 2004/0134194 A1* | 7/2004 | Roby ................. F02C 3/24 |
| | | 60/750 |
| 2004/0166034 A1 | 8/2004 | Kaefer |

(56) References Cited

U.S. PATENT DOCUMENTS

| | | |
|---|---|---|
| 2004/0170559 A1 | 9/2004 | Hershkowitz et al. |
| 2004/0223408 A1 | 11/2004 | Mathys et al. |
| 2004/0238654 A1 | 12/2004 | Hagen et al. |
| 2005/0028529 A1 | 2/2005 | Bartlett et al. |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0236602 A1 | 10/2005 | Viteri et al. |
| 2006/0112675 A1 | 6/2006 | Anderson et al. |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0248888 A1 | 11/2006 | Geskes |
| 2007/0000242 A1 | 1/2007 | Harmon et al. |
| 2007/0003897 A1* | 1/2007 | Koizumi ............... F23R 3/28 431/354 |
| 2007/0044475 A1 | 3/2007 | Leser et al. |
| 2007/0044479 A1 | 3/2007 | Brandt et al. |
| 2007/0089425 A1 | 4/2007 | Motter et al. |
| 2007/0107430 A1 | 5/2007 | Schmid et al. |
| 2007/0144747 A1 | 6/2007 | Steinberg |
| 2007/0231233 A1 | 10/2007 | Bose |
| 2007/0234702 A1 | 10/2007 | Hagen et al. |
| 2007/0234735 A1* | 10/2007 | Mosbacher ............ F02C 3/20 60/780 |
| 2007/0245736 A1 | 10/2007 | Barnicki |
| 2007/0249738 A1 | 10/2007 | Haynes et al. |
| 2007/0261408 A1* | 11/2007 | Carrea ................ F02C 3/34 60/772 |
| 2007/0272201 A1 | 11/2007 | Amano et al. |
| 2008/0000229 A1 | 1/2008 | Kuspert et al. |
| 2008/0006561 A1 | 1/2008 | Moran et al. |
| 2008/0010967 A1 | 1/2008 | Griffin et al. |
| 2008/0034727 A1 | 2/2008 | Sutikno |
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0083229 A1* | 4/2008 | Haynes ............... F02C 3/28 60/776 |
| 2008/0115478 A1 | 5/2008 | Sullivan |
| 2008/0118310 A1 | 5/2008 | Graham |
| 2008/0127632 A1 | 6/2008 | Finkenrath et al. |
| 2008/0155984 A1 | 7/2008 | Liu et al. |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare |
| 2008/0251234 A1 | 10/2008 | Wilson |
| 2008/0290719 A1 | 11/2008 | Kaminsky et al. |
| 2008/0309087 A1 | 12/2008 | Evulet et al. |
| 2009/0000762 A1 | 1/2009 | Wilson |
| 2009/0025390 A1 | 1/2009 | Christensen et al. |
| 2009/0038247 A1 | 2/2009 | Taylor et al. |
| 2009/0056342 A1 | 3/2009 | Kirzhner |
| 2009/0064653 A1 | 3/2009 | Hagen et al. |
| 2009/0071166 A1 | 3/2009 | Hagen et al. |
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0157230 A1 | 6/2009 | Hibshman, II et al. |
| 2009/0193809 A1 | 8/2009 | Schroder et al. |
| 2009/0205334 A1 | 8/2009 | Aljabari et al. |
| 2009/0218821 A1 | 9/2009 | Elkady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0262599 A1 | 10/2009 | Kohrs et al. |
| 2009/0284013 A1 | 11/2009 | Anand et al. |
| 2009/0301054 A1 | 12/2009 | Simpson et al. |
| 2009/0301099 A1 | 12/2009 | Nigro |
| 2010/0003123 A1 | 1/2010 | Smith |
| 2010/0018218 A1 | 1/2010 | Riley et al. |
| 2010/0031661 A1 | 2/2010 | Varatharajan et al. |
| 2010/0058732 A1 | 3/2010 | Kaufmann et al. |
| 2010/0071878 A1 | 3/2010 | Gilchrist, III et al. |
| 2010/0089020 A1* | 4/2010 | Barton ................ F23R 3/04 60/39.53 |
| 2010/0101204 A1* | 4/2010 | Berry ................. F23R 3/28 60/39.53 |
| 2010/0115960 A1 | 5/2010 | Brautsch et al. |
| 2010/0126176 A1 | 5/2010 | Kim |
| 2010/0126906 A1 | 5/2010 | Sury |
| 2010/0162703 A1 | 7/2010 | Li et al. |
| 2010/0170253 A1 | 7/2010 | Berry et al. |
| 2010/0180565 A1 | 7/2010 | Draper |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | ELKady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | ELKady et al. |
| 2011/0162353 A1 | 7/2011 | Vanvolsem et al. |
| 2011/0167828 A1 | 7/2011 | Singh et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0289932 A1* | 12/2011 | Thompson ............ F02C 3/30 60/776 |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0073260 A1 | 3/2012 | Draper |
| 2012/0085100 A1 | 4/2012 | Hughes et al. |
| 2012/0096870 A1 | 4/2012 | Wichmann et al. |
| 2012/0119512 A1 | 5/2012 | Draper |
| 2012/0131925 A1 | 5/2012 | Mittricker et al. |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0198276 A1 | 8/2012 | Zarnke et al. |
| 2012/0204571 A1* | 8/2012 | Kraemer ............ F23D 14/48 60/776 |
| 2012/0234011 A1* | 9/2012 | Popovic ............ F23R 3/10 60/740 |
| 2012/0247105 A1 | 10/2012 | Nelson et al. |
| 2012/0260660 A1 | 10/2012 | Kraemer et al. |
| 2012/0282558 A1* | 11/2012 | Kraemer ............ F23R 3/00 431/9 |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1 | 4/2013 | Gupta et al. |
| 2013/0098048 A1* | 4/2013 | Popovic ............ F23D 14/24 60/772 |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1 | 5/2013 | Mittricker et al. |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |

(56) References Cited

U.S. PATENT DOCUMENTS

| | | |
|---|---|---|
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |

FOREIGN PATENT DOCUMENTS

| | | |
|---|---|---|
| CN | 86106493 A | 12/1987 |
| DE | 102004029029 | 1/2006 |
| DE | 102009025934 A1 | 2/2010 |
| EP | 0770771 | 5/1997 |
| EP | 1288575 A2 | 3/2003 |
| EP | 2184464 | 5/2010 |
| EP | 2204616 A2 | 7/2010 |
| EP | 2246532 | 11/2010 |
| EP | 2390483 | 11/2011 |
| GB | 776269 | 6/1957 |
| GB | 2117053 | 10/1983 |
| GB | 2140873 A | 12/1984 |
| GB | 2446164 | 8/2008 |
| JP | S62108518 | 5/1987 |
| JP | 2000130757 A | 5/2000 |
| JP | 2006503259 A | 1/2006 |
| TW | 368547 B | 9/1999 |
| WO | WO1999006674 | 2/1999 |
| WO | WO1999063210 | 12/1999 |
| WO | 2004033886 A2 | 4/2004 |
| WO | 2005124231 | 12/2005 |
| WO | WO2007068682 | 6/2007 |
| WO | WO2008142009 | 11/2008 |
| WO | 2010141777 A1 | 12/2010 |
| WO | WO2011003606 | 1/2011 |
| WO | WO2012003489 | 1/2012 |
| WO | 2012128925 A2 | 9/2012 |
| WO | WO2012128928 | 9/2012 |
| WO | WO2012128929 | 9/2012 |
| WO | WO2012170114 | 12/2012 |
| WO | WO2013147632 | 10/2013 |
| WO | WO2013147633 | 10/2013 |
| WO | WO2013155214 | 10/2013 |
| WO | WO2013163045 | 10/2013 |

OTHER PUBLICATIONS

Air Separation Technology Ion Transport Membrane—Air Products 2008.
Air Separation Technology Ion Transport Membrane—Air Products 2011.
Anderson, R. E. (2006) "Durability and Reliability Demonstration of a Near-Zero-Emission Gas-Fired Power Plant," *California Energy Comm., CEC 500-2006-074*, 80 pgs.
Baxter, E. et al. (2003) "Fabricate and Test an Advanced Non-Polluting Turbine Drive Gas Generator," *U. S. Dept. of Energy, Nat'l Energy Tech. Lab., DE-FC26-00NT 40804*, 51 pgs.
Bolland, O. et al. (1998) "Removal of CO2 From Gas Turbine Power Plants Evaluation of Pre- and Postcombustion Methods," SINTEF Group, 1998, www.energy.sintef.no/publ/xergi/98/3/art-8engelsk.htm, 11 pgs.
BP Press Release (2006) "BP and Edison Mission Group Plan Major Hydrogen Power Project for California," Feb. 10, 2006, www.bp.com/hydrogenpower, 2 pgs.
Bryngelsson, M. et al. (2005) "Feasibility Study of CO2 Removal From Pressurized Flue Gas in a Fully Fired Combined Cycle—The Sargas Project," KTH—Royal Institute of Technology, Dept. of Chemical Engineering and Technology, 9 pgs.

Clark, Hal (2002) "Development of a Unique Gas Generator for a Non-Polluting Power Plant," California Energy Commission Feasibility Analysis, P500-02-011F, Mar. 2002, 42 pgs.
Comparison of Ion Transport Membranes—Fourth Annual Conference on Carbon Capture and Sequestration DOE/NETL; May 2005.
Ciulia, Vincent. About.com. Auto Repair. How the Engine Works. 2001-2003.
Cryogenics. Science Clarified. 2012. http://www.scienceclarified.com/Co-Di/Cryogenics.html.
Defrate, L. A. et al. (1959) "Optimum Design of Ejector Using Digital Computers" Chem. Eng. Prog. Symp. Ser., 55 ( 21) pp. 46.
Ditaranto, M. et al. (2006) "Combustion Instabilities in Sudden Expansion Oxy-Fuel Flames," ScienceDirect, Combustion and Flame, v.146, Jun. 30, 2006, pp. 493-51.
Elwell, L. C. et al. (2005) "Technical Overview of Carbon Dioxide Capture Technologies for Coal-Fired Power Plants," *MPR Associates, Inc.*, Jun. 22, 2005, 15 pgs.
Eriksson, Sara. Licentiate Thesis 2005, p. 22. KTH—"Development of Methane Oxidation Catalysts for Different Gas Turbine Combustor Concepts." The Royal Institute of Technology, Department of Chemical Engineering and Technology, Chemical Technology, Stockholm Sweden.
Ertesvag, I. S. et al. (2005) "Exergy Analysis of a Gas-Turbin Combined-Cycle Power Plant With Precombustion $CO_2$ Capture," Elsivier, 2004, pp. 5-39.
Evulet, Andrei T. et al. "Application of Exhaust Gas Recirculation in a DLN F-Class Combustion System for Postcombustion Carbon Capture" ASME J. Engineering for Gas Turbines and Power, vol. 131, May 2009.
Evulet, Andrei T. et al. "On the Performance and Operability of GE's Dry Low Nox Combustors utilizing Exhaust Gas Recirculation for Post-Combustion Carbon Capture" Energy Procedia I 2009, 3809-3816.
http://www.turbineinletcooling.org/resources/papers/CTIC_WetCompression_Shepherd_ASMETurboExpo2011.pdf Jun. 2011.
Luby, P. et al. (2003) "Zero Carbon Power Generation: IGCC as the Premium Option," *Powergen International*, 19 pgs.
MacAdam, S. et al. (2008) "Coal-Based Oxy-Fuel System Evaluation and Combustor Development," *Clean Energy Systems, Inc.* 6 pgs.
Morehead, H. (2007) "Siemens Global Gasification and IGCC Update," *Siemens, Coal-Gen*, Aug. 3, 2007, 17 pgs.
Reeves, S. R. (2001) "Geological Sequestration of $CO_2$ in Deep, Unmineable Coalbeds: An Integrated Research and Commercial-Scale Field Demonstration Project," *SPE 71749*, 10 pgs.
Reeves, S. R. (2003) "Enhanced Coalbed Methane Recovery," *SPE 101466-DL*, 8 pgs.
Richards, G. A. et al. (2001) "Advanced Steam Generators," *National Energy Technology Laboratory*, 7 pgs.
Snarheim, D. et al. (2006) "Control Design for a Gas Turbine Cycle With $CO_2$ Capture Capabilities," *Modeling, Identification and Control*, vol. 00, 10 pgs.
Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," *Department of Energy and Process Eng., Norwegian Univ. of Science and Technology*, 9 pgs.
vanHemert, P. et al. (2006) "Adsorption of Carbon Dioxide and a Hydrogen-Carbon Dioxide Mixture," *Intn'l Coalbed Methane Symposium* (Tuscaloosa, AL) *Paper* 0615, 9 pgs.
Zhu, J. et al. (2002) "Recovery of Coalbed Methane by Gas Injection," *SPE 75255*, 15 pgs.
U.S. Appl. No. 13/596,684, filed Aug. 28, 2012, Slobodyanskiy et al.
U.S. Appl. No. 14/066,579, filed Oct. 29, 2013, Huntington et al.
U.S. Appl. No. 14/066,551, filed Oct. 29, 2013, Minto.
U.S. Appl. No. 14/144,511, filed Dec. 30, 2013, Thatcher et al.
U.S. Appl. No. 14/067,559, filed Oct. 30, 2013, Lucas John Stoia et al.
PCT/RU2013/000162, Feb. 28, 2013, General Electric Company.
U.S. Appl. No. 14/067,679, filed Oct. 30, 2013, Elizabeth Angelyn Fadde et al.
U.S. Appl. No. 14/067,714, filed Oct. 30, 2013, Carolyn Ashley Antoniono et al.

(56) References Cited

OTHER PUBLICATIONS

U.S. Appl. No. 14/067,726, filed Oct. 30, 2013, Carolyn Ashley Antoniono et al.
U.S. Appl. No. 14/067,731, filed Oct. 30, 2013, Carolyn Ashley Antoniono et al.
U.S. Appl. No. 14/067,739, filed Oct. 30, 2013, Carolyn Ashley Antoniono et al.
U.S. Appl. No. 14/067,797, filed Oct. 31, 2013, Anthony Wayne Krull et al.
U.S. Appl. No. 14/066,488, filed Oct. 29, 2013, Pramod K. Biyani et al.
U.S. Appl. No. 14/135,055, filed Dec. 19, 2013, Pramod K. Biyani et al.
U.S. Appl. No. 14/067,844, filed Oct. 30, 2013, John Farrior Woodall et al.
PCT/US13/036020, Apr. 10, 2013, General Electric Company/ExxonMobil Upstream Company.
U.S. Appl. No. 14/067,486, filed Oct. 30, 2013, Huntington et al.
U.S. Appl. No. 14/067,537, filed Oct. 30, 2013, Huntington et al.
U.S. Appl. No. 14/067,552, filed Oct. 30, 2013, Huntington et al.
U.S. Appl. No. 14/067,563, filed Oct. 30, 2013, Huntington et al.
CN First Office Action and English Translation; Application No. CN 201380069181.7; dated May 13, 2016; 37 pages.
PCT International Search Report and Written Opinion; Application No. PCT/US2013/068035; dated Oct. 8, 2014; 23 pages.
PCT International Search Report and Written Opinion for PCT/US2013/067995 dated Mar. 27, 2014.
PCT International Search Report & Written Opinion for PCT/US2013/068113 dated Apr. 15, 2014.
Cho, J. H. et al. (2005) "Marrying LNG and Power Generation," Energy Markets; 10, 8; ABI/INFORM Trade & Industry, 5 pgs.
Corti, A. et al. (1988) "Athabasca Mineable Oil Sands: The RTR/Gulf Extraction Process Theoretical Model of Bitumen Detachment," 4th UNITAR/UNDP Int'l Conf. on Heavy Crude and Tar Sands Proceedings, v.5, paper No. 81, Edmonton, AB, Canada, 4 pgs.
Nanda, R. et al. (2007) "Utilizing Air Based Technologies as Heat Source for LNG Vaporization," presented at the 86th Annual convention of the Gas Processors of America (GPA 2007), , San Antonio, TX; 13 pgs.
Rosetta, M. J. et al. (2006) "Intergrating Ambient Air Vaporization Technology with Waste Heat Recovery—A Fresh Approach to LNG Vaporization," presented at the 85th annual convention of the Gas Processors of America (GPA 2006), Grapevine, Texas, 22 pgs.
EP Communication Pursuant to Article 94(3) EPC; Application No. EP 13805975.3; dated Jul. 18, 2016; 5 pages.
Taiwanese Office Action for TW Application No. 102138889 dated Apr. 13, 2017.
Japanese Office Action for JP Application No. 2015540814 dated Aug. 28, 2017, 7 Pages.
Au Office Action for AU Application No. 2013337693 dated Nov. 28, 2017; 3 pgs.
GCC Office Action for GC Application No. GC 2013-25698 dated Dec. 26, 2017; 5 pgs.

\* cited by examiner

US 10,161,312 B2

SYSTEM AND METHOD FOR DIFFUSION COMBUSTION WITH FUEL-DILUENT MIXING IN A STOICHIOMETRIC EXHAUST GAS RECIRCULATION GAS TURBINE SYSTEM

CROSS-REFERENCE TO RELATED APPLICATIONS

This application claims priority to and benefit of U.S. Provisional Patent Application No. 61/722,118, entitled "SYSTEM AND METHOD FOR DIFFUSION COMBUSTION IN A STOICHIOMETRIC EXHAUST GAS RECIRCULATION GAS TURBINE SYSTEM," filed on Nov. 2, 2012, U.S. Provisional Patent Application No. 61/722,115, entitled "SYSTEM AND METHOD FOR DIFFUSION COMBUSTION WITH FUEL-DILUENT MIXING IN A STOICHIOMETRIC EXHAUST GAS RECIRCULATION GAS TURBINE SYSTEM," filed on Nov. 2, 2012, U.S. Provisional Patent Application No. 61/722,114, entitled "SYSTEM AND METHOD FOR DIFFUSION COMBUSTION WITH OXIDANT-DILUENT MIXING IN A STOICHIOMETRIC EXHAUST GAS RECIRCULATION GAS TURBINE SYSTEM," filed on Nov. 2, 2012, and U.S. Provisional Patent Application No. 61/722,111, entitled "SYSTEM AND METHOD FOR LOAD CONTROL WITH DIFFUSION COMBUSTION IN A STOICHIOMETRIC EXHAUST GAS RECIRCULATION GAS TURBINE SYSTEM," filed on Nov. 2, 2012, all of which are herein incorporated by reference in their entirety for all purposes.

BACKGROUND OF THE INVENTION

The subject matter disclosed herein relates to gas turbine engines.

Gas turbine engines are used in a wide variety of applications, such as power generation, aircraft, and various machinery. Gas turbine engine generally combust a fuel with an oxidant (e.g., air) in a combustor section to generate hot combustion products, which then drive one or more turbine stages of a turbine section. In turn, the turbine section drives one or more compressor stages of a compressor section, thereby compressing oxidant for intake into the combustor section along with the fuel. Again, the fuel and oxidant mix in the combustor section, and then combust to produce the hot combustion products. Gas turbine engines generally premix the fuel and oxidant along one or more flow paths upstream from a combustion chamber of the combustor section, and thus gas turbine engines generally operate with premix flames. Unfortunately, the premix flames may be difficult to control or maintain, which can impact various exhaust emission and power requirements. Furthermore, gas turbine engines typically consume a vast amount of air as the oxidant, and output a considerable amount of exhaust gas into the atmosphere. In other words, the exhaust gas is typically wasted as a byproduct of the gas turbine operation.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system is provided with a turbine combustor having a first diffusion fuel nozzle, wherein the first diffusion fuel nozzle has first and second passages that separately inject respective first and second flows into a chamber of the turbine combustor to produce a diffusion flame. The first flow includes a first fuel and a first diluent, and the second flow includes a first oxidant. The system includes a turbine driven by combustion products from the diffusion flame in the turbine combustor. The system also includes an exhaust gas compressor, wherein the exhaust gas compressor is configured to compress and route an exhaust gas from the turbine to the turbine combustor along an exhaust recirculation path.

In a second embodiment, a method includes injecting first and second flows separately into a chamber of a turbine combustor to produce a diffusion flame, wherein the first flow includes a first fuel and a first diluent, and the second flow includes a first oxidant. The method further includes driving a turbine with the combustion products from the diffusion flame, and outputting an exhaust gas. The method further includes recirculating the exhaust gas along an exhaust recirculation path to an exhaust gas compressor. The method further includes compressing and routing the exhaust gas to the turbine combustor.

In a third embodiment, a method includes introducing an oxidant to at least one oxidant compressor to produce a compressed oxidant stream. The method further includes introducing a recirculated low oxygen content gas stream to a compressor section of a gas turbine engine to produce a compressed low oxygen content gas stream. The method further includes mixing a first portion of the compressed low oxygen content gas stream with a fuel stream and producing a diluted fuel stream. The method further includes introducing a first portion of the compressed oxidant stream and the diluted fuel stream in a substantially stoichiometric ratio to at least one turbine combustor and mixing the first portion of the compressed oxidant stream and the diluted fuel stream at the point of combustion and combusting the mixture of the first portion of the compressed oxidant stream and the diluted fuel stream. The method further includes introducing a second portion of the compressed low oxygen content gas stream to the at least one turbine combustor and mixing it with the combusting streams of the first portion of the compressed oxidant stream and the diluted fuel after the point of combustion and producing a high temperature high pressure low oxygen content stream. The method further includes introducing the high temperature high pressure low oxygen content stream to an expander section of the gas turbine engine and expanding the high temperature high pressure low oxygen content stream to produce mechanical power and a recirculated low oxygen content gas stream. The method further includes using a first portion of the mechanical power to drive the compressor section of the gas turbine engine. The method further includes using a second portion of the mechanical power to drive at least one of: a generator, the at least one oxidant compressor, or at least one other mechanical device. The method further includes recirculating the recirculated low oxygen content gas stream in a recirculation loop from the outlet of the expander section to the inlet of the compressor section of the gas turbine engine. The method further includes extracting at least a third portion of the compressed low oxygen content gas stream from the gas turbine engine and delivering the at least a third portion of the compressed low oxygen content gas stream to the first at least one oxidation catalyst unit and producing a low oxygen content product stream.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
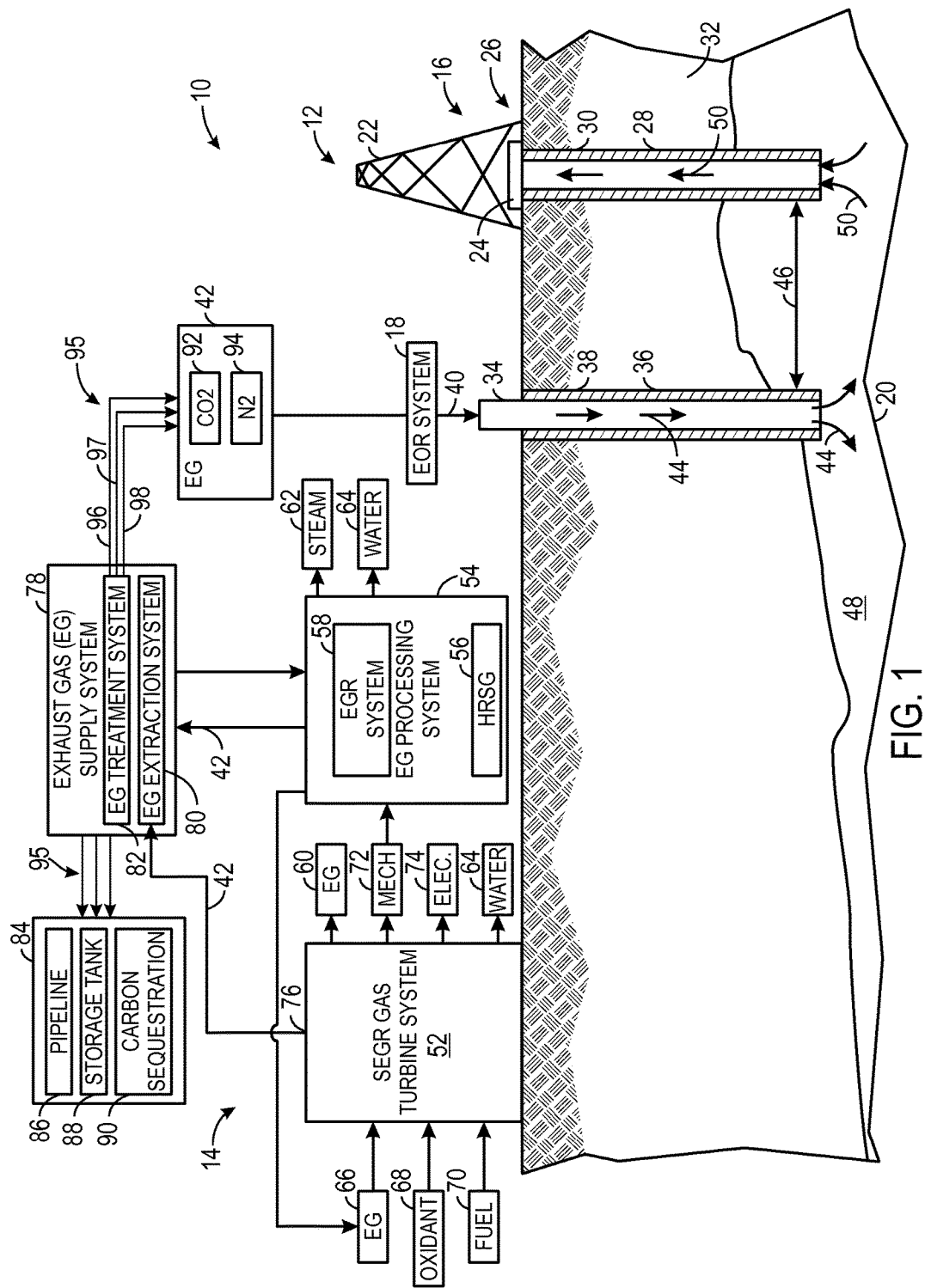
FIG. 1 is a diagram of an embodiment of a system having a turbine-based service system coupled to a hydrocarbon production system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments relate generally to gas turbine systems with exhaust gas recirculation (EGR), and particularly stoichiometric operation of the gas turbine systems using EGR. For example, the gas turbine systems may be configured to recirculate the exhaust gas along an exhaust recirculation path, stoichiometrically combust fuel and oxidant along with at least some of the recirculated exhaust gas, and capture the exhaust gas for use in various target systems. The recirculation of the exhaust gas along with stoichiometric combustion may help to increase the concentration level of carbon dioxide ($CO_2$) in the exhaust gas, which can then be post treated to separate and purify the $CO_2$ and nitrogen ($N_2$) for use in various target systems. The gas turbine systems also may employ various exhaust gas processing (e.g., heat recovery, catalyst reactions, etc.) along the exhaust recirculation path, thereby increasing the concentration level of $CO_2$, reducing concentration levels of other emissions (e.g., carbon monoxide, nitrogen oxides, and unburnt hydrocarbons), and increasing energy recovery (e.g., with heat recovery units). Furthermore, the gas turbine engines may be configured to combust the fuel and oxidant with one or more diffusion flames, rather than or in addition to premix flames. The diffusion flames may help to maintain stability and operation within certain limits for stoichiometric combustion, which in turn helps to increase production of $CO_2$. For example, as discussed below, a gas turbine system operating with diffusion flames may enable a greater quantity of EGR, as compared to a gas turbine system operating with premix flames. In turn, the increased quantity of EGR helps to increase $CO_2$ production. Possible target systems include pipelines, storage tanks, carbon sequestration systems, and hydrocarbon production systems, such as enhanced oil recovery (EOR) systems.

As general context, it is noteworthy to discuss the differences between a premix flame (i.e., premix combustion) versus a diffusion flame (i.e., diffusion combustion). Combustion (i.e., premix or diffusion combustion) is essentially an exothermic chemical reaction (e.g., combustion reaction) between a fuel and an oxidant, such as air, oxygen, oxygen-enriched air, oxygen reduced air, or mixtures of oxygen and nitrogen. The exothermic chemical reaction between the fuel and the oxidant may substantially impact (and control) the stability of the flame (e.g., the stability of the flame surface), and vice versa. For example, the heat release from the exothermic chemical reaction helps to sustain the flame, and thus higher flame temperatures generally lead to greater flame stability. In other words, higher temperatures associated with the exothermic chemical reaction may help to increase flame stability, whereas lower temperatures associated with the exothermic chemical reaction may reduce the flame stability. The flame temperature may be largely dependent on the fuel/oxidant ratio. In particular, the flame temperature may be the greatest at a stoichiometric fuel/oxidant ratio, which, as discussed in detail below, generally involves an exothermic chemical reaction that consumes substantially all of the fuel and oxidant, thereby resulting in substantially no residual oxidant or unburnt fuel.

With premix combustion, the fuel and oxidant mix at one or more locations upstream from the premix flame, which is essentially a combustion of this pre-mixture of fuel and oxidant. In general, the exothermic chemical reaction of fuel and oxidant in the premix flame is constrained to the fuel/oxidant ratio of the pre-mixture, which is achieved upstream from the premix flame. In many configurations (particularly when one or more diluents are premixed with the fuel and oxidant), it may be more difficult to maintain a substantially stoichiometric fuel/oxidant ratio with a premix flame, and thus it may be more difficult to maximize the stability of the flame. In certain configurations, the premix flame may be achieved with a fuel-lean fuel/oxidant ratio, which reduces the flame temperature and, thus, helps to lower emissions of nitrogen oxides ($NO_X$), e.g., nitrogen monoxide (NO) and nitrogen dioxide ($NO_2$). While the reduced $NO_X$ emissions is relevant for emissions regulations, the reduced flame temperature also causes a reduction in flame stability. In the disclosed embodiments, the system may be controlled to provide a substantially stoichiometric fuel/oxidant ratio (e.g., increasing flame temperature and flame stability), while using one or more diluents to reduce the temperature for purposes of emissions control (e.g., reducing $NO_X$ emissions). In particular, as discussed below, the diluents may be provided separate from the fuel and oxidant (e.g., after the point of combustion and/or downstream from the premix flame), thereby enabling more precise control of the fuel/oxidant ratio to achieve stoichiometric combustion while also using the diluents to control the temperature and emissions (e.g., $NO_X$ emissions). In other words, the fuel and oxidant flows may be controlled independently from one another and the diluent flow, thereby providing a more precisely controlled fuel/oxidant ratio in the pre-mixture delivered to the location of the premix flame.

With diffusion combustion, the fuel and oxidant generally do not mix upstream from the diffusion flame, but rather the fuel and oxidant mix and react directly at the flame surface and/or the flame surface exists at the location of mixing between the fuel and oxidant. In particular, the fuel and oxidant separately approach the flame surface (or diffusion boundary/interface), and then diffuse (e.g., via molecular and viscous diffusion) along the flame surface (or diffusion boundary/interface) to generate the diffusion flame. It is noteworthy that the fuel and oxidant may be at a substantially stoichiometric ratio along this flame surface (or diffusion boundary/interface), which may result in a greater flame temperature (e.g., a peak flame temperature) along this flame surface. Again, the stoichiometric fuel/oxidant ratio generally results in a greater flame temperature (e.g., a peak flame temperature), as compared with a fuel-lean or fuel-rich fuel/oxidant ratio. As a result, the diffusion flame may be substantially more stable than the premix flame, because the diffusion of fuel and oxidant helps to maintain a stoichiometric ratio (and greater temperature) along the flame surface. Although greater flame temperatures can also lead to greater exhaust emissions, such as $NO_X$ emissions, the disclosed embodiments use one or more diluents to help control the temperature and emissions while still avoiding any premixing of the fuel and oxidant. For example, the disclosed embodiments may introduce one or more diluents separate from the fuel and oxidant (e.g., after the point of combustion and/or downstream from the diffusion flame), thereby helping to reduce the temperature and reduce the emissions (e.g., $NO_X$ emissions) produced by the diffusion flame.

In the disclosed embodiments, the exhaust gas provided by the exhaust gas recirculation (EGR) serves as at least one of the diluents. The exhaust gas (as one of the diluents) is essentially decoupled from the flows of oxidant and fuel, thereby enabling independent control of the fuel, oxidant, and diluent (e.g., exhaust gas) flows. In certain embodiments, the exhaust gas may be injected into the turbine combustor after the point of combustion and/or downstream from the flame (e.g., premix flame and/or diffusion flame), thereby helping to reduce the temperature and reduce exhaust emissions, e.g., $NO_X$ emissions. However, other diluents (e.g., steam, nitrogen, or other inert gases) also may be used for temperature and/or emissions control, alone or in combination with the exhaust gas. Given the differences between premix flames and diffusion flames, the amount of EGR may vary considerably between a gas turbine system operating with premix fuel nozzles versus diffusion fuel nozzles. A premix flame may be constrained to the pre-mixture upstream from the premix flame (e.g., including mixing of the diluent with the fuel and oxidant), and thus the premix flame may not be capable of maintaining flame stability above a certain level of EGR. In other words, in a premix flame configuration of the gas turbine system, an increasing amount of exhaust gas (e.g., EGR) that premixes with the fuel and oxidant may increasingly reduce the temperature and flame stability of the premix flame, and thus too much EGR may cause the premix flame to become unstable. However, in a diffusion flame configuration of the gas turbine system, it is now believed that an increasing amount of exhaust gas (e.g., EGR) can be used along with the diffusion flame, well beyond any limits associated with a premix flame configuration. For example, in a substantially stoichiometric EGR gas turbine system, the amount of exhaust gas (e.g., EGR) that may be used with a diffusion flame configuration may be at least approximately 10, 20, 30, 40, 50, 60, 70, 80, 90, or 100 percent greater than the amount of exhaust gas (e.g., EGR) that may be used with a premix flame configuration. By further example, in a substantially stoichiometric EGR gas turbine system, the amount of exhaust gas (e.g., EGR) that may be used with a diffusion flame configuration may be greater than approximately 35, 40, 45, 50, 55, 60, 65, 70, or 75 percent by volume of the exhaust gas (e.g., EGR) relative to the total flow through the combustors and turbine section (e.g., total flow of oxidant, fuel, and diluents). As a result, a significant improvement in $CO_2$ production may be achieved by using diffusion flames (e.g., diffusion fuel nozzles) along with a substantially stoichiometric EGR gas turbine system.

Although the diffusion fuel nozzles may be particularly helpful in increasing quantities of EGR and $CO_2$ production, the disclosed embodiments employ various controls to help control the fuel/oxidant ratio, the stability of the flame, exhaust emissions, and power output, whether the system is operating with a premix flame, a diffusion flame, or a combination thereof. For example, the disclosed embodiments may include combustors with one or more diffusion fuel nozzles and premix fuel nozzles, which may be independently controlled through different fluid supply circuits to provide benefits of both premix flame configurations and diffusion flame configurations.

FIG. 1 is a diagram of an embodiment of a system 10 having an hydrocarbon production system 12 associated with a turbine-based service system 14. As discussed in further detail below, various embodiments of the turbine-based service system 14 are configured to provide various services, such as electrical power, mechanical power, and fluids (e.g., exhaust gas), to the hydrocarbon production system 12 to facilitate the production or retrieval of oil and/or gas. In the illustrated embodiment, the hydrocarbon production system 12 includes an oil/gas extraction system 16 and an enhanced oil recovery (EOR) system 18, which are coupled to a subterranean reservoir 20 (e.g., an oil, gas, or hydrocarbon reservoir). The oil/gas extraction system 16 includes a variety of surface equipment 22, such as a Christmas tree or production tree 24, coupled to an oil/gas well 26. Furthermore, the well 26 may include one or more tubulars 28 extending through a drilled bore 30 in the earth 32 to the subterranean reservoir 20. The tree 24 includes one or more valves, chokes, isolation sleeves, blowout preventers, and various flow control devices, which regulate pressures and control flows to and from the subterranean reservoir 20. While the tree 24 is generally used to control the flow of the production fluid (e.g., oil or gas) out of the subterranean reservoir 20, the EOR system 18 may increase the production of oil or gas by injecting one or more fluids into the subterranean reservoir 20.

Accordingly, the EOR system 18 may include a fluid injection system 34, which has one or more tubulars 36 extending through a bore 38 in the earth 32 to the subterranean reservoir 20. For example, the EOR system 18 may route one or more fluids 40, such as gas, steam, water, chemicals, or any combination thereof, into the fluid injection system 34. For example, as discussed in further detail below, the EOR system 18 may be coupled to the turbine-based service system 14, such that the system 14 routes an exhaust gas 42 (e.g., substantially or entirely free of oxygen) to the EOR system 18 for use as the injection fluid 40. The fluid injection system 34 routes the fluid 40 (e.g., the exhaust gas 42) through the one or more tubulars 36 into the subterranean reservoir 20, as indicated by arrows 44. The injection fluid 40 enters the subterranean reservoir 20 through the tubular 36 at an offset distance 46 away from the tubular 28 of the oil/gas well 26. Accordingly, the injection fluid 40 displaces the oil/gas 48 disposed in the subterranean reservoir 20, and drives the oil/gas 48 up through the one or more tubulars 28 of the hydrocarbon production system 12, as indicated by arrows 50. As discussed in further detail below, the injection fluid 40 may include the exhaust gas 42 originating from the turbine-based service system 14, which is able to generate the exhaust gas 42 on-site as needed by the hydrocarbon production system 12. In other words, the turbine-based system 14 may simultaneously generate one or more services (e.g., electrical power, mechanical power, steam, water (e.g., desalinated water), and exhaust gas (e.g., substantially free of oxygen)) for use by the hydrocarbon production system 12, thereby reducing or eliminating the reliance on external sources of such services.

In the illustrated embodiment, the turbine-based service system 14 includes a stoichiometric exhaust gas recirculation (SEGR) gas turbine system 52 and an exhaust gas (EG) processing system 54. The gas turbine system 52 may be configured to operate in a stoichiometric combustion mode of operation (e.g., a stoichiometric control mode) and a non-stoichiometric combustion mode of operation (e.g., a non-stoichiometric control mode), such as a fuel-lean control mode or a fuel-rich control mode. In the stoichiometric control mode, the combustion generally occurs in a substantially stoichiometric ratio of a fuel and oxidant, thereby resulting in substantially stoichiometric combustion. In particular, stoichiometric combustion generally involves consuming substantially all of the fuel and oxidant in the combustion reaction, such that the products of combustion are substantially or entirely free of unburnt fuel and oxidant. One measure of stoichiometric combustion is the equivalence ratio, or phi ($\Phi$), which is the ratio of the actual fuel/oxidant ratio relative to the stoichiometric fuel/oxidant ratio. An equivalence ratio of greater than 1.0 results in a fuel-rich combustion of the fuel and oxidant, whereas an equivalence ratio of less than 1.0 results in a fuel-lean combustion of the fuel and oxidant. In contrast, an equivalence ratio of 1.0 results in combustion that is neither fuel-rich nor fuel-lean, thereby substantially consuming all of the fuel and oxidant in the combustion reaction. In context of the disclosed embodiments, the term stoichiometric or substantially stoichiometric may refer to an equivalence ratio of approximately 0.95 to approximately 1.05. However, the disclosed embodiments may also include an equivalence ratio of 1.0 plus or minus 0.01, 0.02, 0.03, 0.04, 0.05, or more. Again, the stoichiometric combustion of fuel and oxidant in the turbine-based service system 14 may result in products of combustion or exhaust gas (e.g., 42) with substantially no unburnt fuel or oxidant remaining. For example, the exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, the exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. However, the disclosed embodiments also may produce other ranges of residual fuel, oxidant, and other emissions levels in the exhaust gas 42. As used herein, the terms emissions, emissions levels, and emissions targets may refer to concentration levels of certain products of combustion (e.g., $NO_X$, CO, $SO_X$, $O_2$, $N_2$, $H_2$, HCs, etc.), which may be present in recirculated gas streams, vented gas streams (e.g., exhausted into the atmosphere), and gas streams used in various target systems (e.g., the hydrocarbon production system 12).

Although the SEGR gas turbine system 52 and the EG processing system 54 may include a variety of components in different embodiments, the illustrated EG processing system 54 includes a heat recovery steam generator (HRSG) 56 and an exhaust gas recirculation (EGR) system 58, which receive and process an exhaust gas 60 originating from the SEGR gas turbine system 52. The HRSG 56 may include one or more heat exchangers, condensers, and various heat recovery equipment, which collectively function to transfer heat from the exhaust gas 60 to a stream of water, thereby generating steam 62. The steam 62 may be used in one or more steam turbines, the EOR system 18, or any other portion of the hydrocarbon production system 12. For example, the HRSG 56 may generate low pressure, medium pressure, and/or high pressure steam 62, which may be selectively applied to low, medium, and high pressure steam turbine stages, or different applications of the EOR system 18. In addition to the steam 62, a treated water 64, such as a desalinated water, may be generated by the HRSG 56, the EGR system 58, and/or another portion of the EG processing system 54 or the SEGR gas turbine system 52. The treated water 64 (e.g., desalinated water) may be particularly useful in areas with water shortages, such as inland or desert regions. The treated water 64 may be generated, at least in part, due to the large volume of air driving combustion of fuel within the SEGR gas turbine system 52. While the on-site generation of steam 62 and water 64 may be beneficial in many applications (including the hydrocarbon production system 12), the on-site generation of exhaust gas 42, 60 may be particularly beneficial for the EOR system 18, due to its low oxygen content, high pressure, and heat derived from the SEGR gas turbine system 52. Accordingly, the HRSG 56, the EGR system 58, and/or another portion of the EG processing system 54 may output or recirculate an exhaust gas 66 into the SEGR gas turbine system 52, while also routing the exhaust gas 42 to the EOR system 18 for use with the hydrocarbon production system 12. Likewise, the exhaust gas 42 may be extracted directly from the SEGR gas turbine system 52 (i.e., without passing through the EG processing system 54) for use in the EOR system 18 of the hydrocarbon production system 12.

The exhaust gas recirculation is handled by the EGR system 58 of the EG processing system 54. For example, the EGR system 58 includes one or more conduits, valves, blowers, exhaust gas treatment systems (e.g., filters, particulate removal units, gas separation units, gas purification units, heat exchangers, heat recovery units, moisture removal units, catalyst units, chemical injection units, or any combination thereof), and controls to recirculate the exhaust gas along an exhaust gas circulation path from an output (e.g., discharged exhaust gas 60) to an input (e.g., intake exhaust gas 66) of the SEGR gas turbine system 52. In the illustrated embodiment, the SEGR gas turbine system 52 intakes the exhaust gas 66 into a compressor section having one or more compressors, thereby compressing the exhaust gas 66 for use in a combustor section along with an intake of an oxidant 68 and one or more fuels 70. The oxidant 68 may include ambient air, pure oxygen, oxygen-enriched air, oxygen-reduced air, oxygen-nitrogen mixtures, or any suitable oxidant that facilitates combustion of the fuel 70. The fuel 70 may include one or more gas fuels, liquid fuels, or any combination thereof. For example, the fuel 70 may include natural gas, liquefied natural gas (LNG), syngas, methane, ethane, propane, butane, naphtha, kerosene, diesel fuel, ethanol, methanol, biofuel, or any combination thereof.

The SEGR gas turbine system 52 mixes and combusts the exhaust gas 66, the oxidant 68, and the fuel 70 in the combustor section, thereby generating hot combustion gases or exhaust gas 60 to drive one or more turbine stages in a turbine section. In certain embodiments, each combustor in the combustor section includes one or more premix fuel nozzles, one or more diffusion fuel nozzles, or any combination thereof. For example, each premix fuel nozzle may be configured to mix the oxidant 68 and the fuel 70 internally within the fuel nozzle and/or partially upstream of the fuel nozzle, thereby injecting an oxidant-fuel mixture from the fuel nozzle into the combustion zone for a premixed combustion (e.g., a premixed flame). By further example, each diffusion fuel nozzle may be configured to isolate the flows of oxidant 68 and fuel 70 within the fuel nozzle, thereby separately injecting the oxidant 68 and the fuel 70 from the fuel nozzle into the combustion zone for diffusion combustion (e.g., a diffusion flame). In particular, the diffusion combustion provided by the diffusion fuel nozzles delays mixing of the oxidant 68 and the fuel 70 until the point of initial combustion, i.e., the flame region. In embodiments employing the diffusion fuel nozzles, the diffusion flame may provide increased flame stability, because the diffusion flame generally forms at the point of stoichiometry between the separate streams of oxidant 68 and fuel 70 (i.e., as the oxidant 68 and fuel 70 are mixing). In certain embodiments, one or more diluents (e.g., the exhaust gas 60, steam, nitrogen, or another inert gas) may be pre-mixed with the oxidant 68, the fuel 70, or both, in either the diffusion fuel nozzle or the premix fuel nozzle. In addition, one or more diluents (e.g., the exhaust gas 60, steam, nitrogen, or another inert gas) may be injected into the combustor at or downstream from the point of combustion within each combustor. The use of these diluents may help temper the flame (e.g., premix flame or diffusion flame), thereby helping to reduce $NO_X$ emissions, such as nitrogen monoxide (NO) and nitrogen dioxide ($NO_2$). Regardless of the type of flame, the combustion produces hot combustion gases or exhaust gas 60 to drive one or more turbine stages. As each turbine stage is driven by the exhaust gas 60, the SEGR gas turbine system 52 generates a mechanical power 72 and/or an electrical power 74 (e.g., via an electrical generator). The system 52 also outputs the exhaust gas 60, and may further output water 64. Again, the water 64 may be a treated water, such as a desalinated water, which may be useful in a variety of applications on-site or off-site.

Exhaust extraction is also provided by the SEGR gas turbine system 52 using one or more extraction points 76. For example, the illustrated embodiment includes an exhaust gas (EG) supply system 78 having an exhaust gas (EG) extraction system 80 and an exhaust gas (EG) treatment system 82, which receive exhaust gas 42 from the extraction points 76, treat the exhaust gas 42, and then supply or distribute the exhaust gas 42 to various target systems. The target systems may include the EOR system 18 and/or other systems, such as a pipeline 86, a storage tank 88, or a carbon sequestration system 90. The EG extraction system 80 may include one or more conduits, valves, controls, and flow separations, which facilitate isolation of the exhaust gas 42 from the oxidant 68, the fuel 70, and other contaminants, while also controlling the temperature, pressure, and flow rate of the extracted exhaust gas 42. The EG treatment system 82 may include one or more heat exchangers (e.g., heat recovery units such as heat recovery steam generators, condensers, coolers, or heaters), catalyst systems (e.g., oxidation catalyst systems), particulate and/or water removal systems (e.g., gas dehydration units, inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, exhaust gas compressors, any combination thereof. These subsystems of the EG treatment system 82 enable control of the temperature, pressure, flow rate, moisture content (e.g., amount of water removal), particulate content (e.g., amount of particulate removal), and gas composition (e.g., percentage of $CO_2$, $N_2$, etc.).

The extracted exhaust gas 42 is treated by one or more subsystems of the EG treatment system 82, depending on the target system. For example, the EG treatment system 82 may direct all or part of the exhaust gas 42 through a carbon capture system, a gas separation system, a gas purification system, and/or a solvent based treatment system, which is controlled to separate and purify a carbonaceous gas (e.g., carbon dioxide) 92 and/or nitrogen ($N_2$) 94 for use in the various target systems. For example, embodiments of the EG treatment system 82 may perform gas separation and purification to produce a plurality of different streams 95 of exhaust gas 42, such as a first stream 96, a second stream 97, and a third stream 98. The first stream 96 may have a first composition that is rich in carbon dioxide and/or lean in nitrogen (e.g., a $CO_2$ rich, $N_2$ lean stream). The second stream 97 may have a second composition that has intermediate concentration levels of carbon dioxide and/or nitrogen (e.g., intermediate concentration $CO_2$, $N_2$ stream). The third stream 98 may have a third composition that is lean in carbon dioxide and/or rich in nitrogen (e.g., a $CO_2$ lean, $N_2$ rich stream). Each stream 95 (e.g., 96, 97, and 98) may include a gas dehydration unit, a filter, a gas compressor, or any combination thereof, to facilitate delivery of the stream 95 to a target system. In certain embodiments, the $CO_2$ rich, $N_2$ lean stream 96 may have a $CO_2$ purity or concentration level of greater than approximately 70, 75, 80, 85, 90, 95, 96, 97, 98, or 99 percent by volume, and a $N_2$ purity or concentration level of less than approximately 1, 2, 3, 4, 5, 10, 15, 20, 25, or 30 percent by volume. In contrast, the $CO_2$ lean, $N_2$ rich stream 98 may have a $CO_2$ purity or concentration level of less than approximately 1, 2, 3, 4, 5, 10, 15, 20, 25, or 30 percent by volume, and a $N_2$ purity or concentration level of greater than approximately 70, 75, 80, 85, 90, 95, 96, 97, 98, or 99 percent by volume. The intermediate concentration $CO_2$, $N_2$ stream 97 may have a $CO_2$ purity or concentration level and/or a $N_2$ purity or concentration level of between approximately 30 to 70, 35 to 65, 40 to 60, or 45 to 55 percent by volume. Although the foregoing ranges are merely non-limiting examples, the $CO_2$ rich, $N_2$ lean stream 96 and the $CO_2$ lean, $N_2$ rich stream 98 may be particularly well suited for use with the EOR system 18 and the other systems 84. However, any of these rich, lean, or intermediate concentration $CO_2$ streams 95 may be used, alone or in various combinations, with the EOR system 18 and the other systems 84. For example, the EOR system 18 and the other systems 84 (e.g., the pipeline 86, storage tank 88, and the carbon sequestration system 90) each may receive one or more $CO_2$ rich, $N_2$ lean streams 96, one or more $CO_2$ lean, $N_2$ rich streams 98, one or more intermediate concentration $CO_2$, $N_2$ streams 97, and one or more untreated exhaust gas 42 streams (i.e., bypassing the EG treatment system 82).

The EG extraction system 80 extracts the exhaust gas 42 at one or more extraction points 76 along the compressor section, the combustor section, and/or the turbine section, such that the exhaust gas 42 may be used in the EOR system 18 and other systems 84 at suitable temperatures and pressures. The EG extraction system 80 and/or the EG treatment system 82 also may circulate fluid flows (e.g., exhaust gas 42) to and from the EG processing system 54. For example, a portion of the exhaust gas 42 passing through the EG processing system 54 may be extracted by the EG extraction system 80 for use in the EOR system 18 and the other systems 84. In certain embodiments, the EG supply system 78 and the EG processing system 54 may be independent or integral with one another, and thus may use independent or common subsystems. For example, the EG treatment system 82 may be used by both the EG supply system 78 and the EG processing system 54. Exhaust gas 42 extracted from the EG processing system 54 may undergo multiple stages of gas treatment, such as one or more stages of gas treatment in the EG processing system 54 followed by one or more additional stages of gas treatment in the EG treatment system 82.

At each extraction point 76, the extracted exhaust gas 42 may be substantially free of oxidant 68 and fuel 70 (e.g., unburnt fuel or hydrocarbons) due to substantially stoichiometric combustion and/or gas treatment in the EG processing system 54. Furthermore, depending on the target system, the extracted exhaust gas 42 may undergo further treatment in the EG treatment system 82 of the EG supply system 78, thereby further reducing any residual oxidant 68, fuel 70, or other undesirable products of combustion. For example, either before or after treatment in the EG treatment system 82, the extracted exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, either before or after treatment in the EG treatment system 82, the extracted exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. Thus, the exhaust gas 42 is particularly well suited for use with the EOR system 18.

The EGR operation of the turbine system 52 specifically enables the exhaust extraction at a multitude of locations 76. For example, the compressor section of the system 52 may be used to compress the exhaust gas 66 without any oxidant 68 (i.e., only compression of the exhaust gas 66), such that a substantially oxygen-free exhaust gas 42 may be extracted from the compressor section and/or the combustor section prior to entry of the oxidant 68 and the fuel 70. The extraction points 76 may be located at interstage ports between adjacent compressor stages, at ports along the compressor discharge casing, at ports along each combustor in the combustor section, or any combination thereof. In certain embodiments, the exhaust gas 66 may not mix with the oxidant 68 and fuel 70 until it reaches the head end portion and/or fuel nozzles of each combustor in the combustor section. Furthermore, one or more flow separators (e.g., walls, dividers, baffles, or the like) may be used to isolate the oxidant 68 and the fuel 70 from the extraction points 76. With these flow separators, the extraction points 76 may be disposed directly along a wall of each combustor in the combustor section.

Once the exhaust gas 66, oxidant 68, and fuel 70 flow through the head end portion (e.g., through fuel nozzles) into the combustion portion (e.g., combustion chamber) of each combustor, the SEGR gas turbine system 52 is controlled to provide a substantially stoichiometric combustion of the exhaust gas 66, oxidant 68, and fuel 70. For example, the system 52 may maintain an equivalence ratio of approximately 0.95 to approximately 1.05. As a result, the products of combustion of the mixture of exhaust gas 66, oxidant 68, and fuel 70 in each combustor is substantially free of oxygen and unburnt fuel. Thus, the products of combustion (or exhaust gas) may be extracted from the turbine section of the SEGR gas turbine system 52 for use as the exhaust gas 42 routed to the EOR system 18. Along the turbine section, the extraction points 76 may be located at any turbine stage, such as interstage ports between adjacent turbine stages. Thus, using any of the foregoing extraction points 76, the turbine-based service system 14 may generate, extract, and deliver the exhaust gas 42 to the hydrocarbon production system 12 (e.g., the EOR system 18) for use in the production of oil/gas 48 from the subterranean reservoir 20.

Figure 2:
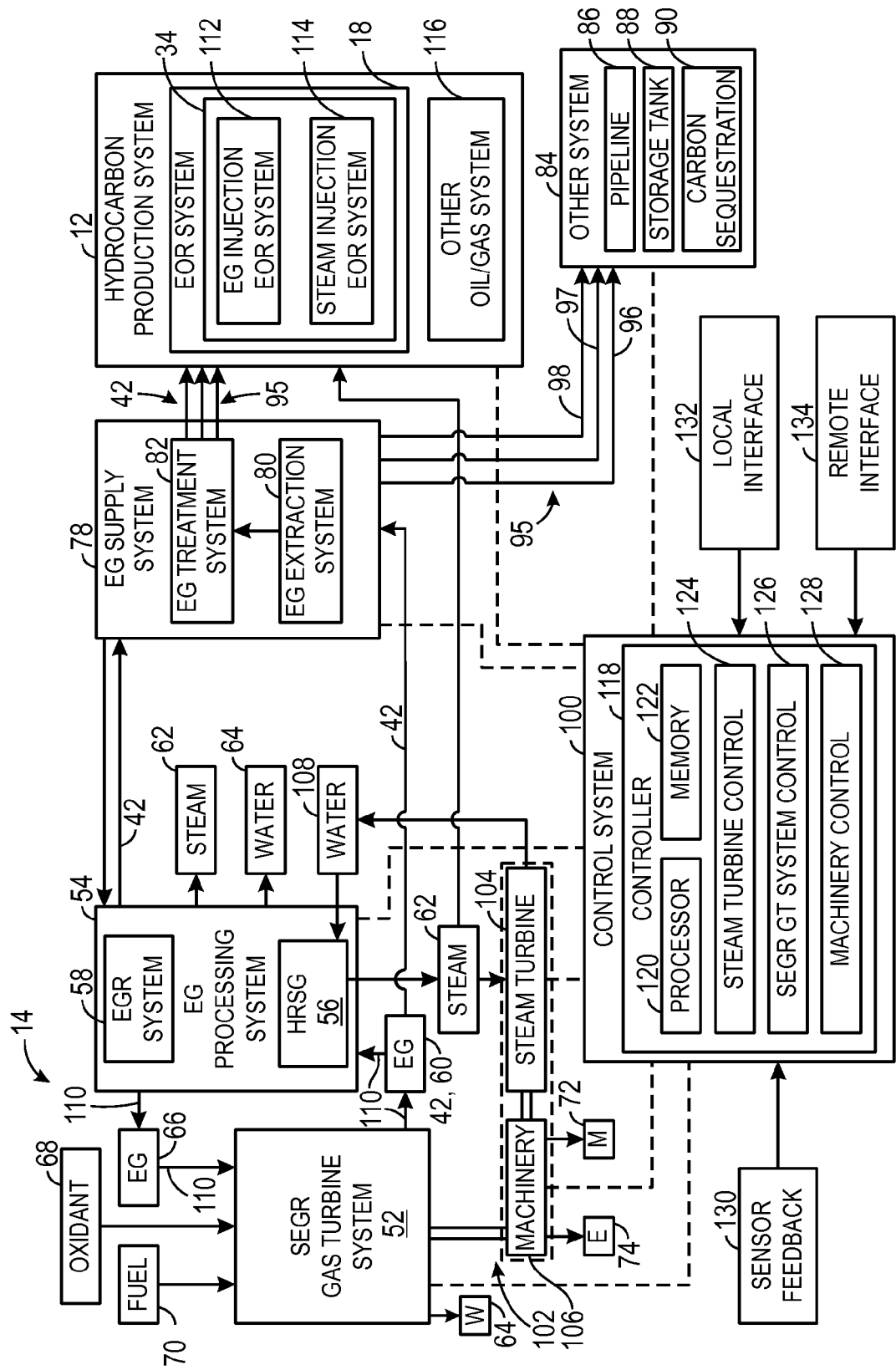
FIG. 2 is a diagram of an embodiment of the system of FIG. 1, further illustrating a control system and a combined cycle system.

FIG. 2 is a diagram of an embodiment of the system 10 of FIG. 1, illustrating a control system 100 coupled to the turbine-based service system 14 and the hydrocarbon production system 12. In the illustrated embodiment, the turbine-based service system 14 includes a combined cycle system 102, which includes the SEGR gas turbine system 52 as a topping cycle, a steam turbine 104 as a bottoming cycle, and the HRSG 56 to recover heat from the exhaust gas 60 to generate the steam 62 for driving the steam turbine 104. Again, the SEGR gas turbine system 52 receives, mixes, and stoichiometrically combusts the exhaust gas 66, the oxidant 68, and the fuel 70 (e.g., premix and/or diffusion flames), thereby producing the exhaust gas 60, the mechanical power 72, the electrical power 74, and/or the water 64. For example, the SEGR gas turbine system 52 may drive one or more loads or machinery 106, such as an electrical generator, an oxidant compressor (e.g., a main air compressor), a gear box, a pump, equipment of the hydrocarbon production system 12, or any combination thereof. In some embodiments, the machinery 106 may include other drives, such as electrical motors or steam turbines (e.g., the steam turbine 104), in tandem with the SEGR gas turbine system 52. Accordingly, an output of the machinery 106 driven by the SEGR gas turbines system 52 (and any additional drives) may include the mechanical power 72 and the electrical power 74. The mechanical power 72 and/or the electrical power 74 may be used on-site for powering the hydrocarbon production system 12, the electrical power 74 may be distributed to the power grid, or any combination thereof. The output of the machinery 106 also may include a compressed fluid, such as a compressed oxidant 68 (e.g., air or oxygen), for intake into the combustion section of the SEGR gas turbine system 52. Each of these outputs (e.g., the exhaust gas 60, the mechanical power 72, the electrical power 74, and/or the water 64) may be considered a service of the turbine-based service system 14.

The SEGR gas turbine system 52 produces the exhaust gas 42, 60, which may be substantially free of oxygen, and routes this exhaust gas 42, 60 to the EG processing system 54 and/or the EG supply system 78. The EG supply system 78 may treat and delivery the exhaust gas 42 (e.g., streams 95) to the hydrocarbon production system 12 and/or the other systems 84. As discussed above, the EG processing system 54 may include the HRSG 56 and the EGR system 58. The HRSG 56 may include one or more heat exchangers, condensers, and various heat recovery equipment, which may be used to recover or transfer heat from the exhaust gas 60 to water 108 to generate the steam 62 for driving the steam turbine 104. Similar to the SEGR gas turbine system 52, the steam turbine 104 may drive one or more loads or machinery 106, thereby generating the mechanical power 72 and the electrical power 74. In the illustrated embodiment, the SEGR gas turbine system 52 and the steam turbine 104 are arranged in tandem to drive the same machinery 106. However, in other embodiments, the SEGR gas turbine system 52 and the steam turbine 104 may separately drive different machinery 106 to independently generate mechanical power 72 and/or electrical power 74. As the steam turbine 104 is driven by the steam 62 from the HRSG 56, the steam 62 gradually decreases in temperature and pressure. Accordingly, the steam turbine 104 recirculates the used steam 62 and/or water 108 back into the HRSG 56 for additional steam generation via heat recovery from the exhaust gas 60. In addition to steam generation, the HRSG 56, the EGR system 58, and/or another portion of the EG processing system 54 may produce the water 64, the exhaust gas 42 for use with the hydrocarbon production system 12, and the exhaust gas 66 for use as an input into the SEGR gas turbine system 52. For example, the water 64 may be a treated water 64, such as a desalinated water for use in other applications. The desalinated water may be particularly useful in regions of low water availability. Regarding the exhaust gas 60, embodiments of the EG processing system 54 may be configured to recirculate the exhaust gas 60 through the EGR system 58 with or without passing the exhaust gas 60 through the HRSG 56.

In the illustrated embodiment, the SEGR gas turbine system 52 has an exhaust recirculation path 110, which extends from an exhaust outlet to an exhaust inlet of the system 52. Along the path 110, the exhaust gas 60 passes through the EG processing system 54, which includes the HRSG 56 and the EGR system 58 in the illustrated embodiment. The EGR system 58 may include one or more conduits, valves, blowers, gas treatment systems (e.g., filters, particulate removal units, gas separation units, gas purification units, heat exchangers, heat recovery units such as heat recovery steam generators, moisture removal units, catalyst units, chemical injection units, or any combination thereof) in series and/or parallel arrangements along the path 110. In other words, the EGR system 58 may include any flow control components, pressure control components, temperature control components, moisture control components, and gas composition control components along the exhaust recirculation path 110 between the exhaust outlet and the exhaust inlet of the system 52. Accordingly, in embodiments with the HRSG 56 along the path 110, the HRSG 56 may be considered a component of the EGR system 58. However, in certain embodiments, the HRSG 56 may be disposed along an exhaust path independent from the exhaust recirculation path 110. Regardless of whether the HRSG 56 is along a separate path or a common path with the EGR system 58, the HRSG 56 and the EGR system 58 intake the exhaust gas 60 and output either the recirculated exhaust gas 66, the exhaust gas 42 for use with the EG supply system 78 (e.g., for the hydrocarbon production system 12 and/or other systems 84), or another output of exhaust gas. Again, the SEGR gas turbine system 52 intakes, mixes, and stoichiometrically combusts the exhaust gas 66, the oxidant 68, and the fuel 70 (e.g., premixed and/or diffusion flames) to produce a substantially oxygen-free and fuel-free exhaust gas 60 for distribution to the EG processing system 54, the hydrocarbon production system 12, or other systems 84.

As noted above with reference to FIG. 1, the hydrocarbon production system 12 may include a variety of equipment to facilitate the recovery or production of oil/gas 48 from a subterranean reservoir 20 through an oil/gas well 26. For example, the hydrocarbon production system 12 may include the EOR system 18 having the fluid injection system 34. In the illustrated embodiment, the fluid injection system 34 includes an exhaust gas injection EOR system 112 and a steam injection EOR system 114. Although the fluid injection system 34 may receive fluids from a variety of sources, the illustrated embodiment may receive the exhaust gas 42 and the steam 62 from the turbine-based service system 14. The exhaust gas 42 and/or the steam 62 produced by the turbine-based service system 14 also may be routed to the hydrocarbon production system 12 for use in other oil/gas systems 116.

The quantity, quality, and flow of the exhaust gas 42 and/or the steam 62 may be controlled by the control system 100. The control system 100 may be dedicated entirely to the turbine-based service system 14, or the control system 100 may optionally also provide control (or at least some data to facilitate control) for the hydrocarbon production system 12 and/or other systems 84. In the illustrated embodiment, the control system 100 includes a controller 118 having a processor 120, a memory 122, a steam turbine control 124, a SEGR gas turbine system control 126, and a machinery control 128. The processor 120 may include a single processor or two or more redundant processors, such as triple redundant processors for control of the turbine-based service system 14. The memory 122 may include volatile and/or non-volatile memory. For example, the memory 122 may include one or more hard drives, flash memory, read-only memory, random access memory, or any combination thereof. The controls 124, 126, and 128 may include software and/or hardware controls. For example, the controls 124, 126, and 128 may include various instructions or code stored on the memory 122 and executable by the processor 120. The control 124 is configured to control operation of the steam turbine 104, the SEGR gas turbine system control 126 is configured to control the system 52, and the machinery control 128 is configured to control the machinery 106. Thus, the controller 118 (e.g., controls 124, 126, and 128) may be configured to coordinate various sub-systems of the turbine-based service system 14 to provide a suitable stream of the exhaust gas 42 to the hydrocarbon production system 12.

In certain embodiments of the control system 100, each element (e.g., system, subsystem, and component) illustrated in the drawings or described herein includes (e.g., directly within, upstream, or downstream of such element) one or more industrial control features, such as sensors and control devices, which are communicatively coupled with one another over an industrial control network along with the controller 118. For example, the control devices associated with each element may include a dedicated device controller (e.g., including a processor, memory, and control instructions), one or more actuators, valves, switches, and industrial control equipment, which enable control based on sensor feedback 130, control signals from the controller 118, control signals from a user, or any combination thereof. Thus, any of the control functionality described herein may be implemented with control instructions stored and/or executable by the controller 118, dedicated device controllers associated with each element, or a combination thereof.

In order to facilitate such control functionality, the control system 100 includes one or more sensors distributed throughout the system 10 to obtain the sensor feedback 130 for use in execution of the various controls, e.g., the controls 124, 126, and 128. For example, the sensor feedback 130 may be obtained from sensors distributed throughout the SEGR gas turbine system 52, the machinery 106, the EG processing system 54, the steam turbine 104, the hydrocarbon production system 12, or any other components throughout the turbine-based service system 14 or the hydrocarbon production system 12. For example, the sensor feedback 130 may include temperature feedback, pressure feedback, flow rate feedback, flame temperature feedback, combustion dynamics feedback, intake oxidant composition feedback, intake fuel composition feedback, exhaust composition feedback, the output level of mechanical power 72, the output level of electrical power 74, the output quantity of the exhaust gas 42, 60, the output quantity or quality of the water 64, or any combination thereof. For example, the sensor feedback 130 may include a composition of the exhaust gas 42, 60 to facilitate stoichiometric combustion in the SEGR gas turbine system 52. For example, the sensor feedback 130 may include feedback from one or more intake oxidant sensors along an oxidant supply path of the oxidant 68, one or more intake fuel sensors along a fuel supply path of the fuel 70, and one or more exhaust emissions sensors disposed along the exhaust recirculation path 110 and/or within the SEGR gas turbine system 52. The intake oxidant sensors, intake fuel sensors, and exhaust emissions sensors may include temperature sensors, pressure sensors, flow rate sensors, and composition sensors. The emissions sensors may includes sensors for nitrogen oxides (e.g., $NO_X$ sensors), carbon oxides (e.g., CO sensors and $CO_2$ sensors), sulfur oxides (e.g., $SO_X$ sensors), hydrogen (e.g., $H_2$ sensors), oxygen (e.g., $O_2$ sensors), unburnt hydrocarbons (e.g., HC sensors), or other products of incomplete combustion, or any combination thereof.

Using this feedback 130, the control system 100 may adjust (e.g., increase, decrease, or maintain) the intake flow of exhaust gas 66, oxidant 68, and/or fuel 70 into the SEGR gas turbine system 52 (among other operational parameters) to maintain the equivalence ratio within a suitable range, e.g., between approximately 0.95 to approximately 1.05, between approximately 0.95 to approximately 1.0, between approximately 1.0 to approximately 1.05, or substantially at 1.0. For example, the control system 100 may analyze the feedback 130 to monitor the exhaust emissions (e.g., concentration levels of nitrogen oxides, carbon oxides such as CO and $CO_2$, sulfur oxides, hydrogen, oxygen, unburnt hydrocarbons, and other products of incomplete combustion) and/or determine the equivalence ratio, and then control one or more components to adjust the exhaust emissions (e.g., concentration levels in the exhaust gas 42) and/or the equivalence ratio. The controlled components may include any of the components illustrated and described with reference to the drawings, including but not limited to, valves along the supply paths for the oxidant 68, the fuel 70, and the exhaust gas 66; an oxidant compressor, a fuel pump, or any components in the EG processing system 54; any components of the SEGR gas turbine system 52, or any combination thereof. The controlled components may adjust (e.g., increase, decrease, or maintain) the flow rates, temperatures, pressures, or percentages (e.g., equivalence ratio) of the oxidant 68, the fuel 70, and the exhaust gas 66 that combust within the SEGR gas turbine system 52. The controlled components also may include one or more gas treatment systems, such as catalyst units (e.g., oxidation catalyst units), supplies for the catalyst units (e.g., oxidation fuel, heat, electricity, etc.), gas purification and/or separation units (e.g., solvent based separators, absorbers, flash tanks, etc.), and filtration units. The gas treatment systems may help reduce various exhaust emissions along the exhaust recirculation path 110, a vent path (e.g., exhausted into the atmosphere), or an extraction path to the EG supply system 78.

In certain embodiments, the control system 100 may analyze the feedback 130 and control one or more components to maintain or reduce emissions levels (e.g., concentration levels in the exhaust gas 42, 60, 95) to a target range, such as less than approximately 10, 20, 30, 40, 50, 100, 200, 300, 400, 500, 1000, 2000, 3000, 4000, 5000, or 10000 parts per million by volume (ppmv). These target ranges may be the same or different for each of the exhaust emissions, e.g., concentration levels of nitrogen oxides, carbon monoxide, sulfur oxides, hydrogen, oxygen, unburnt hydrocarbons, and other products of incomplete combustion. For example, depending on the equivalence ratio, the control system 100 may selectively control exhaust emissions (e.g., concentration levels) of oxidant (e.g., oxygen) within a target range of less than approximately 10, 20, 30, 40, 50, 60, 70, 80, 90, 100, 250, 500, 750, or 1000 ppmv; carbon monoxide (CO) within a target range of less than approximately 20, 50, 100, 200, 500, 1000, 2500, or 5000 ppmv; and nitrogen oxides ($NO_X$) within a target range of less than approximately 50, 100, 200, 300, 400, or 500 ppmv. In certain embodiments operating with a substantially stoichiometric equivalence ratio, the control system 100 may selectively control exhaust emissions (e.g., concentration levels) of oxidant (e.g., oxygen) within a target range of less than approximately 10, 20, 30, 40, 50, 60, 70, 80, 90, or 100 ppmv; and carbon monoxide (CO) within a target range of less than approximately 500, 1000, 2000, 3000, 4000, or 5000 ppmv. In certain embodiments operating with a fuel-lean equivalence ratio (e.g., between approximately 0.95 to 1.0), the control system 100 may selectively control exhaust emissions (e.g., concentration levels) of oxidant (e.g., oxygen) within a target range of less than approximately 500, 600, 700, 800, 900, 1000, 1100, 1200, 1300, 1400, or 1500 ppmv; carbon monoxide (CO) within a target range of less than approximately 10, 20, 30, 40, 50, 60, 70, 80, 90, 100, 150, or 200 ppmv; and nitrogen oxides (e.g., $NO_X$) within a target range of less than approximately 50, 100, 150, 200, 250, 300, 350, or 400 ppmv. The foregoing target ranges are merely examples, and are not intended to limit the scope of the disclosed embodiments.

The control system 100 also may be coupled to a local interface 132 and a remote interface 134. For example, the local interface 132 may include a computer workstation disposed on-site at the turbine-based service system 14 and/or the hydrocarbon production system 12. In contrast, the remote interface 134 may include a computer workstation disposed off-site from the turbine-based service system 14 and the hydrocarbon production system 12, such as through an internet connection. These interfaces 132 and 134 facilitate monitoring and control of the turbine-based service system 14, such as through one or more graphical displays of sensor feedback 130, operational parameters, and so forth.

Again, as noted above, the controller 118 includes a variety of controls 124, 126, and 128 to facilitate control of the turbine-based service system 14. The steam turbine control 124 may receive the sensor feedback 130 and output control commands to facilitate operation of the steam turbine 104. For example, the steam turbine control 124 may receive the sensor feedback 130 from the HRSG 56, the machinery 106, temperature and pressure sensors along a path of the steam 62, temperature and pressure sensors along a path of the water 108, and various sensors indicative of the mechanical power 72 and the electrical power 74. Likewise, the SEGR gas turbine system control 126 may receive sensor feedback 130 from one or more sensors disposed along the SEGR gas turbine system 52, the machinery 106, the EG processing system 54, or any combination thereof. For example, the sensor feedback 130 may be obtained from temperature sensors, pressure sensors, clearance sensors, vibration sensors, flame sensors, fuel composition sensors, exhaust gas composition sensors, or any combination thereof, disposed within or external to the SEGR gas turbine system 52. Finally, the machinery control 128 may receive sensor feedback 130 from various sensors associated with the mechanical power 72 and the electrical power 74, as well as sensors disposed within the machinery 106. Each of these controls 124, 126, and 128 uses the sensor feedback 130 to improve operation of the turbine-based service system 14.

In the illustrated embodiment, the SEGR gas turbine system control 126 may execute instructions to control the quantity and quality of the exhaust gas 42, 60, 95 in the EG processing system 54, the EG supply system 78, the hydrocarbon production system 12, and/or the other systems 84. For example, the SEGR gas turbine system control 126 may maintain a level of oxidant (e.g., oxygen) and/or unburnt fuel in the exhaust gas 60 below a threshold suitable for use with the exhaust gas injection EOR system 112. In certain embodiments, the threshold levels may be less than 1, 2, 3, 4, or 5 percent of oxidant (e.g., oxygen) and/or unburnt fuel by volume of the exhaust gas 42, 60; or the threshold levels of oxidant (e.g., oxygen) and/or unburnt fuel (and other exhaust emissions) may be less than approximately 10, 20, 30, 40, 50, 60, 70, 80, 90, 100, 200, 300, 400, 500, 1000, 2000, 3000, 4000, or 5000 parts per million by volume (ppmv) in the exhaust gas 42, 60. By further example, in order to achieve these low levels of oxidant (e.g., oxygen) and/or unburnt fuel, the SEGR gas turbine system control 126 may maintain an equivalence ratio for combustion in the SEGR gas turbine system 52 between approximately 0.95 and approximately 1.05. The SEGR gas turbine system control 126 also may control the EG extraction system 80 and the EG treatment system 82 to maintain the temperature, pressure, flow rate, and gas composition of the exhaust gas 42, 60, 95 within suitable ranges for the exhaust gas injection EOR system 112, the pipeline 86, the storage tank 88, and the carbon sequestration system 90. As discussed above, the EG treatment system 82 may be controlled to purify and/or separate the exhaust gas 42 into one or more gas streams 95, such as the $CO_2$ rich, $N_2$ lean stream 96, the intermediate concentration $CO_2$, $N_2$ stream 97, and the $CO_2$ lean, $N_2$ rich stream 98. In addition to controls for the exhaust gas 42, 60, and 95, the controls 124, 126, and 128 may execute one or more instructions to maintain the mechanical power 72 within a suitable power range, or maintain the electrical power 74 within a suitable frequency and power range.

Figure 3:
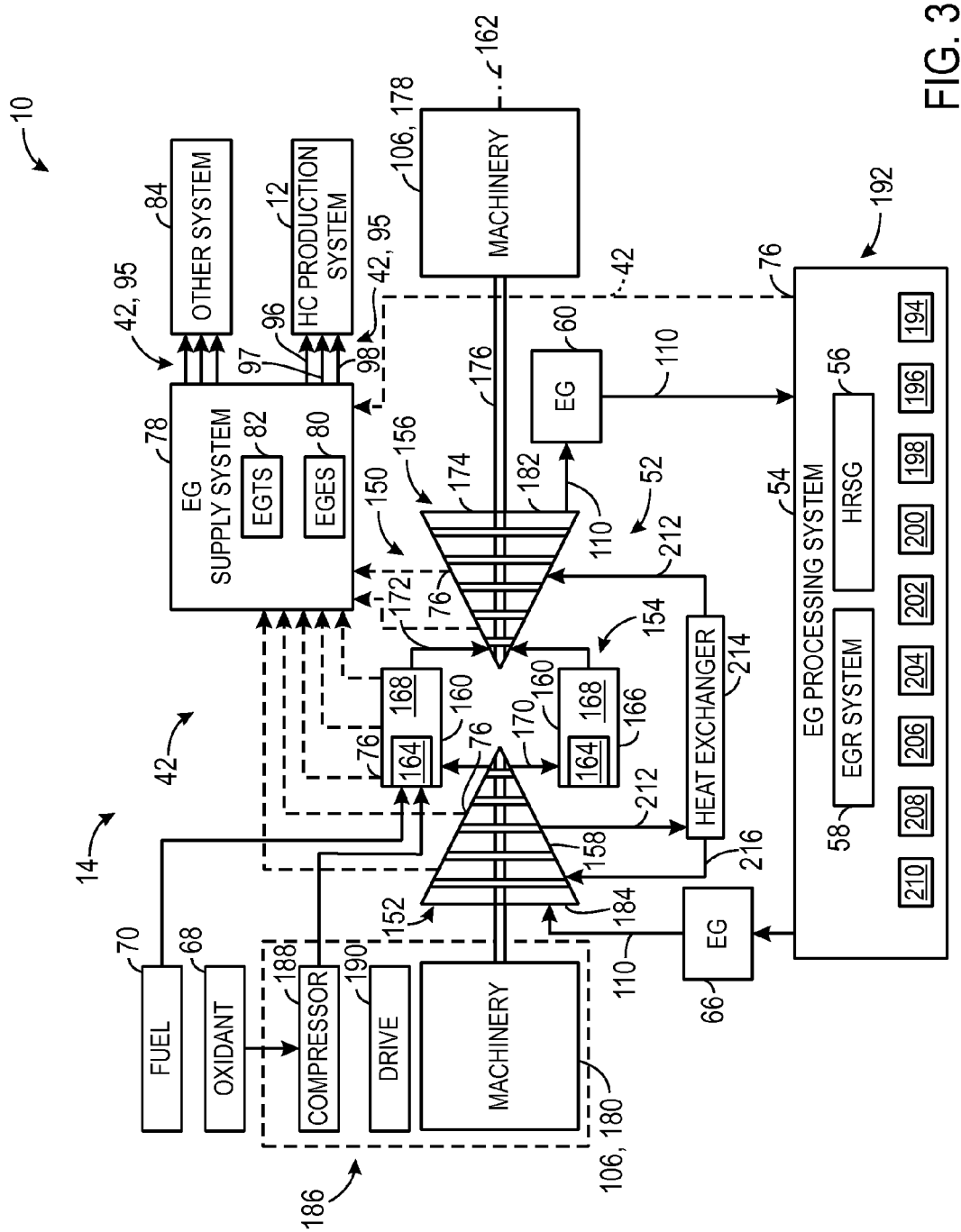
FIG. 3 is a diagram of an embodiment of the system of FIGS. 1 and 2, further illustrating details of a gas turbine engine, exhaust gas supply system, and exhaust gas processing system.

FIG. 3 is a diagram of embodiment of the system 10, further illustrating details of the SEGR gas turbine system 52 for use with the hydrocarbon production system 12 and/or other systems 84. In the illustrated embodiment, the SEGR gas turbine system 52 includes a gas turbine engine 150 coupled to the EG processing system 54. The illustrated gas turbine engine 150 includes a compressor section 152, a combustor section 154, and an expander section or turbine section 156. The compressor section 152 includes one or more exhaust gas compressors or compressor stages 158, such as 1 to 20 stages of rotary compressor blades disposed in a series arrangement. Likewise, the combustor section 154 includes one or more combustors 160, such as 1 to 20 combustors 160 distributed circumferentially about a rotational axis 162 of the SEGR gas turbine system 52. Furthermore, each combustor 160 may include one or more fuel nozzles 164 configured to inject the exhaust gas 66, the oxidant 68, and/or the fuel 70. For example, a head end portion 166 of each combustor 160 may house 1, 2, 3, 4, 5, 6, or more fuel nozzles 164, which may inject streams or mixtures of the exhaust gas 66, the oxidant 68, and/or the fuel 70 into a combustion portion 168 (e.g., combustion chamber) of the combustor 160.

The fuel nozzles 164 may include any combination of premix fuel nozzles 164 (e.g., configured to premix the oxidant 68 and fuel 70 for generation of an oxidant/fuel premix flame) and/or diffusion fuel nozzles 164 (e.g., configured to inject separate flows of the oxidant 68 and fuel 70 for generation of an oxidant/fuel diffusion flame). Embodiments of the premix fuel nozzles 164 may include swirl vanes, mixing chambers, or other features to internally mix the oxidant 68 and fuel 70 within the nozzles 164. The premix fuel nozzles 164 also may receive at least some partially mixed oxidant 68 and fuel 70. In certain embodiments, each diffusion fuel nozzle 164 may isolate flows of the oxidant 68 and the fuel 70 until the point of injection, while also isolating flows of one or more diluents (e.g., the exhaust gas 66, steam, nitrogen, or another inert gas) until the point of injection. In other embodiments, each diffusion fuel nozzle 164 may isolate flows of the oxidant 68 and the fuel 70 until the point of injection, while partially mixing one or more diluents (e.g., the exhaust gas 66, steam, nitrogen, or another inert gas) with the oxidant 68 and/or the fuel 70 prior to the point of injection. In addition, one or more diluents (e.g., the exhaust gas 66, steam, nitrogen, or another inert gas) may be injected into the combustor (e.g., into the hot products of combustion) either at or downstream from the combustion zone, thereby helping to reduce the temperature of the hot products of combustion and reduce emissions of $NO_X$ (e.g., NO and $NO_2$). Regardless of the type of fuel nozzle 164, the SEGR gas turbine system 52 may be controlled to provide substantially stoichiometric combustion of the oxidant 68 and fuel 70.

In operation, as illustrated, the compressor section 152 receives and compresses the exhaust gas 66 from the EG processing system 54, and outputs a compressed exhaust gas 170 to each of the combustors 160 in the combustor section 154. Upon combustion of the fuel 60, oxidant 68, and exhaust gas 170 within each combustor 160, additional exhaust gas or products of combustion 172 (i.e., combustion gas) is routed into the turbine section 156. Similar to the compressor section 152, the turbine section 156 includes one or more turbines or turbine stages 174, which may include a series of rotary turbine blades. These turbine blades are then driven by the products of combustion 172 generated in the combustor section 154, thereby driving rotation of a shaft 176 coupled to the machinery 106. Again, the machinery 106 may include a variety of equipment coupled to either end of the SEGR gas turbine system 52, such as machinery 106, 178 coupled to the turbine section 156 and/or machinery 106, 180 coupled to the compressor section 152. In certain embodiments, the machinery 106, 178, 180 may include one or more electrical generators, oxidant compressors for the oxidant 68, fuel pumps for the fuel 70, gear boxes, or additional drives (e.g. steam turbine 104, electrical motor, etc.) coupled to the SEGR gas turbine system 52. As illustrated, the turbine section 156 outputs the exhaust gas 60 to recirculate along the exhaust recirculation path 110 from an exhaust outlet 182 of the turbine section 156 to an exhaust inlet 184 into the compressor section 152. Along the exhaust recirculation path 110, the exhaust gas 60 passes through the EG processing system 54 (e.g., the HRSG 56 and/or the EGR system 58) as discussed in detail above.

Again, each combustor 160 in the combustor section 154 receives, mixes, and stoichiometrically combusts the compressed exhaust gas 170, the oxidant 68, and the fuel 70 to produce the additional exhaust gas or products of combustion 172 to drive the turbine section 156. In certain embodiments, the oxidant 68 is compressed by an oxidant compression system 186, such as a main air compression (MAC) system. The oxidant compression system 186 includes an oxidant compressor 188 coupled to a drive 190. For example, the drive 190 may include an electric motor, a combustion engine, or any combination thereof. In certain embodiments, the drive 190 may be a turbine engine, such as the gas turbine engine 150. Accordingly, the oxidant compression system 186 may be an integral part of the machinery 106. In other words, the compressor 188 may be directly or indirectly driven by the mechanical power 72 supplied by the shaft 176 of the gas turbine engine 150. In such an embodiment, the drive 190 may be excluded, because the compressor 188 relies on the power output from the turbine engine 150. However, in the illustrated embodiment, the oxidant compression system 186 is separate from the machinery 106. In either embodiment, the compression system 186 compresses and supplies the oxidant 68 to the fuel nozzles 164 and the combustors 160. As discussed in further detail below, the oxidant 68 and the fuel 70 may be supplied to the gas turbine engine 150 at locations specifically selected to facilitate isolation and extraction of the compressed exhaust gas 170 without any oxidant 68 or fuel 70 degrading the quality of the exhaust gas 170.

The EG supply system 78, as illustrated in FIG. 3, is disposed between the gas turbine engine 150 and the target systems (e.g., the hydrocarbon production system 12 and the other systems 84). In particular, the EG supply system 78, e.g., the EG extraction system (EGES) 80), may be coupled to the gas turbine engine 150 at one or more extraction points 76 along the compressor section 152, the combustor section 154, and/or the turbine section 156. For example, the extraction points 76 may be located between adjacent compressor stages, such as 2, 3, 4, 5, 6, 7, 8, 9, or 10 interstage extraction points 76 between compressor stages. Each of these interstage extraction points 76 provides a different temperature and pressure of the extracted exhaust gas 42. Similarly, the extraction points 76 may be located between adjacent turbine stages, such as 2, 3, 4, 5, 6, 7, 8, 9, or 10 interstage extraction points 76 between turbine stages. Each of these interstage extraction points 76 provides a different temperature and pressure of the extracted exhaust gas 42. By further example, the extraction points 76 may be located at a multitude of locations throughout the combustor section 154, which may provide different temperatures, pressures, flow rates, and gas compositions. Each of these extraction points 76 may include an EG extraction conduit, one or more valves, sensors, and controls, which may be used to selectively control the flow of the extracted exhaust gas 42 to the EG supply system 78.

The extracted exhaust gas 42, which is distributed by the EG supply system 78, has a controlled composition suitable for the target systems (e.g., the hydrocarbon production system 12 and the other systems 84). For example, at each of these extraction points 76, the exhaust gas 170 may be substantially isolated from injection points (or flows) of the oxidant 68 and the fuel 70. In other words, the EG supply system 78 may be specifically designed to extract the exhaust gas 170 from the gas turbine engine 150 without any added oxidant 68 or fuel 70. Furthermore, in view of the stoichiometric combustion in each of the combustors 160, the extracted exhaust gas 42 may be substantially free of oxygen and fuel. The EG supply system 78 may route the extracted exhaust gas 42 directly or indirectly to the hydrocarbon production system 12 and/or other systems 84 for use in various processes, such as enhanced oil recovery, carbon sequestration, storage, or transport to an offsite location. However, in certain embodiments, the EG supply system 78 includes the EG treatment system (EGTS) 82 for further treatment of the exhaust gas 42, prior to use with the target systems. For example, the EG treatment system 82 may purify and/or separate the exhaust gas 42 into one or more streams 95, such as the $CO_2$ rich, $N_2$ lean stream 96, the intermediate concentration $CO_2$, $N_2$ stream 97, and the $CO_2$ lean, $N_2$ rich stream 98. These treated exhaust gas streams 95 may be used individually, or in any combination, with the hydrocarbon production system 12 and the other systems 84 (e.g., the pipeline 86, the storage tank 88, and the carbon sequestration system 90).

Similar to the exhaust gas treatments performed in the EG supply system 78, the EG processing system 54 may include a plurality of exhaust gas (EG) treatment components 192, such as indicated by element numbers 194, 196, 198, 200, 202, 204, 206, 208, and 210. These EG treatment components 192 (e.g., 194 through 210) may be disposed along the exhaust recirculation path 110 in one or more series arrangements, parallel arrangements, or any combination of series and parallel arrangements. For example, the EG treatment components 192 (e.g., 194 through 210) may include any series and/or parallel arrangement, in any order, of: one or more heat exchangers (e.g., heat recovery units such as heat recovery steam generators, condensers, coolers, or heaters), catalyst systems (e.g., oxidation catalyst systems), particulate and/or water removal systems (e.g., inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, or any combination thereof. In certain embodiments, the catalyst systems may include an oxidation catalyst, a carbon monoxide reduction catalyst, a nitrogen oxides reduction catalyst, an aluminum oxide, a zirconium oxide, a silicone oxide, a titanium oxide, a platinum oxide, a palladium oxide, a cobalt oxide, or a mixed metal oxide, or a combination thereof. The disclosed embodiments are intended to include any and all permutations of the foregoing components 192 in series and parallel arrangements. As illustrated below, TABLE 1 depicts some non-limiting examples of arrangements of the components 192 along the exhaust recirculation path 110.

TABLE 1

| 194 | 196 | 198 | 200 | 202 | 204 | 206 | 208 | 210 |
|---|---|---|---|---|---|---|---|---|
| CU | HRU | BB | MRU | PRU | | | | |
| CU | HRU | HRU | BB | MRU | PRU | DIL | | |
| CU | HRSG | HRSG | BB | MRU | PRU | | | |
| OCU | HRU | OCU | HRU | OCU | BB | MRU | PRU | |
| HRU | HRU | BB | MRU | PRU | | | | |
| CU | CU | | | | | | | |
| HRSG | HRSG | BB | MRU | PRU | DIL | | | |
| OCU | OCU | | | | | | | |
| OCU | HRSG OCU | OCU | HRSG OCU | OCU | BB | MRU | PRU | DIL |
| OCU | HRSG ST | HRSG ST | BB | COND | INER | WFIL | CFIL | DIL |
| OCU HRSG ST | OCU HRSG ST | BB | COND | INER | FIL | DIL | | |
| OCU | HRSG ST | HRSG ST | OCU | BB | MRU HE COND | MRU WFIL | PRU INER | PRU FIL CFIL |
| CU | HRU COND | HRU COND | HRU COND | BB | MRU HE COND WFIL | PRU INER | PRU FIL CFIL | DIL |

As illustrated above in TABLE 1, a catalyst unit is represented by CU, an oxidation catalyst unit is represented by OCU, a booster blower is represented by BB, a heat exchanger is represented by HX, a heat recovery unit is represented by HRU, a heat recovery steam generator is represented by HRSG, a condenser is represented by COND, a steam turbine is represented by ST, a particulate removal unit is represented by PRU, a moisture removal unit is represented by MRU, a filter is represented by FIL, a coalescing filter is represented by CFIL, a water impermeable filter is represented by WFIL, an inertial separator is represented by INER, and a diluent supply system (e.g., steam, nitrogen, or other inert gas) is represented by DIL. Although TABLE 1 illustrates the components 192 in sequence from the exhaust outlet 182 of the turbine section 156 toward the exhaust inlet 184 of the compressor section 152, TABLE 1 is also intended to cover the reverse sequence of the illustrated components 192. In TABLE 1, any cell including two or more components is intended to cover an integrated unit with the components, a parallel arrangement of the components, or any combination thereof. Furthermore, in context of TABLE 1, the HRU, the HRSG, and the COND are examples of the HE; the HRSG is an example of the HRU; the COND, WFIL, and CFIL are examples of the WRU; the INER, FIL, WFIL, and CFIL are examples of the PRU; and the WFIL and CFIL are examples of the FIL. Again, TABLE 1 is not intended to exclude any non-illustrated permutations of the components 192. In certain embodiments, the illustrated components 192 (e.g., 194 through 210) may be partially or completed integrated within the HRSG 56, the EGR system 58, or any combination thereof. These EG treatment components 192 may enable feedback control of temperature, pressure, flow rate, and gas composition, while also removing moisture and particulates from the exhaust gas 60. Furthermore, the treated exhaust gas 60 may be extracted at one or more extraction points 76 for use in the EG supply system 78 and/or recirculated to the exhaust inlet 184 of the compressor section 152.

As the treated, recirculated exhaust gas 66 passes through the compressor section 152, the SEGR gas turbine system 52 may bleed off a portion of the compressed exhaust gas along one or more lines 212 (e.g., bleed conduits or bypass conduits). Each line 212 may route the exhaust gas into one or more heat exchangers 214 (e.g., cooling units), thereby cooling the exhaust gas for recirculation back into the SEGR gas turbine system 52. For example, after passing through the heat exchanger 214, a portion of the cooled exhaust gas may be routed to the turbine section 156 along line 212 for cooling and/or sealing of the turbine casing, turbine shrouds, bearings, and other components. In such an embodiment, the SEGR gas turbine system 52 does not route any oxidant 68 (or other potential contaminants) through the turbine section 156 for cooling and/or sealing purposes, and thus any leakage of the cooled exhaust gas will not contaminate the hot products of combustion (e.g., working exhaust gas) flowing through and driving the turbine stages of the turbine section 156. By further example, after passing through the heat exchanger 214, a portion of the cooled exhaust gas may be routed along line 216 (e.g., return conduit) to an upstream compressor stage of the compressor section 152, thereby improving the efficiency of compression by the compressor section 152. In such an embodiment, the heat exchanger 214 may be configured as an interstage cooling unit for the compressor section 152. In this manner, the cooled exhaust gas helps to increase the operational efficiency of the SEGR gas turbine system 52, while simultaneously helping to maintain the purity of the exhaust gas (e.g., substantially free of oxidant and fuel).

Figure 4:
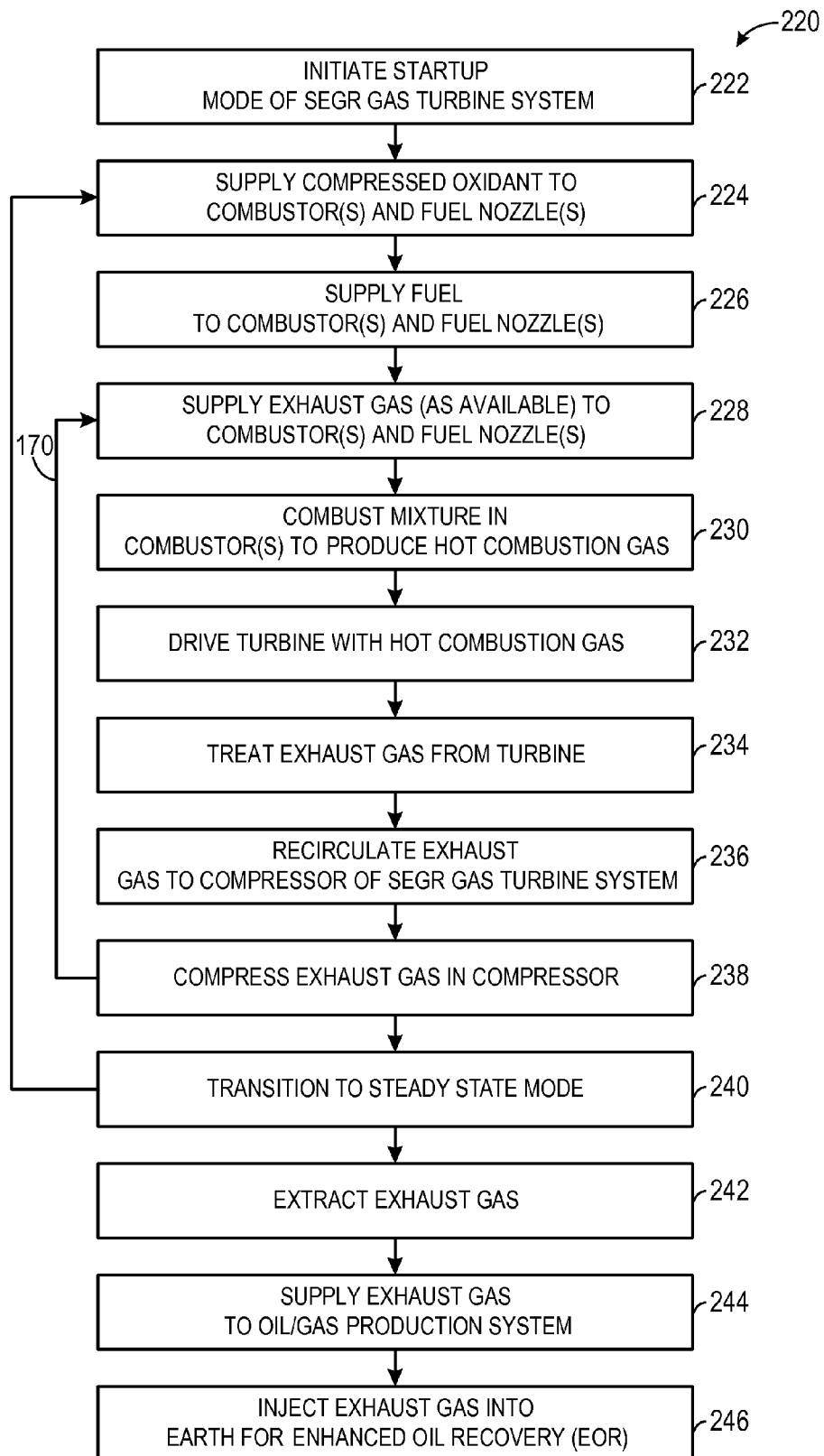
FIG. 4 is a flow chart of an embodiment of a process for operating the system of FIGS. 1-3.

FIG. 4 is a flow chart of an embodiment of an operational process 220 of the system 10 illustrated in FIGS. 1-3. In certain embodiments, the process 220 may be a computer implemented process, which accesses one or more instructions stored on the memory 122 and executes the instructions on the processor 120 of the controller 118 shown in FIG. 2. For example, each step in the process 220 may include instructions executable by the controller 118 of the control system 100 described with reference to FIG. 2.

The process 220 may begin by initiating a startup mode of the SEGR gas turbine system 52 of FIGS. 1-3, as indicated by block 222. For example, the startup mode may involve a gradual ramp up of the SEGR gas turbine system 52 to maintain thermal gradients, vibration, and clearance (e.g., between rotating and stationary parts) within acceptable thresholds. For example, during the startup mode 222, the process 220 may begin to supply a compressed oxidant 68 to the combustors 160 and the fuel nozzles 164 of the combustor section 154, as indicated by block 224. In certain embodiments, the compressed oxidant may include a compressed air, oxygen, oxygen-enriched air, oxygen-reduced air, oxygen-nitrogen mixtures, or any combination thereof. For example, the oxidant 68 may be compressed by the oxidant compression system 186 illustrated in FIG. 3. The process 220 also may begin to supply fuel to the combustors 160 and the fuel nozzles 164 during the startup mode 222, as indicated by block 226. During the startup mode 222, the process 220 also may begin to supply exhaust gas (as available) to the combustors 160 and the fuel nozzles 164, as indicated by block 228. For example, the fuel nozzles 164 may produce one or more diffusion flames, premix flames, or a combination of diffusion and premix flames. During the startup mode 222, the exhaust gas 60 being generated by the gas turbine engine 156 may be insufficient or unstable in quantity and/or quality. Accordingly, during the startup mode, the process 220 may supply the exhaust gas 66 from one or more storage units (e.g., storage tank 88), the pipeline 86, other SEGR gas turbine systems 52, or other exhaust gas sources.

The process 220 may then combust a mixture of the compressed oxidant, fuel, and exhaust gas in the combustors 160 to produce hot combustion gas 172, as indicated by block 230. In particular, the process 220 may be controlled by the control system 100 of FIG. 2 to facilitate stoichiometric combustion (e.g., stoichiometric diffusion combustion, premix combustion, or both) of the mixture in the combustors 160 of the combustor section 154. However, during the startup mode 222, it may be particularly difficult to maintain stoichiometric combustion of the mixture (and thus low levels of oxidant and unburnt fuel may be present in the hot combustion gas 172). As a result, in the startup mode 222, the hot combustion gas 172 may have greater amounts of residual oxidant 68 and/or fuel 70 than during a steady state mode as discussed in further detail below. For this reason, the process 220 may execute one or more control instructions to reduce or eliminate the residual oxidant 68 and/or fuel 70 in the hot combustion gas 172 during the startup mode.

The process 220 then drives the turbine section 156 with the hot combustion gas 172, as indicated by block 232. For example, the hot combustion gas 172 may drive one or more turbine stages 174 disposed within the turbine section 156. Downstream of the turbine section 156, the process 220 may treat the exhaust gas 60 from the final turbine stage 174, as indicated by block 234. For example, the exhaust gas treatment 234 may include filtration, catalytic reaction of any residual oxidant 68 and/or fuel 70, chemical treatment, heat recovery with the HRSG 56, and so forth. The process 220 may also recirculate at least some of the exhaust gas 60 back to the compressor section 152 of the SEGR gas turbine system 52, as indicated by block 236. For example, the exhaust gas recirculation 236 may involve passage through the exhaust recirculation path 110 having the EG processing system 54 as illustrated in FIGS. 1-3.

In turn, the recirculated exhaust gas 66 may be compressed in the compressor section 152, as indicated by block 238. For example, the SEGR gas turbine system 52 may sequentially compress the recirculated exhaust gas 66 in one or more compressor stages 158 of the compressor section 152. Subsequently, the compressed exhaust gas 170 may be supplied to the combustors 160 and fuel nozzles 164, as indicated by block 228. Steps 230, 232, 234, 236, and 238 may then repeat, until the process 220 eventually transitions to a steady state mode, as indicated by block 240. Upon the transition 240, the process 220 may continue to perform the steps 224 through 238, but may also begin to extract the exhaust gas 42 via the EG supply system 78, as indicated by block 242. For example, the exhaust gas 42 may be extracted from one or more extraction points 76 along the compressor section 152, the combustor section 154, and the turbine section 156 as indicated in FIG. 3. In turn, the process 220 may supply the extracted exhaust gas 42 from the EG supply system 78 to the hydrocarbon production system 12, as indicated by block 244. The hydrocarbon production system 12 may then inject the exhaust gas 42 into the earth 32 for enhanced oil recovery, as indicated by block 246. For example, the extracted exhaust gas 42 may be used by the exhaust gas injection EOR system 112 of the EOR system 18 illustrated in FIGS. 1-3.

Figure 5:
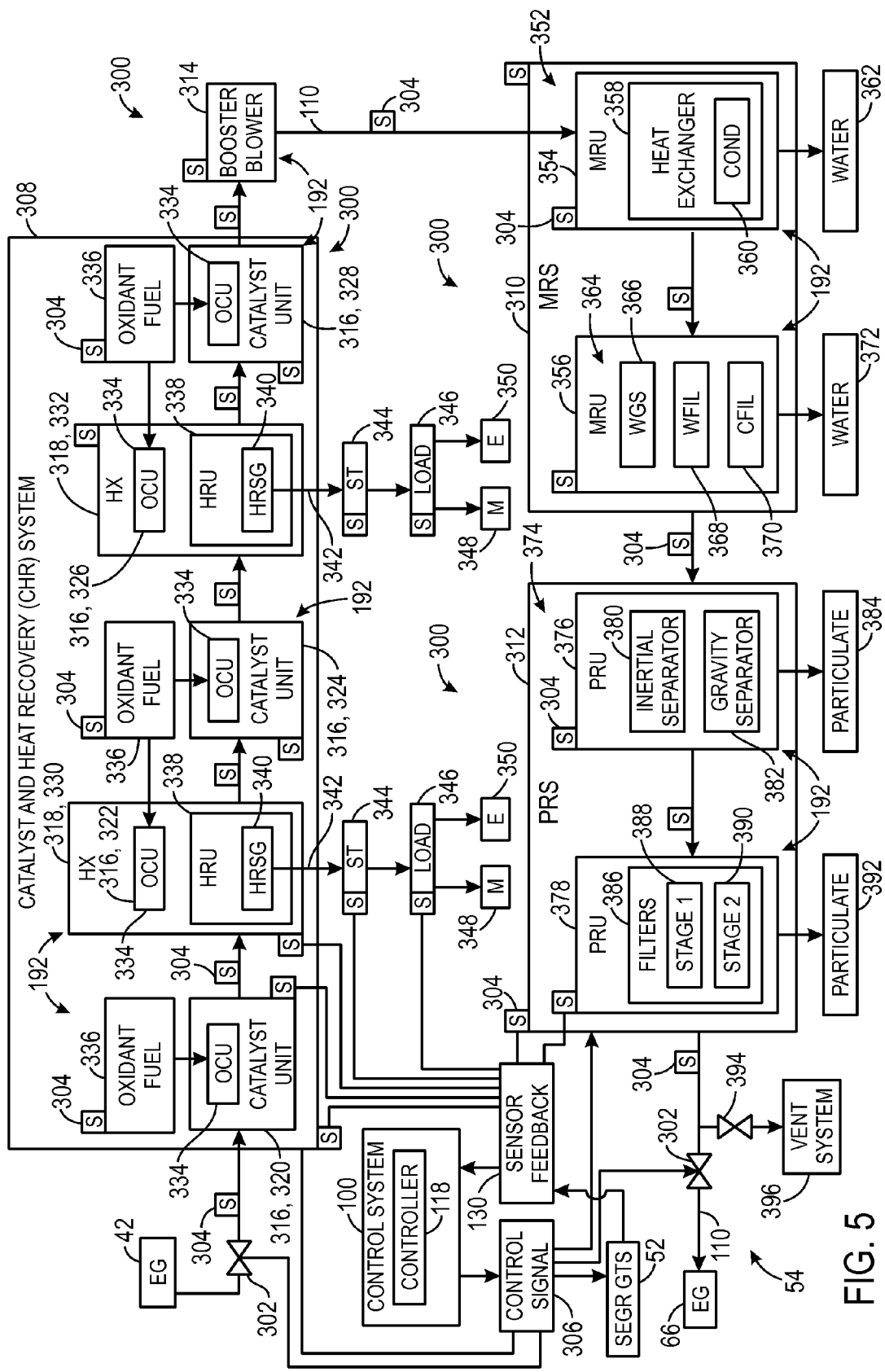
FIG. 5 is a diagram of an embodiment of the exhaust gas processing system of FIGS. 1-3.

FIG. 5 is a block diagram of an embodiment of the EG processing system 54 as illustrated in FIGS. 1-3. In the illustrated embodiment, the EG processing system 54 has the control system 100 coupled to a plurality of gas treatment subsystems 300, valves 302, and sensors (S) 304 distributed along the exhaust recirculation path 110. For example, each subsystem 300 and its components 192 may include one or more of the valves 302 and the sensors 304 disposed internally within, upstream, and/or downstream of the respective subsystem 300 or component 192. Although not illustrated in FIG. 5, one or more valves 302 may be located at or near the location of each sensor 304, thereby providing greater flow control through the EG processing system 54. In operation, the control system 100 may obtain sensor feedback 130 from the sensors 304 and provide control signals 306 to the valves 302, subsystems 300, and components 192 for control of the EG processing system 54. The sensor feedback 130 also may include various sensor feedback from the SEGR gas turbine system 52, the EG supply system 78, and other components of the turbine-based service system 14.

Each of the gas treatment subsystems 300 may include one or more components to control the temperature, pressure, gas composition, moisture content, particulate content, or any combination thereof. As illustrated in FIG. 5, the gas treatment subsystems 300 include a catalyst and heat recovery (CHR) system 308, a moisture removal system (MRS) 310, and a particulate removal system (PRS) 312. The gas treatment subsystems 300 also include one or more booster blowers 314 to help increase the flow and pressure of the exhaust gas 42 along the exhaust recirculation path 110. Although the CHR 308, the booster blower 314, the MRS 310, and the PRS 312 are arranged in series in the illustrated embodiment, other embodiments may rearrange these components in other series and/or parallel configurations.

The CHR system 308 includes one or more catalyst units 316 and heat exchangers (HX) 318 disposed in series, in parallel, or integrated with one another. For example, the CHR system 308 may include a series of catalysts units 316, such as catalyst units 320, 322, 324, 326, and 328. The CHR system 308 also may include a series of heat exchangers 318, such as heat exchangers 330 and 332. The catalyst units 316 may be the same or different from one another. For example, one or more of the catalyst units 316 may include an oxidation catalyst unit (OCU) 334, which uses an oxidant fuel 336 to drive an oxidizing reaction to convert carbon monoxide (CO) and unburnt hydrocarbons (HCs) into carbon dioxide ($CO_2$) and water vapor. One or more of the catalyst units 316 also may drive a reduction reaction, which converts nitrogen oxides ($NO_X$) into carbon dioxide ($CO_2$), nitrogen ($N_2$), and water. In the illustrated embodiment, the catalyst unit 320 is disposed upstream of the heat exchanger 330, the catalyst unit 322 is integrated within the heat exchanger 330, the catalyst unit 324 is disposed between the heat exchanger 330 and the heat exchanger 332, the catalyst unit 326 is integrated within the heat exchanger 332, and the catalyst unit 328 is disposed downstream from the heat exchanger 332. However, various embodiments of the CHR system 308 may exclude or include any one or more of the catalyst units 316, or the catalyst units 316 may be disposed in other arrangements within the CHR system 308.

The heat exchangers 318 are configured to transfer heat away from the exhaust gas 42 into one or more gases, liquids, or other fluids, such as water. In the illustrated embodiment, each heat exchanger 318 includes a heat recovery unit (HRU) 338, which is configured to recover heat from the exhaust gas 42 for use in one or more other applications. For example, the illustrated heat recovery units 338 each include a heat recovery steam generator (HRSG) 340, which is configured to recover heat from the exhaust gas 42 for the generation of steam 342. The steam 342 may be used in a variety of processes within the EG processing system 54, the EOR system 18, or elsewhere within the turbine-based service system 14. In the illustrated embodiment, each HRSG 340 supplies the steam 342 to one or more steam turbines (ST) 344, which may drive one or more loads 346 to generate mechanical power 348 and/or electrical power 350. For example, the loads 346 may include electrical generators, which enable the generation of electrical power 350. Although the CHR system 308 illustrates the catalyst units 316 and the heat exchangers 318 in a series arrangement, other embodiments of the CHR system 308 may arrange two or more of the catalyst units 316 and the heat exchangers 318 in a parallel arrangement. After the exhaust gas 42 passes through the CHR system 308, the exhaust gas 42 may then flow through one or more booster blowers 314 before passing through the moisture removal system 310 and the particular removal system 312.

The moisture removal system (MRS) 310 may include one or more moisture removal units (MRU) 352, such as MRUs 354 and 356. In the illustrated embodiment, the MRU 354 includes a heat exchanger 358, which may be configured to transfer heat away from the exhaust gas 42 into another gas, liquid, or other fluid, thereby cooling the exhaust gas 42 for moisture removal. For example, the heat exchanger 358 may include or be configured as a condenser 360, which functions to cool the exhaust gas 42 sufficiently to condense moisture in the exhaust gas 42 and remove the condensate as water 362. However, the MRU 354 may include a variety of cooling units (e.g., 2, 3, 4, or more condensers, chillers, etc.) to condense the moisture from the exhaust 42, thereby producing the water 362. The MRS 310 also may include other water removal technology, such as filtration units. For example, the MRU 356 may include one or more moisture removal separators or filters 364, such as a water gas separator (WGS) 366, a water impermeable filter (WFIL) 368, and a coalescing filter (CFIL) 370, which may capture and remove moisture from the exhaust gas 42 to produce an output of water 372. Although the MRS 310 illustrates the MRU 354 upstream from the MRU 356, other embodiments of the MRS 310 may position the MRU 356 upstream or parallel with the MRU 354. Furthermore, the MRS 310 may include additional moisture removal filters 364, heat exchangers 358, or any other moisture removal component. After the exhaust gas 42 is treated by the MRS 310 to remove moisture, the exhaust gas 42 may then pass through the particular removal system 312.

The particulate removal system (PRS) 312 may include one or more particulate removal units (PRU) 374, which may be arranged in series, in parallel, or any combination thereof. For example, the PRS 312 may include a PRU 376 and a PRU 378 disposed in a series arrangement. The PRU 376 may include an inertial separator 380, a gravity separator 382, or any other type of separation unit, or any combination thereof, thereby forcing a particulate 384 to separate from a flow of the exhaust gas 42. For example, the inertial separator 380 may include a centrifugal separator, which uses centrifugal force to drive the particulate 384 out of the flow of the exhaust gas 42. Similarly, the gravity separator 382 may use the force of gravity to drive the particulate 384 out of the flow of the exhaust gas 42. The PRU 378 may include one or more particulate removal filters 386, such as a first stage filter 388 and a second stage filter 390. These staged filters 388 and 390 may include progressively finer filter media, such as membrane filters. However, the staged filters 388 and 390 may include water impermeable filters (WFIL), coalescing filters (CFIL), membrane filters, or any combination thereof. As the exhaust gas 42 passes through the first and second stage filters 388 and 390, the filters 386 capture or remove a particulate 392 from the exhaust gas 42. Although the illustrated PRS 312 has the PRU 376 upstream of the PRU 378, other embodiments may position the PRU 378 upstream or parallel with the PRU 376. After the exhaust gas 42 is treated by the PRS 312, the exhaust gas 42 may then recirculate back into the SEGR gas turbine system 52, as indicated by arrow 110.

Along the exhaust recirculation path 110, the CHR system 308, the MRS 310, the PRS 312, and the booster blower 314 may be controlled by the control system 100 to adjust the temperature, pressure, flow rate, moisture level, particulate level, and gas composition of the exhaust gas 42 prior to entry back into the SEGR gas turbine system 52. For example, the control system 100 may receive the sensor feedback 130 from various sensors 304 disposed along the exhaust recirculation path 110, thereby providing feedback indicative of emissions (e.g. concentration levels) of oxygen, carbon monoxide, hydrogen, nitrogen oxides ($NO_X$), unburnt hydrocarbons (HCs), sulfur oxides ($SO_X$), moisture, or any combination thereof. In response to the sensor feedback 130, the control system 100 may adjust (e.g., increase, decrease, or maintain) the pressure, temperature, or flow rate of the exhaust gas 66, the oxidant 68, and the fuel 70 being delivered into the SEGR gas turbine system 52 for combustion. For example, the control system 100 may be responsive to the sensor feedback 130 to adjust the valves 302 along the exhaust recirculation path 110, inlet guide vanes within the compressor section 152 of the gas turbine engine 150, a vent valve 394 leading to a vent system 396, or any combination thereof, thereby adjusting the exhaust gas 42 flow into the combustor section 154 of the gas turbine engine 150.

In the CHR system 308, the control system 100 may be responsive to sensor feedback 130 to adjust the flow of oxidant fuel 336 into each of the catalyst units 316, thereby increasing or decreasing the oxidizing reaction within each catalyst unit 316 to change the gas composition of the exhaust gas 42 that recirculates back into the SEGR gas turbine system 52. For example, the control system 100 may increase the flow of oxidant fuel 336 to increase the oxidizing reaction within each UCU 334, thereby decreasing levels of carbon monoxide (CO) and unburnt hydrocarbons (HCs) and increasing levels of carbon dioxide ($CO_2$). The control system 100 also may reduce the flow of oxidant fuel 336 into each of the UCUs 334, thereby decreasing the levels of carbon dioxide ($CO_2$) and increasing levels of carbon monoxide (CO) and unburnt hydrocarbons (HCs). The control system 100 also may selectively increase or decrease the amount of exhaust gas flow through each of the catalyst units 316, by pass one or more of the catalyst units 316, or any combination thereof. The control system 100 also may selectively route the exhaust gas 42 through, partially bypassing, or completely bypassing, one or more of the heat exchangers 318, such as the heat recovery units 338. In this manner, the control system 100 may increase or decrease the temperature of the exhaust gas 42, while also increasing or decreasing the amount of steam generation for driving the steam turbines 344.

In the MRS 310 and the PRS 312, the control system 100 may be responsive to the sensor feedback 130 to ensure sufficient removal of moisture and particulate. For example, in response to sensor feedback 130 indicative of moisture content, the control system 100 may control the MRUs 352 within the MRS 310 to increase or decrease the moisture removal from the exhaust gas 42. In response to sensor feedback 130 indicative of particulate content, the control system 100 may adjust the PRUs 374 within the PRS 312, thereby increasing or decreasing the amount of particulate removal from the exhaust gas 42. Each of these control actions by the control system 100 may be based on feedback 130 from within the EG processing system 54, the SEGR gas turbine system 52, or elsewhere within the turbine-based service system 14. In certain embodiments, the control system 100 is configured to maintain a temperature, a pressure, and/or a flow rate of the exhaust gas 42 along the exhaust recirculation path 110 within a respective target range (e.g., a target temperature range, a target pressure range, and a target flow rate range) within, upstream, or downstream of each subsystem and/or component, such as the CHR system 308, the MRS 310, the PRS 312, or any of their components (e.g., catalyst units 316, heat exchangers 318, MRUs 352, PRUs 374, etc.). The control system 100 may be configured to maintain the temperature, the pressure, and/or the flow rate within such target ranges during various controlled changes in the SEGR gas turbine system 52, including changes in the flow rates of oxidant 68, fuel 70, and diluent to the fuel nozzles 164 and combustors 160.

Figure 6:
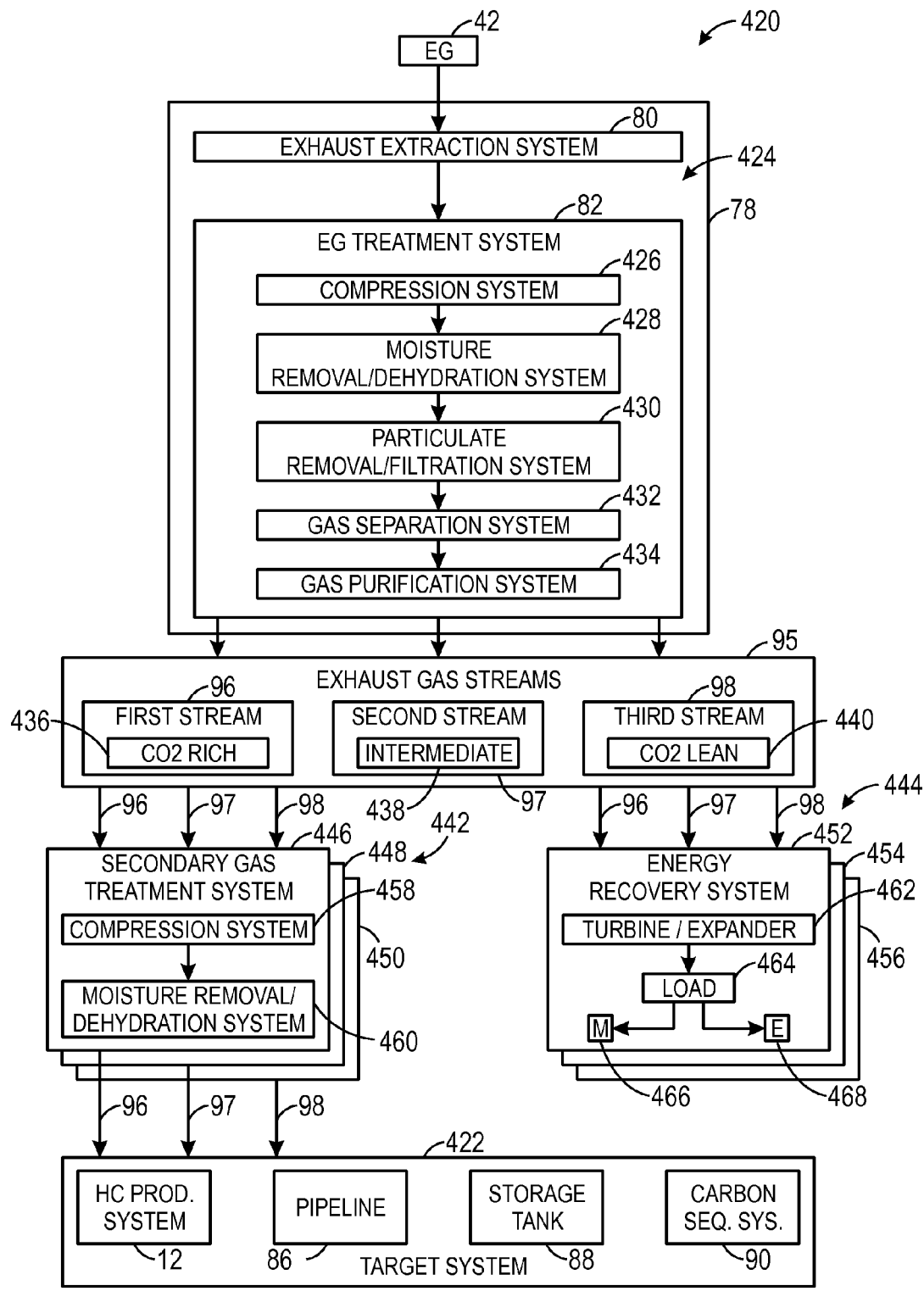
FIG. 6 is a diagram of an embodiment of the exhaust gas supply system of FIGS. 1-3.

FIG. 6 is a diagram of an embodiment of a system 420 having the EG supply system 78 extracting, treating, and delivering the exhaust gas streams 95 to various target system 422. As discussed above, the EG supply system 78 includes the exhaust extraction system 80 and the EG treatment system 82. The exhaust extraction system 80 receives the exhaust gas 42 from one or more extraction points 76 along the SEGR gas turbine system 52, the EG processing system 54, or any other location within the turbine-based service system 14. The EG treatment system 82 then treats the extracted exhaust gas 42 with a plurality of treatment subsystems 424, such as a compression system 426, a moisture removal/dehydration system 428, a particulate removal/filtration system 430, a gas separation system 432, and a gas purification system 434.

The illustrated treatment subsystems 424 may be disposed in series, in parallel, or any combination thereof. The compression system 426 may include one or more rotary compressors, reciprocating compressors, or any combination thereof, in one or more compression stages. The moisture removal/dehydration system 428 may include one or more heat exchangers, heat recovery units such as heat recovery steam generators, condensers, water gas separators such as centrifugal water gas separators, filters, desiccants or other dehydration media, or any combination thereof. The particulate removal/filtration system 430 may include one or more inertial separators, gravity separators, filters, or any combination thereof. For example, the filters may include membrane filters, water impermeable filters, coalescing filters, or any combination thereof. The gas separation system 432 may include one or more solvent based separation systems, which may include one or more absorbers, flash tanks, or any combination thereof. For example, the gas separation system 432 may be configured to separate carbon dioxide ($CO_2$) and/or nitrogen ($N_2$) from the exhaust gas 42. By further example, the gas separation system 432 may include a $CO_2/N_2$ separator and/or a carbon capture system. The gas purification system 432 also may include one or more solvent based gas purifiers, and may further reduce impurities within the separated gases (e.g., $CO_2$ and/or $N_2$) from the gas separation system 432. For example, any separated carbon dioxide ($CO_2$) may be further purified by the gas purification system 434, thereby increasing purity levels of the separated carbon dioxide ($CO_2$). Similarly, the gas purification system 434 may further purify the separated nitrogen ($N_2$), thereby removing any impurities in the separated nitrogen ($N_2$). In certain embodiments, the separated carbon dioxide and the separated nitrogen may have purity levels of at least approximately 70, 80, 90, 95, 96, 97, 98, 99, or greater percentage purity by volume. In certain embodiments, the gas separation system 432 may generate the multiple exhaust gas streams 95, such as the first stream 96, the second stream 97, and the third stream 98. For example, the first stream 96 may include a $CO_2$ rich stream 436, the second stream 97 may include an intermediate concentration stream 438, and the third stream 98 may include a $CO_2$ lean stream 440.

One or more of these exhaust gas streams 95 may then pass to one or more secondary gas treatment systems 442 and/or energy recovery systems 444. For example, the first stream 96 may pass to a secondary gas treatment system 446, the second stream 97 may pass to a secondary gas treatment system 448, and the third stream 98 may pass to a secondary gas treatment system 450. Similarly, the first stream 96 may pass to an energy recovery system 452, the second stream 97 may pass to an energy recovery system 454, and the third stream 98 may pass to an energy recovery system 456. Each of the secondary gas treatment system 442 may include a compression system 458, a moisture removal/dehydration system 460, or any other suitable treatment components. Again, the compression system 458 may include one or more rotary compressors, reciprocating compressors, or any combination thereof, disposed in a series or parallel arrangement. The moisture removal/dehydration system 460 may include water gas separators, condensers, filters, or any combination thereof, thereby removing any moisture remaining in the streams 96, 97, or 98 after compression by the compression system 458. Again, each of the streams 96, 97, and 98 may pass through its own dedicated secondary gas treatment system 442, or two or more of these streams may share a common secondary gas treatment system 442. After this secondary treatment in the system 442, the treated exhaust gas streams 96, 97, and 98 may then pass to one or more target systems 422, such as the hydrocarbon production system 12, the pipeline 86, the storage tank 88, and/or the carbon sequestration system 90. In other words, any one or more of the individual streams 96, 97, and 98 may be independently or collectively used by one or more of the target systems 422.

In the energy recovery systems 444, each of the streams 96, 97, and 98 may enable energy recovery in one or more turbines or expanders 462, which then drive one or more loads 464 to create mechanical power 466 and/or electrical power 468. For example, the load 464 may include one or more electrical generators to produce the electrical power 468. Again, each one of the streams 96, 97, and 98 may independently or collectively drive its own turbine or expander 462 in its own dedicated energy recovery system 452, 454, or 456. This recovered energy may be used to drive other equipment throughout the turbine-based service system 14.

Figure 7:
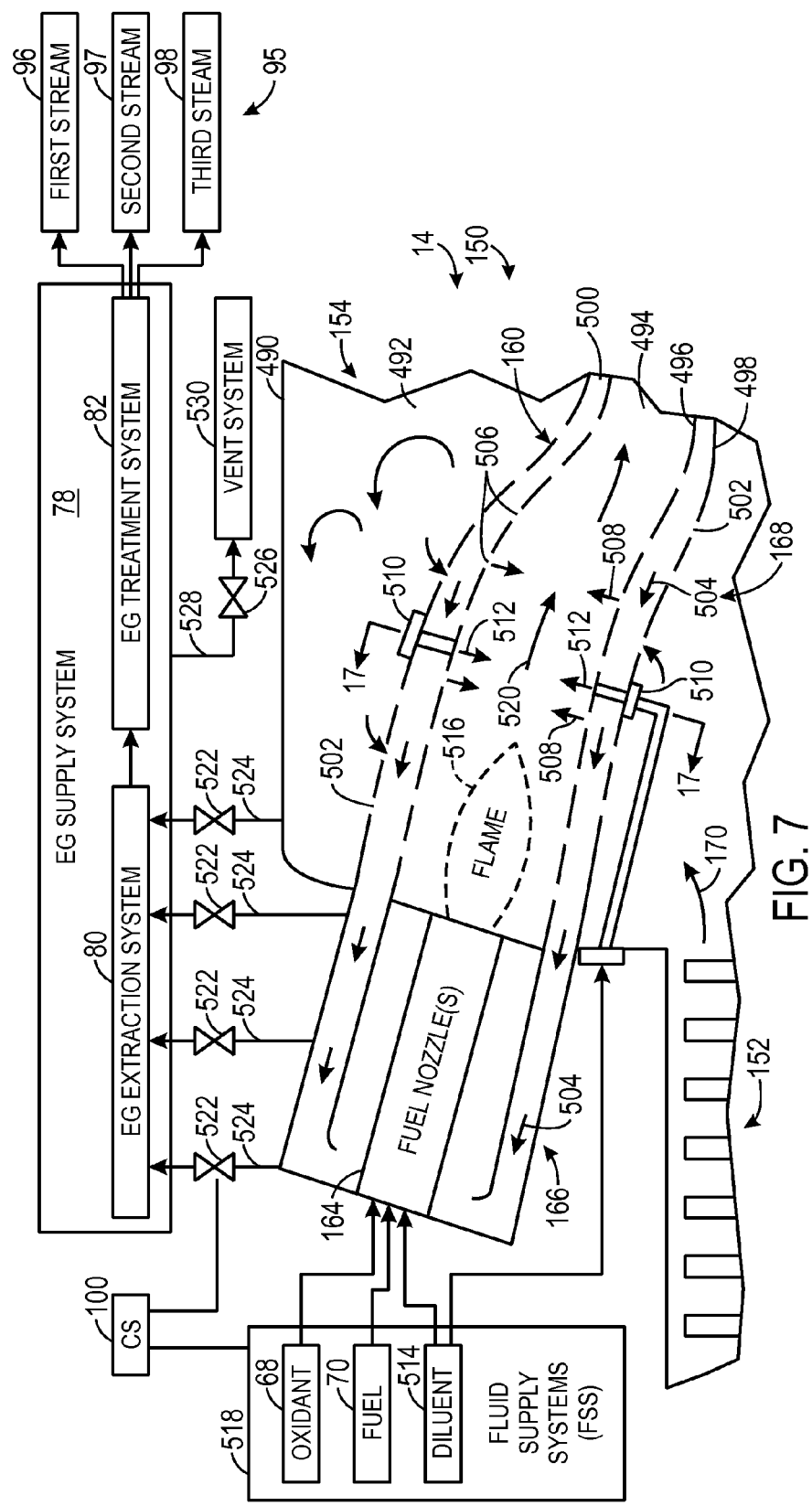
FIG. 7 is a diagram of an embodiment of the gas turbine engine of FIGS. 1-3, further illustrating details of the combustor, fuel nozzle, and flows of oxidant, fuel, and diluent.

FIG. 7 is a diagram of an embodiment of the combustor section 154 of the gas turbine engine 150. As illustrated, the combustor section 154 has a casing 490 disposed about one or more combustors 160, thereby defining a compressor discharge cavity 492 between the casing 490 and the combustor 160. Each combustor 160 includes the head end portion 166 and the combustion portion 168. The combustion portion 168 may include a chamber 494, a first wall or liner 496 disposed about the chamber 494, and a second wall or flow sleeve 498 disposed at an offset around the first wall 496. For example, the first and second walls 496 and 498 may be generally coaxial with one another to define a hollow circumferential space or flow passage 500 leading from the combustion portion 168 to the head end portion 166. The second wall or flow sleeve 498 may include a plurality of openings or perforations 502, which enables the compressed exhaust gas 170 from the compressor section 152 to enter into the flow passage 500. The exhaust gas 170 then flows through the passage 500 along the liner 496 toward the head end portion 166 as indicated by arrows 504, thereby cooling the liner 496 as the exhaust gas 170 flows toward the head end portion 166 for delivery into the chamber 494 (e.g. through one or more fuel nozzles 164).

In certain embodiments, the liner 496 also may include one or more openings or perforations 506, thereby enabling injection of a portion of the exhaust gas 170 directly into the chamber 494 as indicated by arrows 508. For example, the exhaust gas injection 508 may serve as a diluent injection, which may be configured to control the temperature, pressure, flow rate, gas composition (e.g., emissions levels), or any combination thereof, within the chamber 494. In particular, the exhaust gas injection 508 may help to control the temperature within the chamber 494, such that emissions of nitrogen oxides ($NO_X$) may be substantially reduced in the hot products of combustion. One or more additional diluents, such as nitrogen, steam, other inert gases, or additional exhaust gas, may be injected through one or more diluent injectors 510, as indicated by arrows 512. Together, the exhaust gas injection 508 and diluent injection 512 may be controlled to adjust the temperature, concentration levels of emissions, or other characteristics of the hot combustion gases flowing through the chamber 494.

In the head end portion 166, one or more fuel nozzles 164 may route the exhaust gas 170, the oxidant 68, the fuel 70, and one or more diluents 514 (e.g., exhaust gas, steam, nitrogen, other inert gases, or any combination thereof) into the chamber 494 for combustion. For example, each combustor 160 may include 1, 2, 3, 4, 5, 6, 7, 8, or more fuel nozzles 164, each configured as a diffusion fuel nozzle and/or a premix fuel nozzle. For example, each fuel nozzle 164 may deliver the oxidant 68, the fuel 70, the diluents 514, and/or the exhaust gas 170 as premixed or independent streams into the chamber 494, thereby generating a flame 516. The premixed streams of oxidant 68 and fuel 70 result in a premix flame, whereas separate streams of oxidant 68 and fuel 70 result in a diffusion flame.

The control system 100 is coupled to one or more fluid supply systems 518, which control the pressure, temperature, flow rate, and/or mixtures of the oxidant 68, the fuel 70, the diluents 514, and/or the exhaust gas 170. For example, the control system 100 may independently control flows of the oxidant 68, the fuel 70, the diluents 514, and/or the exhaust gas 170 in order to control the equivalence ratio, emissions levels (e.g. carbon monoxide, nitrogen oxides, sulfur oxides, unburnt hydrocarbons, hydrogen, and/or oxygen), power output, or any combination thereof. In operation, the control system 100 may control the fluid supply systems 518 to increase the flows of oxidant 68 and fuel 70 while maintaining substantially stoichiometric combustion, or the control system 100 may control the fluid supply systems 518 to decrease the flows of oxidant 68 and fuel 70 while maintaining substantially stoichiometric combustion. The control system 100 may perform each of these increases or decreases in flow rates of the oxidant 68 and the fuel 70 in incremental steps (e.g., 1, 2, 3, 4, 5, or more steps), continuously, or any combination thereof. Furthermore, the control system 100 may control the fluid supply systems 518 to increase or decrease the flows of oxidant 68 and fuel 70 in order to provide a fuel rich mixture, a fuel lean mixture, or any other mixture of the oxidant 68 and the fuel 70, into the chamber 494, thereby creating hot products of combustion or exhaust gas 520 with a low oxygen concentration, a high oxygen concentration, or any other suitable concentration of oxygen, unburnt hydrocarbons, carbon monoxide, nitrogen oxides, sulfur oxides, and so forth. While controlling the flows of oxidant 68 and fuel 70, the control system 100 also may control the fluid supply system 518 to increase or decrease flow of the diluents 514 (e.g., steam, exhaust gas, nitrogen, or any other inert gas), thereby helping to control the temperature, pressure, flow rate, and/or gas composition (e.g., emissions levels) of the hot products of combustion 520 passing through the chamber 494 toward the turbine section 156.

The control system 100 also may control the EG supply system 78, including the EG extraction system 80 and the EG treatment system 82. For example, the control system 100 may selectively open or close one or more valves 522 disposed along extraction lines 524 between the combustor section 154 and the EG extraction system 80. The control system 100 may selectively open or close these valves 522 to increase or decrease the flow of exhaust gas 42 to the EG extraction system 80, while also selectively extracting the exhaust gas from different locations resulting in different temperatures and/or pressures of the exhaust gas being delivered to the EG extraction system 80. The control system 100 also may control one or more valves 526 disposed along lines 528 leading to a vent system 530. For example, the control system 100 may selectively open the valve 526 to vent a portion of the exhaust gas through the vent system 530 into the atmosphere, thereby reducing the pressure in the EG supply system 78.

Figure 8:
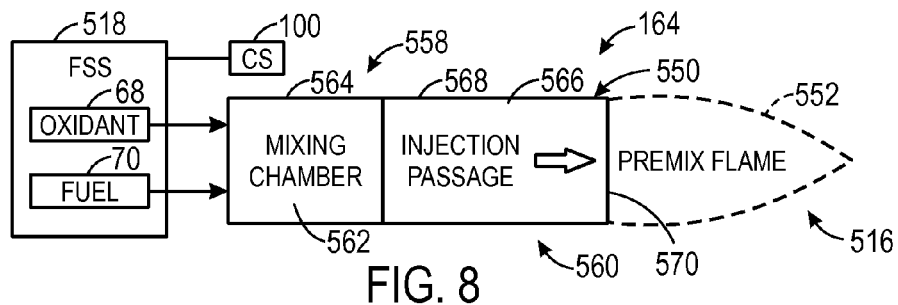
FIG. 8 is a diagram of an embodiment of the fuel nozzle of FIG. 7, illustrating a premix fuel nozzle configuration.
Figure 9:
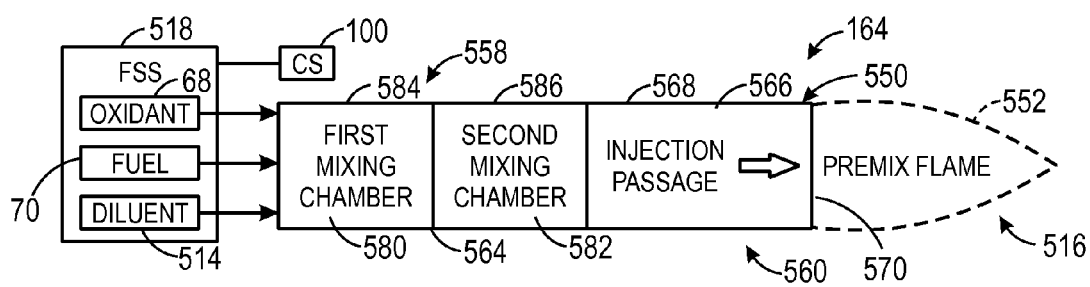
FIG. 9 is a diagram of an embodiment of the fuel nozzle of FIG. 7, illustrating a premix fuel nozzle configuration.
Figure 10:
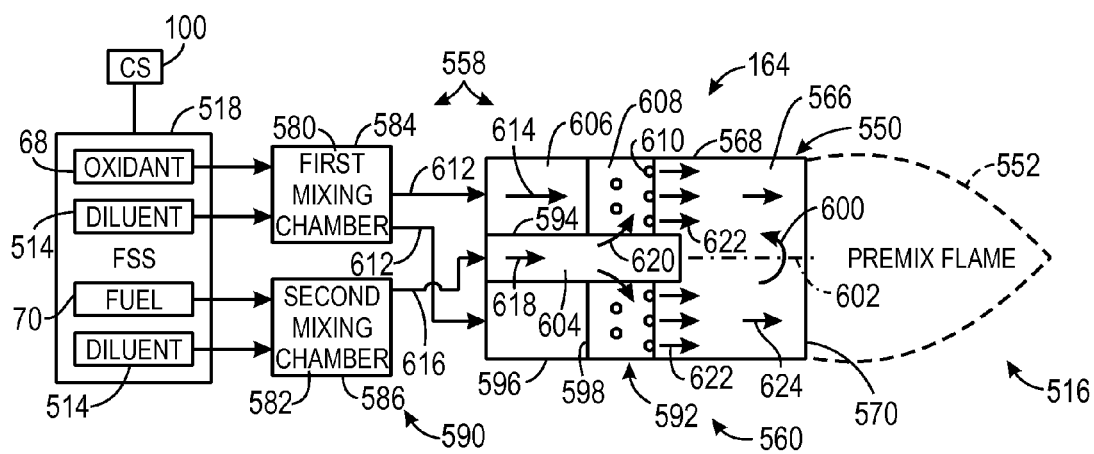
FIG. 10 is a diagram of an embodiment of the fuel nozzle of FIG. 7, illustrating a premix fuel nozzle configuration.

As discussed above, each combustor 160 in the combustor section 154 may include one or more fuel nozzles 164, which may be configured as premix fuel nozzles and/or diffusion fuel nozzles. For example, FIGS. 8, 9, and 10 illustrate embodiments of the fuel nozzle 164 configured as a premix fuel nozzle 550 operable to generate a premix flame 516, 552, whereas FIGS. 11-16 illustrate embodiments of the fuel nozzle 164 configured as a diffusion fuel nozzle 554 operable to generate a diffusion flame 516, 556. These fuel nozzles 550 and 554 may be used alone or in any combination with one another in each of the combustors 160, as discussed in further detail below with reference to FIG. 17. For example, each combustor 160 may include only premix fuel nozzles 550, only diffusion fuel nozzles 554, or any combination of both premix fuel nozzles 550 and diffusion fuel nozzles 554.

The premix fuel nozzles 550 may have a variety of configurations to completely or partially premix the oxidant 68 and the fuel 70, while also optionally premixing one or more diluents 514 such as the exhaust gas 170, steam, nitrogen, or any other suitable inert gas. FIG. 8 is a diagram of an embodiment of the premix fuel nozzle 550 having a mixing portion 558 coupled to an injection portion 560. The mixing portion 558 includes at least one mixing chamber 562 surrounded by at least one enclosure 564, while the injection portion 560 includes at least one injection passage 566 surrounded by at least one conduit 568. For example, the enclosure 564 of the mixing portion 558 may include one or more conduits, injection holes, swirl vanes, flow interruptions, or other structures to facilitate mixing between the oxidant 68 and the fuel 70. The mixing portion 558 also may receive one or more flows of the diluents 514, such as exhaust gas 170, steam, nitrogen, or another inert gas, thereby mixing the diluent 514 along with the oxidant 68 and the fuel 70. Once the oxidant 68 and the fuel 70 are sufficiently mixed within the mixing chamber 562, the premix fuel nozzle 550 routes the fuel oxidant mixture through the injection passage 566 to at least one injection outlet 570. The exiting mixture of oxidant 68 and fuel 70 (and optionally one or more diluents 514) may then ignite to create the premix flame 552. In certain embodiments, the control system 100 may selectively control the fluid supply system 518 to increase or decrease flows of the oxidant 68 and the fuel 70 (and optionally one or more diluents 514), thereby adjusting the equivalence ratio, emissions levels generated by the premix flame 552, power output of the gas turbine engine 150, or any combination thereof. In certain embodiments, the illustrated premix fuel nozzle 550 may not premix any diluent with the oxidant 68 and fuel 70, but rather one or more diluents (e.g., exhaust gas, steam, nitrogen, or another inert gas) may be provided after the point of combustion and/or downstream from the premix flame 552. In this manner, the flows of oxidant 68 and fuel 70 may be independently controlled to provide a more precise control of the fuel/oxidant ratio, thereby helping to achieve stoichiometric combustion for improved flame stability while also using the downstream diluents for control of the temperature and emissions (e.g., $NO_X$ emissions).

FIG. 9 is a diagram of an embodiment of the premix fuel nozzle 550 having a multi-stage configuration of the mixing portion 558. As illustrated, the mixing portion 558 includes first and second mixing chambers 580 and 582, which are defined by first and second enclosure portions 584 and 586 of the enclosure 564. The first and second mixing chamber 580 and 582 are illustrated in a series configuration, although other embodiments of the mixing portion 558 may arrange the first and second mixing chambers 580 and 582 in a parallel configuration. The mixing portion 558 also may include additional mixing chambers in combination with the first and second mixing chambers 580 and 582. For example, the mixing portion 558 may include 1, 2, 3, 4, 5, 6, 7, 8, 9, 10, or more mixing chambers in a series configuration, a parallel configuration, or a combination thereof. Each mixing chamber 580 and 582 may include one or more mixing devices, such as swirl vanes, flow interruptions, tortuous pathways, passages with increasing and decreasing diameters, or any combination thereof. In operation, the mixing portion 558 receives one or more flows of the oxidant 68, the fuel 70, and one or more diluents 514 from the fluid supply system 518. Again, the diluents 514 may include the exhaust gas 170, steam, nitrogen, or one or more other inert gases. Each mixing chamber 580 and 582 may receive and mix two or more different fluids from the fluid supply system 518. For example, the first mixing chamber 580 may receive and mix one or more streams of the oxidant 68 and the fuel 70, while the second mixing chamber 582 may receive and mix one or more streams of the oxidant 68 and the diluents 514 or the fuel 70 and the diluents 514. In other words, the first and second mixing chambers 580 and 582 may receive and mix two or more of the same fluid streams, or two or more different fluid streams from the fluid supply system 518. In this manner, the first and second mixing chambers 580 and 582 may sequentially mix the various fluids from the fluid supply system 518, and then direct the mixture into the injection passage 566 for delivery into the chamber 494 of the combustor 160. As the mixture of oxidant 68, fuel 70, and one or more diluents 514 flows through the injection outlet 570 of the injection passage 566, the mixture ignites and forms the premix flame 552. Again, the control system 100 may selectively control the fluid supply system 518 to increase, decrease, or maintain flows of the oxidant 68, the fuel 70, and one or more diluents 514, thereby adjusting the equivalence ratio, emissions levels, power output of the gas turbine engine 150, or any combination thereof.

FIG. 10 is a diagram of an embodiment of the premix fuel nozzle 550 having a staged mixing portion 558 with a parallel mixing section 590 in series with a swirling section 592. The parallel mixing section 590 includes the first and second mixing chambers 580 and 582 as discussed above with reference to FIG. 9, wherein the first and second mixing chambers 580 and 582 are disposed parallel with one another upstream from the swirling section 592. The swirling section 592 includes an inner conduit or hub 594, an outer conduit 596 disposed about the inner conduit 594, and a plurality of swirl vanes 598 extending radially between the inner conduit 594 and the outer conduit 596. Each of the swirl vanes 598 may be angled or curved to force the fluid flow to swirl in a circumferential direction 600 about a longitudinal axis 602 of the premix fuel nozzle 550. The inner conduit 594 defines an inner passage 604, the outer conduit 596 defines an outer passage 606, and each swirl vane 598 defines a radial passage 608. One or more of the swirl vanes 598 also include a plurality of injection ports 610, which may be disposed directly on or upstream from a trailing edge of each swirl vane 598.

In the illustrated embodiment, the fluid supply system 518 routes one or more flows of the oxidant 68 and the diluent 514 into the first mixing chamber 580, while also delivering one or more flows of the fuel 70 and the diluent 514 into the second mixing chamber 582. The first mixing chamber 580 substantially mixes the flows of oxidant 68 and diluent 514, and then routes the mixture into the outer passage 606 between the inner and outer conduits 594 and 596 as indicated by arrows 612. The mixture 614 of oxidant 68 and diluent 514 then flows toward the plurality of swirl vanes 598 in the swirling section 592, where the swirl vanes 598 force the mixture 614 to swirl about the axis 602 as indicated by arrow 600.

Simultaneously, the second mixing chamber 582 routes a premixed flow of the fuel 70 and the diluent 514 into the inner passage 604 defined by the inner conduit 594 as indicated by arrow 616. The mixture 618 of fuel 70 and diluent 514 then flows lengthwise along the inner passage 604, and then turns radially into the plurality of swirl vanes 598 as indicated by arrows 620. Upon reaching the plurality of injection ports 610, the mixture 618 of fuel 70 and diluent 514 then passes through the injection ports 610 into the outer passage 606 as indicated by arrows 622. The two mixtures (i.e., the premixed oxidant and diluent flow 614 and the premixed fuel and diluent flow 622) then further mix within the injection passage 566 as indicated by arrows 624. The mixture 624 of oxidant 68, fuel 70, and diluent 514 then exits the premix fuel nozzle 550 through the injection outlet 570, and subsequently ignites to form the premix flame 552. Again, the control system 100 may selectively control the fluid supply system 518 to independently control flows of the oxidant 68, the fuel 70, and the diluent 514, thereby increasing, decreasing, or maintaining the equivalence ratio, emissions levels, power output, or any combination thereof, of the gas turbine engine 150.

Figure 11:
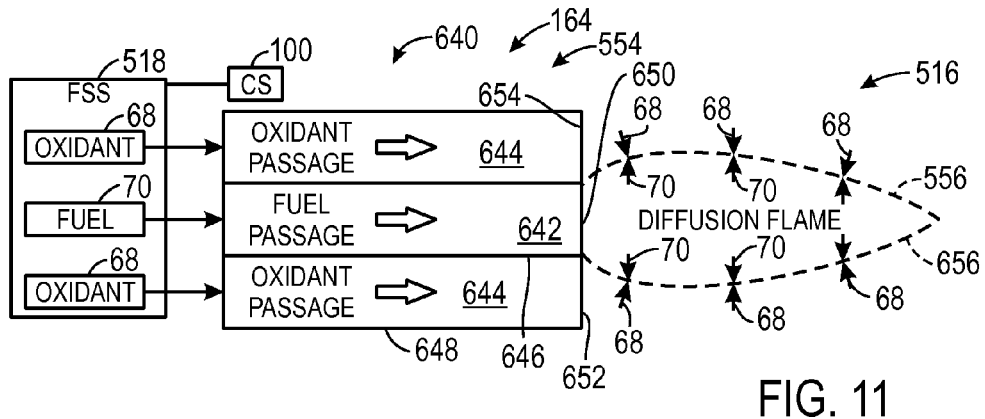
FIG. 11 is a diagram of an embodiment of the fuel nozzle of FIG. 7, illustrating a diffusion fuel nozzle configuration.

FIG. 11 is a diagram of an embodiment of the diffusion fuel nozzle 554 having a plurality of independent passages 640 for delivery of the oxidant 68 and the fuel 70 into the chamber 494 of the combustor 160. The independent passages 640 may include a plurality of concentric annular passages, a central passage surrounded by a plurality of peripheral passages, or any combination thereof. In the illustrated embodiment, the independent passages 640 include one or more fuel passages 642 and one or more oxidant passages 644. For example, the illustrated fuel passage 642 is a central fuel passage surrounded by an inner conduit 646, while the one or more outer oxidant passages 644 are outer oxidant passages disposed between the inner conduit 646 and an outer conduit or structure 648. By further example, the oxidant passage 644 may include a single annular oxidant passage or a plurality of discrete oxidant passages disposed circumferentially about the fuel passage 642 between the inner and outer conduits 646 and 648. In these embodiments, the oxidant and fuel passages 642 and 644 remain isolated from one another along a full length of the diffusion fuel nozzle 554. The inner and outer conduits 646 and 648 may function as isolation walls, which maintain the separation between the oxidant 68 and fuel 70. The fuel passage 642 terminates at a fuel outlet 650 and the one or more oxidant passages 644 terminate at one or more oxidant outlet 652. These fuel and oxidant outlets 650 and 652 may be disposed along a common plane or downstream end 654 of the diffusion fuel nozzle 554, thereby delaying mixing of the oxidant 68 and the fuel 70 until after injection from the fuel nozzle 554 into the chamber 494 of the combustor 160.

As the oxidant 68 and the fuel 70 mix or diffuse with one another in the chamber 494, the diffusion flame 556 forms as indicated by an outline or border 656. The outline 656 may represent a diffusion wall or flame wall, where the oxidant 68 and the fuel 70 mix and combust in a substantially stoichiometric manner (e.g., substantially stoichiometric combustion). In other words, the outline or border 656 may represent a stable flame wall of the diffusion flame 556, wherein the equivalence ratio is approximately 1.0 or between approximately 0.95 to 1.05. Similar to the premix fuel nozzles 550 discussed above with reference to FIGS. 8-10, the diffusion fuel nozzle 554 may be controlled by the control system 100 to vary the equivalence ratio, exhaust emissions, power output of the gas turbine engine 150, or any combination thereof. For example, the illustrated control system 100 selectively controls the fluid supply system 518 to increase, decrease, or maintain flows of the oxidant 68 and the fuel 70 in response to the sensor feedback 130.

Figure 12:
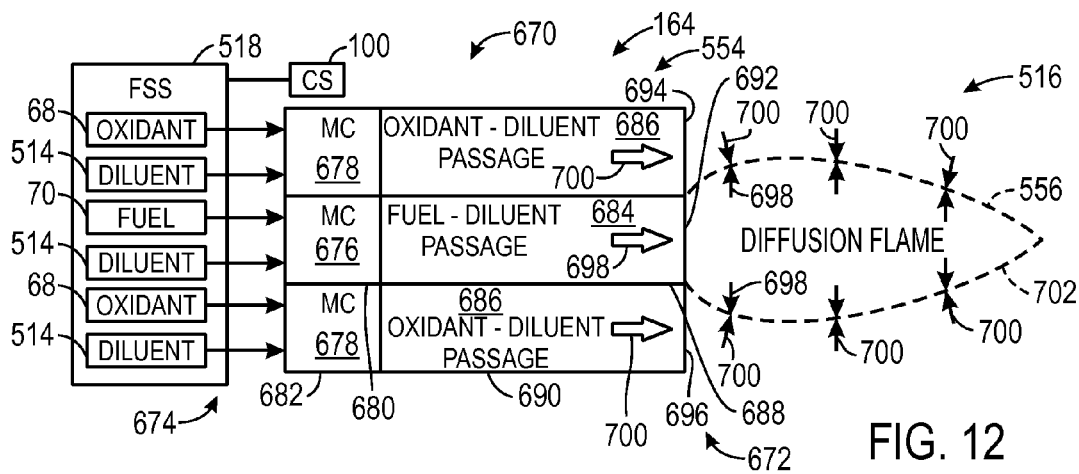
FIG. 12 is a diagram of an embodiment of the fuel nozzle of FIG. 7, illustrating a diffusion fuel nozzle configuration.

FIG. 12 is a diagram of an embodiment of the diffusion fuel nozzle 554 having a plurality of independent passages 670 with an injection portion 672 and a mixing portion 674. The mixing portion 674 may include one or more inner mixing chambers 676 and one or more outer mixing chambers 678. For example, the inner mixing chambers 676 may be fuel/diluent mixing chambers, which are configured to mix one or more streams of the fuel 70 and the diluent 514. The outer mixing chambers 676 may include one or more oxidant/diluent mixing chambers, which are configured to mix one or more streams of the oxidant 68 and the diluent 514. Each of these mixing chambers may include a surrounding structure, such as an outer enclosure or conduit. For example, the mixing chambers 676 may be surrounded by an inner conduit or enclosure 680, while the mixing chambers 678 may be surrounded by an outer conduit or enclosure 682. In certain embodiments, the mixing chamber 678 may be enclosed between the inner and outer conduits 680 and 682.

Similarly, the injection portion 672 includes one or more fuel-diluent passages 684 and one or more oxidant-diluent passages 686. Each fuel-diluent passage 684 is fluidly coupled to one or more of the mixing chambers 678, while each of the oxidant-diluent passages 686 is fluidly coupled to one or more of the mixing chambers 678. The fuel-diluent passage 684 may be surrounded by an inner conduit 688, while the one or more oxidant-diluent passages 686 may be surrounded by an outer conduit 690. For example, the illustrated fuel-diluent passage 684 may be a central fuel-diluent passage 684, which is surrounded by one or more outer oxidant-diluent passages 686. For example, the inner and outer conduits 688 and 690 may be concentric annular conduits, which define the passages 684 and 686 in a coaxial or concentric annular arrangement. However, the fuel-diluent passage 684 may represent a single central passage or a plurality of separate passages disposed within the inner conduit 688. Likewise, the oxidant-diluent passages 686 may represent a single annular passage or a plurality of discrete passages spaced apart from one another circumferentially around the fuel-diluent passage 684, while remaining isolated from one another by the inner and outer conduits 688 and 690. In certain embodiments, the inner conduits 680 and 688 form a single continuous inner conduit, and the outer conduits 682 and 690 form a single continuous outer conduit.

In operation, the control system 100 selectively controls the fluid supply system 518 to increase, decrease, or maintain flows of the fuel 70 and the diluent 514 into the mixing chamber 676, which mixes the fuel 70 and diluent 514 before passing the mixture into the fuel-diluent passage 684. Similarly, the control system 100 selectively controls the fluid supply system 518 to increase, decrease, or maintain flows of the oxidant 68 and the diluent 514 into the one or more mixing chambers 678, which mix the oxidant 68 and the diluent 514 before delivering the mixture into the one or more oxidant-diluent passages 686. The diffusion fuel nozzle 554 then separately flows the fuel-diluent mixture 698 along the passage 684 to an outlet 692, while simultaneously flowing the oxidant-diluent mixture 700 along the passages 686 to one or more outlets 694. Similar to the embodiment of FIG. 11, the outlets 692 and 694 may be arranged along a common plane or downstream end 696 of the diffusion fuel nozzle 554, thereby maintaining isolation between the oxidant-diluent mixture 700 in the passage 686 and the fuel-diluent mixture 698 in the passage 684. This isolation delays mixing between the oxidant 68 and the fuel 70 until downstream of the common plane 696.

As the fuel-diluent mixture 698 and the oxidant-diluent mixture 700 flow from the diffusion fuel nozzle 554 into the chamber 494 of the combustor 160, the mixtures 698 and 700 generally diffuse with one another and combust along an outline or border 702, which may define a diffusion wall or flame wall of the diffusion flame 556. Again, the control system 100 may selectively control the fluid supply system 518 to independently control flows of the oxidant 68, the fuel 70, and the diluent 514 to each of the mixing chambers 676 and 678, thereby controlling mixing within each of the mixing chambers 676 and 678 while also controlling the diffusion and combustion within the chamber 494 of the combustor 160. For example, the control system 100 may selectively control the fluid supply system 518 to adjust the ratio of the oxidant 68 relative to the fuel 70, the ratio of the diluent 514 relative to the combined flow of the oxidant 68 and the fuel 70, the ratio of the oxidant 68 relative to the diluent 514 in each of the one or more mixing chambers 678 and corresponding passages 686, and the ratio of the fuel 70 relative to the diluent 514 in each of the one or more mixing chambers 676 and corresponding passages 684. Thus, the control system 100 may adjust each of these ratios, flow rates, temperatures, and fluid compositions (e.g., compositions of the oxidant 68, the fuel 70, and the diluent 514) to adjust the equivalence ratio, the exhaust emissions, and the power output of the gas turbine engine 150.

Figure 13:
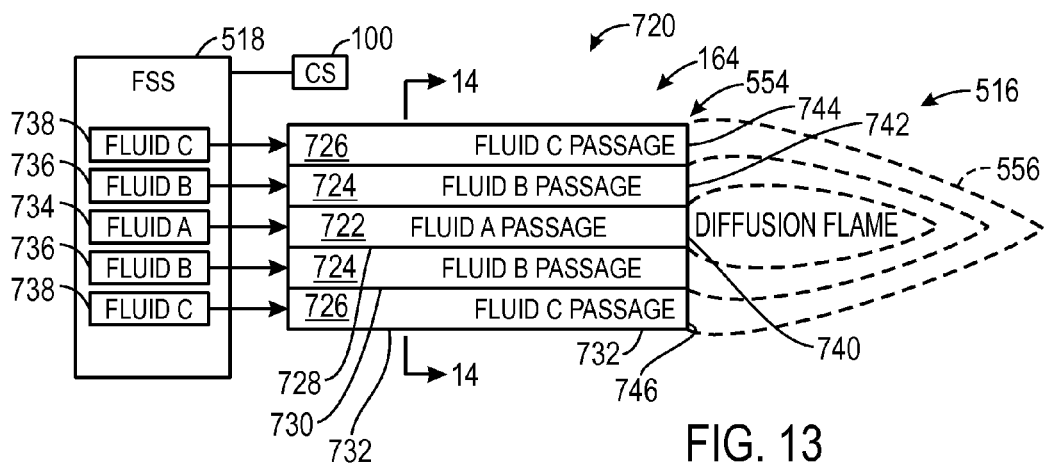
FIG. 13 is a diagram of an embodiment of the fuel nozzle of FIG. 7, illustrating a diffusion fuel nozzle configuration.

FIG. 13 is a diagram of an embodiment of the diffusion fuel nozzle 554, illustrating a plurality of independent passages 720. The illustrated passages 640 include a fluid A passage 722, one or more fluid B passages 724, and one or more fluid C passages 726. The fluid A passage 722 may be separated or isolated from the one or more fluid B passages 724 by a conduit or structure 728, the one or more fluid B passages 724 may be separated from the one or more fluid C passages 726 by a conduit or structure 730, and the one or more fluid C passages 726 may be surrounded or supported by an outer conduit or structure 732.

Figure 14:
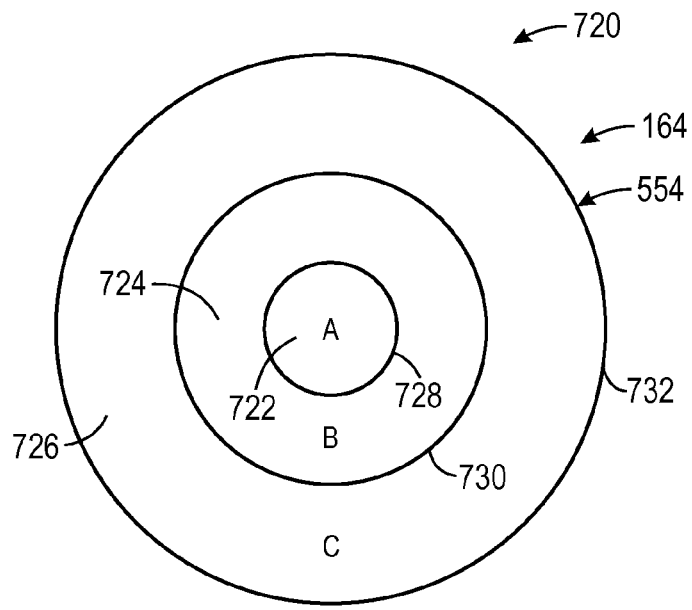
FIG. 14 is a schematic cross-section of an embodiment of the fuel nozzle of FIG. 13, taken along line 14-14.

For example, as illustrated in FIG. 14, the fluid passages 722, 724, and 726 may be disposed in a concentric arrangement, wherein the conduit 728 surrounds the fluid A passage 722 as a central fluid passage, the fluid B passage 724 is disposed between the conduits 728 and 730, and fluid C passage 726 is disposed between the conduits 730 and 732. Again, the conduits 728, 730, and 732 may be disposed in a concentric arrangement, such that the fluid B passage 724 and fluid C passage 726 each represent a continuous annular passage.

Figure 15:
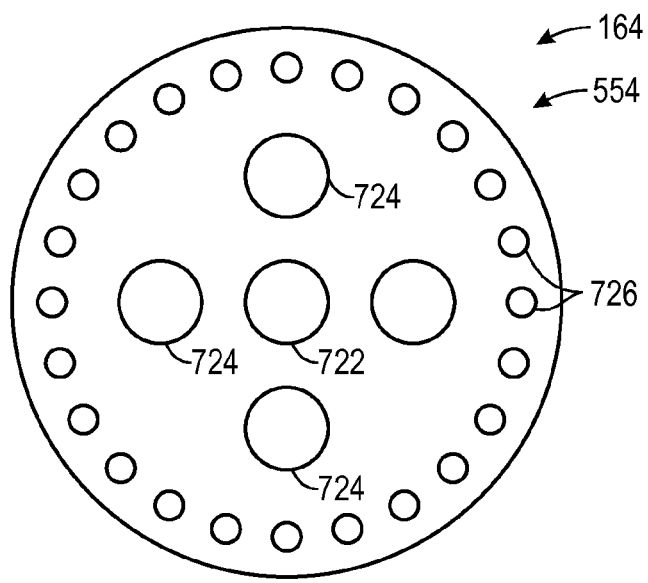
FIG. 15 is a schematic cross-section of an embodiment of the fuel nozzle of FIG. 13, taken along line 14-14.

However, the diffusion fuel nozzle 554 may arrange the passages 722, 724, and 726 in other arrangements, such as discrete passages as illustrated in FIG. 15. In the embodiment of FIG. 15, the fluid A passage 722 represents a central fluid passage, while the fluid B passages 724 and the fluid C passages 726 represent a plurality of discrete passages that are spaced apart from one another within the fuel nozzle 554. For example, the fluid B passages 724 may include 2, 3, 4, 5, 6, 7, 8, or more discrete fluid passages that are spaced apart from one another circumferentially about the central fluid A passage 722. Likewise, the fluid C passages 726 may include a plurality of discrete passages that are spaced apart from one another circumferentially about the fluid B passages 724. For example, the fluid B passages 724 may be arranged in a first ring or circular pattern of the passages 724, while the fluid C passages 726 may be arranged in a second ring or circular pattern of the passages 726.

In either of these configurations, the diffusion fuel nozzle 554 of FIG. 13 is configured to separately flow a fluid A 734 through the fluid A passage 722, a fluid B 736 through the one or more fluid B passages 724, and a fluid C 738 through the one or more fluid C passages 726. Each of these fluids 734, 736, and 738 may include one or more fluids, such as the oxidant 68, the fuel 70, and the diluents 514. However, the fluids 734, 736, and 738 may not mix any of the oxidant 68 and the fuel 70 within the diffusion fuel nozzle 554, thereby delaying mixing between the oxidant 68 and the fuel 70 until the fluids eject from openings 740, 742, and 744 into the chamber 494 of the combustor 160. Again, these openings 740, 742, and 744 may be disposed along a common plane or downstream end 746 of the diffusion fuel nozzle 554. The various fluids then mix and combust to form the diffusion flame 556, as discussed above. The following TABLE 2 illustrates some possible non-limiting examples of fluids A, B, and C, which may be used with the diffusion fuel nozzle 554 of FIGS. 13-15.

TABLE 2

| FLUID A (722) | FLUID B (724) | FLUID C (726) |
| --- | --- | --- |
| FUEL | OXIDANT | DILUENT |
| FUEL | DILUENT | OXIDANT |
| FUEL | OXIDANT + DILUENT | OXIDANT |
| FUEL | OXIDANT | OXIDANT + DILUENT |
| FUEL + DILUENT | FUEL | OXIDANT |
| FUEL | FUEL + DILUENT | OXIDANT |
| FUEL + DILUENT | OXIDANT + DILUENT | OXIDANT |
| FUEL + DILUENT | OXIDANT | OXIDANT + DILUENT |
| FUEL | OXIDANT + DILUENT | OXIDANT + DILUENT |

As indicated above, the diffusion fuel nozzle 554 may flow a variety of combinations of fluids (e.g., oxidant 68, fuel 70, and diluent 514) through the passages 722, 724, and 726 for generation of a diffusion flame 556. Again, the oxidant 68 may include oxygen, ambient air, oxygen enriched air, oxygen reduced air, mixtures of nitrogen and oxygen, or any combination thereof. The fuel 70 may include liquid fuel and/or gas fuel, such as natural gas, syngas, or any other fuel described herein. The diluent 514 may include the exhaust gas 170, steam, nitrogen, or another inert gas, or any combination thereof. Although TABLE 2 depicts some possible examples of the fluids, any combination of fluids may be used with the diffusion fuel nozzle 554 of FIGS. 13-15. In addition, although the depicted embodiment does not mix any fuel 70 with oxidant 68 within the diffusion fuel nozzle 554, other embodiments may mix a small amount (e.g., less than 1, 2, 3, 4, 5, 6, 7, 8, 9, or 10 percent by volume) of oxidant 68 with fuel 70 or a small amount (e.g., less than 1, 2, 3, 4, 5, 6, 7, 8, 9, or 10 percent by volume) of fuel 70 with oxidant 68.

Figure 16:
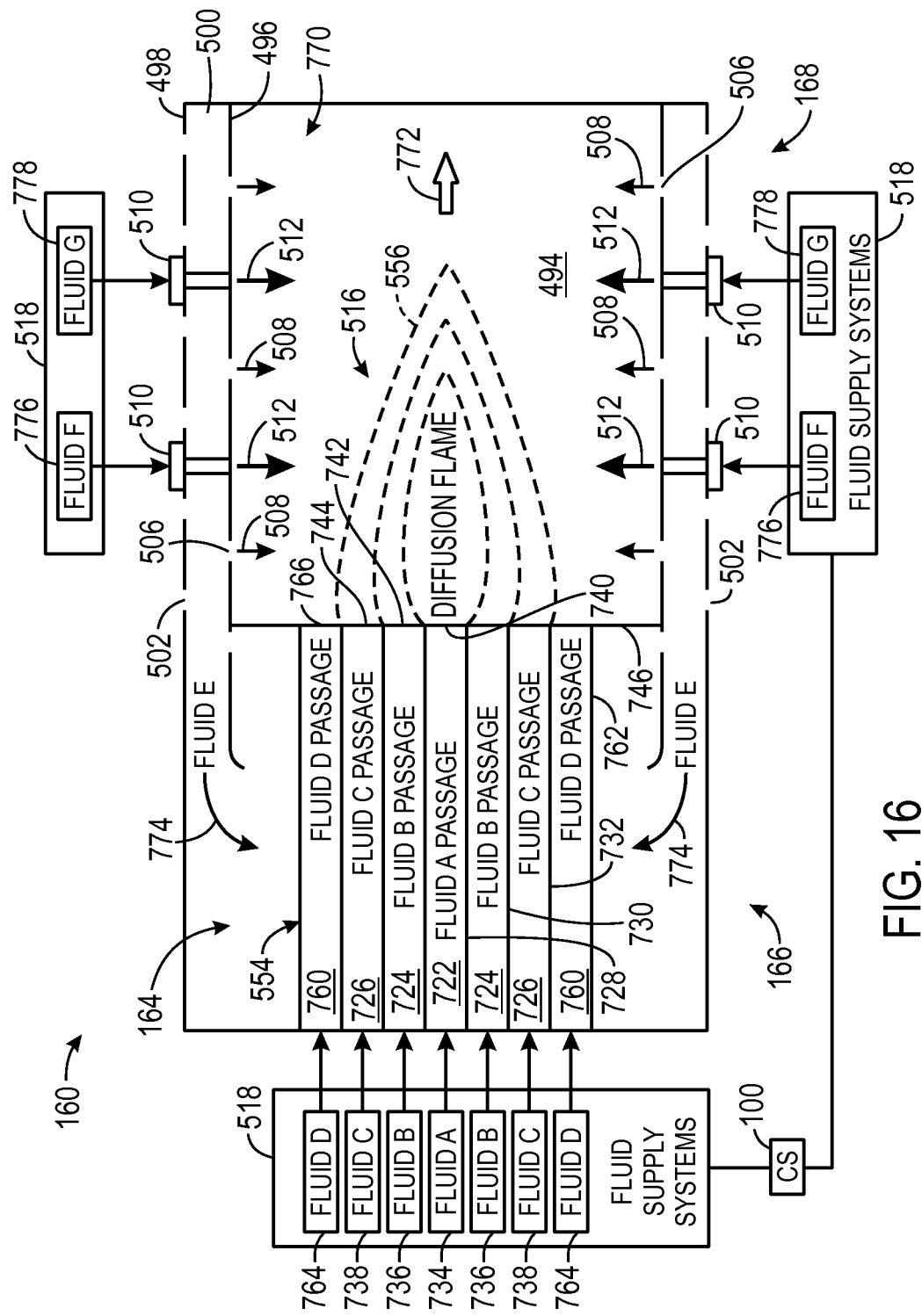
FIG. 16 is a diagram of an embodiment of the combustor and fuel nozzle of FIG. 7, illustrating a diffusion fuel nozzle configuration and a diluent injection system.

FIG. 16 is a diagram of an embodiment of the combustor section 154 having one of the diffusion fuel nozzles 554 disposed within the combustor 160. Similar to the diffusion fuel nozzle 554 illustrated in FIGS. 13-15, the diffusion fuel nozzle 554 of FIG. 16 includes the fluid A passage 724 surrounded by the conduit 728, the fluid B passage 724 surrounded by the conduit 730, the fluid C passage 726 surrounded by the conduit 732, and a fluid D passage 760 surrounded by an outer conduit or structure 762. The fluid D passage 760 is configured to receive a fluid D 764 from the fluid supply system 518, and route the fluid D 764 into the chamber 494 through one or more outlets 766. The passages 722, 724, 726, and 760 may have the respective outlets 740, 742, 744, and 766 disposed along the common plane or downstream end 746 of the diffusion fuel nozzle 554, thereby isolating the flows of the fluids 734, 736, 738, and 764 until the fluids reach the chamber 494. In this manner, the diffusion fuel nozzle 554 facilitates the formation of the diffusion flame 556. Each of the fluids 734, 736, 738, and 764 may include the oxidant 68, the fuel 70, and one or more diluents 514, such as the exhaust gas 170, steam, nitrogen, and/or one or more other inert gases. However, the fluid passages 722, 724, 726, and 760 may not mix any of the oxidant 68 and the fuel 70 within the diffusion fuel nozzle 554, thereby facilitating isolation of the oxidant 68 and fuel 70 until the fluids reach the chamber 494. The oxidant 68 and the fuel 70 may flow through each of the independent fluid passages 722, 724, 726, and 760, either separately or partially premixed with one or more of the diluents 514. Similar to the previous embodiments, the control system 100 may selectively control the fluid supply system 518 to increase, decrease, or maintain the flows of each fluid 734, 736, 738, and 764, thereby adjusting the fluid flow ratios among the fluids, the equivalence ratio, the emissions level, the power output of the gas turbine engine 150, or any combination thereof.

The illustrated combustor 160 of FIG. 16 also includes a diluent injection system 770 disposed along the combustion portion 168 of the combustor 160, such that one or more diluents (e.g., exhaust gas 170, steam, nitrogen, or other inert gases) may be injected into the chamber 494 to control the temperature, pressure, flow rate, gas composition (e.g., emissions levels), or any combination thereof, of the hot products of combustion 772 formed by the diffusion flame 556. For example, the diluent injection system 770 may include the openings of perforations 506 disposed in the first wall or liner 496, and a plurality of the diluent injectors 510 extending through the first and second walls 496 and 498 to the chamber 494 of the combustor 160. In operation, the openings or perforations 506 may be configured to inject a fluid E 774, such as the exhaust gas 170, as indicated by arrows 508. The diluent injectors 510 may be configured to inject a fluid F 776 and/or a fluid G 778 into the chamber 494, as indicated by arrows 512. For example, the fluid F 776 and the fluid G 778 may include additional exhaust gas 170, steam, nitrogen, one or more other inert gases, or any combination thereof. These injected diluents 508 and 512 may be configured to control the temperature, pressure, flow rate, gas composition (e.g., emissions levels), or any combination thereof, of the hot products of combustion 772 resulting from the diffusion flame 556. In certain embodiments, the control system 100 may selectively control the fluid supply systems 518 to increase, decrease, or maintain flows of the various fluids 734, 736, 738, 764, 774, 776, and 778, thereby controlling the ratio of the oxidant 68 to fuel 70, the ratio of one or more diluents 514 relative to the oxidant 68 and the fuel 70, or any combination thereof. In turn, these control adjustments of the fluids may alter the equivalence ratio, emissions levels, and power output of the gas turbine engine 150. The following TABLE 3 illustrates some possible non-limiting examples of fluids A, B, C, D, E, F, and G, which may be used with the diffusion fuel nozzle 554 and combustor 160 of FIG. 16.

TABLE 3

| FLUID A (722) | FLUID B (724) | FLUID C (726) | FLUID D (764) | FLUID E (774) | FLUID F (776) | FLUID G (778) |
|---|---|---|---|---|---|---|
| FUEL | FUEL | OXIDANT | OXIDANT | DILUENT | DILUENT | DILUENT |
| FUEL | OXIDANT | FUEL | OXIDANT | DILUENT | DILUENT | DILUENT |
| OXIDANT | FUEL | OXIDANT | FUEL | DILUENT | DILUENT | DILUENT |
| FUEL + DILUENT | FUEL + DILUENT | OXIDANT + DILUENT | OXIDANT + DILUENT | DILUENT | DILUENT | DILUENT |
| FUEL + DILUENT | OXIDANT + DILUENT | FUEL + DILUENT | OXIDANT + DILUENT | DILUENT | DILUENT | DILUENT |
| OXIDANT + DILUENT | FUEL + DILUENT | OXIDANT + DILUENT | FUEL + DILUENT | DILUENT | DILUENT | DILUENT |
| DILUENT | FUEL | FUEL + DILUENT | OXIDANT + DILUENT | DILUENT | OXIDANT | DILUENT |
| DILUENT | OXIDANT | OXIDANT + DILUENT | FUEL + DILUENT | DILUENT | FUEL | DILUENT |
| FUEL | OXIDANT | FUEL | OXIDANT | DILUENT | FUEL | DILUENT |

As indicated above, the diffusion fuel nozzle 554 and combustor 160 may flow a variety of combinations of fluids (e.g., oxidant 68, fuel 70, and diluent 514) through the passages 722, 724, 726, and 760, openings 506, and diluent injectors 510 for generation of a diffusion flame 556. Again, the oxidant 68 may include oxygen, ambient air, oxygen enriched air, oxygen reduced air, mixtures of nitrogen and oxygen, or any combination thereof. The fuel 70 may include liquid fuel and/or gas fuel, such as natural gas, syngas, or any other fuel described herein. The diluent 514 may include the exhaust gas 170, steam, nitrogen, or another inert gas, or any combination thereof. Although TABLE 3 depicts some possible examples of the fluids, any combination of fluids may be used with the diffusion fuel nozzle 554 and combustor 160 of FIG. 16. In addition, although the depicted embodiment does not mix any fuel 70 with oxidant 68 within the diffusion fuel nozzle 554, other embodiments may mix a small amount (e.g., less than 1, 2, 3, 4, 5, 6, 7, 8, 9, or 10 percent by volume) of oxidant 68 with fuel 70 or a small amount (e.g., less than 1, 2, 3, 4, 5, 6, 7, 8, 9, or 10 percent by volume) of fuel 70 with oxidant 68.

Figure 17:
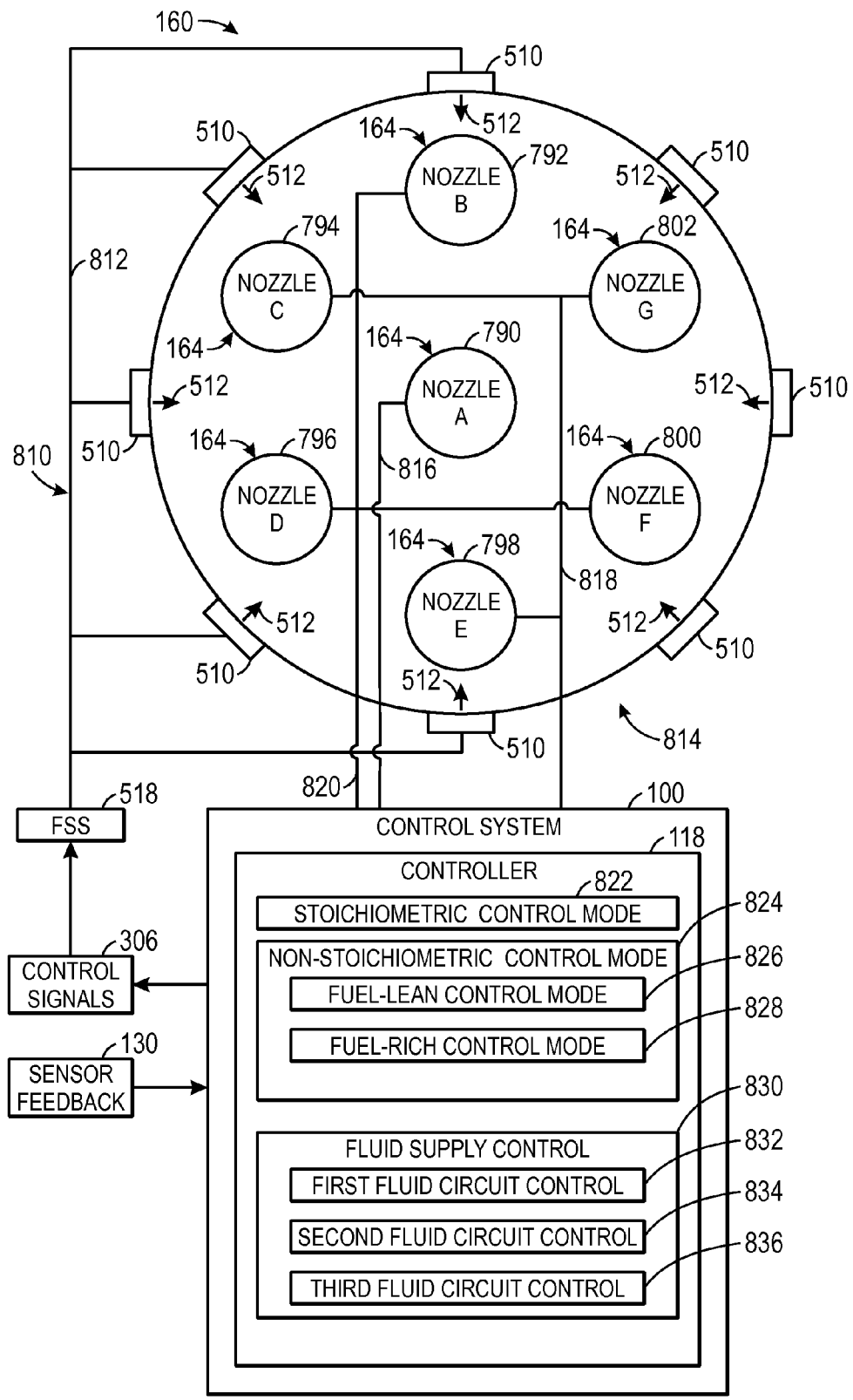
FIG. 17 is a schematic cross-section of an embodiment of the combustor and fuel nozzles of FIG. 7, taken along line 17-17, illustrating a multi-nozzle configuration of the fuel nozzles.

FIG. 17 is a schematic cross-section of the combustor 160 taken along line 17-17 of FIG. 7, further illustrating a multi-nozzle arrangement of the fuel nozzles 164 and a multi-injector arrangement of the diluent injectors 510. The illustrated fuel nozzles 164 include a fuel nozzle A 790, a fuel nozzle B 792, a fuel nozzle C 794, a fuel nozzle D 796, a fuel nozzle E 798, a fuel nozzle F 800, and a fuel nozzle G 802. In the illustrated embodiment, the nozzle 790 is a central fuel nozzle, which is surrounded by the remaining fuel nozzles 792, 794, 796, 798, 800 and 802 as outer or peripheral fuel nozzles. Although the illustrated embodiment includes a single central fuel nozzle 164 and six outer fuel nozzles 164, other embodiments may include any number of central and outer fuel nozzles. The illustrated fuel nozzles 164 may include one or more of the premix fuel nozzles 550 and/or the diffusion fuel nozzles 554 shown and described with reference to FIGS. 8-16. For example, all of the fuel nozzles 164 may be configured as premix fuel nozzles 550, all of the fuel nozzles 164 may be configured as diffusion fuel nozzles 554, or the fuel nozzles 164 may include one or more of both the premix fuel nozzles 550 and the diffusion fuel nozzles 554. The fluid flows to the fuel nozzles 164 may be independently controlled for each fuel nozzle 164, or the fluid flows may be controlled in groups of fuel nozzles 164. For example, the central fuel nozzle 790 may be controlled independently from one or more groups of the outer fuel nozzles 792, 794, 796, 798, 800, and 802. By further example, one or more premix fuel nozzles 550 may be controlled independently from one or more diffusion fuel nozzles 554. These different control schemes may facilitate different operations modes, which may be useful in providing stoichiometric combustion and reducing emissions in the exhaust gas 42.

As further illustrated in FIG. 17, the fuel nozzles 164 and diluent injectors 510 may be coupled to the fluid supply system 518 through a plurality of fluid supply circuits 810, such as one or more diluent supply circuits 812 and one or more fuel nozzle supply circuits 814. For example, the diluent supply circuits 812 may include 1, 2, 3, 4, 5, 6, 7, 8, or more independent diluent supply circuits 812, thereby enabling a variety of diluent injection modes for the diluent injectors 510. Similarly, the fuel nozzle supply circuits 814 may include 1, 2, 3, 4, 5, 6, 7, 8, or more independent fuel nozzle supply circuits 814, thereby enabling a variety of fluid supply modes for the fuel nozzles 164. For example, the fuel nozzle supply circuits 814 may include a first nozzle circuit 816, a second nozzle circuit 818, and a third nozzle circuit 820. Each of these fuel nozzle supply circuits 814 (e.g., 816, 818, and 820) may include one or more fuel lines, oxidant lines, and/or diluent lines (e.g., exhaust lines, steam lines, nitrogen lines, and/or other inert gas lines), which are fluidly coupled to at least one fuel nozzle 164. In the illustrated embodiment, the first nozzle circuit 816 is coupled to a first set of fuel nozzles 164 (e.g., the central fuel nozzle 790), the second nozzle circuit 818 is coupled to a second set of fuel nozzles 164 (e.g., outer fuel nozzles 794, 798, and 802), and the third nozzle circuit 820 is coupled to a third set of fuel nozzles 164 (e.g., outer fuel nozzles 792, 796, and 800). In some embodiments, each set of fuel nozzles 164 coupled to one of the nozzle supply circuits 814 may be entirely diffusion fuel nozzles, entirely premix fuel nozzles, or any combination of diffusion fuel nozzles and premix fuel nozzles. However, any number or configuration of fuel nozzles 164 may be coupled to each fuel nozzle supply circuit 814, and any number of nozzle supply circuits 814 may be coupled to the fuel nozzles 164. Again, the fuel nozzle supply circuits 814 are coupled to the fluid supply system 518, which may include valves, flow regulators, and other flow controls to control the flow rate and pressure of the flows to the fuel nozzles 164.

In turn, the fluid supply system 518 is coupled to the control system 100, which may use the controller 118 to receive the sensor feedback 130 and provide controls signals 306 to the fluid supply system 518 to control operation of the circuits 812 and 814. In the illustrated embodiment, the controller 118 of the system 100 may store and execute (e.g., computer instructions or code relating to) a stoichiometric control mode 822 and a non-stoichiometric control mode 824, which may further include a fuel-lean control mode 826 and a fuel-rich control mode 828. The controller 118 of the system 100 also may store and execute (e.g., computer instructions or code relating to) a fluid supply control 830, including a first fluid circuit control 832, a second fluid circuit control 834, and a third fluid circuit control 836. For example, the first fluid circuit control 832 may be configured to control various flow rates (e.g., oxidant 68, fuel 70, and/or diluent 514) to the first nozzle circuit 816, the second fluid circuit control 834 may be configured to control various flow rates (e.g., oxidant 68, fuel 70, and/or diluent 514) to the second nozzle circuit 818, and the third fluid circuit control 836 may be configured to control various flow rates (e.g., oxidant 68, fuel 70, and/or diluent 514) to the third nozzle circuit 820.

In certain embodiments, the stoichiometric control mode 822 is configured to change the flow rates of at least one fuel 70 and at least one oxidant 68 and provide a substantially stoichiometric ratio of the fuel 70 with the oxidant 68, whereas the non-stoichiometric control mode 824 is configured to change the flow rates and provide a non-stoichiometric ratio of the fuel 70 with the oxidant 68. For example, the stoichiometric control mode 822 may be configured to provide the substantially stoichiometric ratio with an equivalence ratio of approximately 1.0, or between approximately 0.95 and approximately 1.05. In contrast, the non-stoichiometric control mode 824 may be configured to provide the non-stoichiometric ratio with an equivalence ratio of less than approximately 0.95 or greater than approximately 1.05. In some embodiments, the control system 100 may be configured to change the flow rates from a first set of flow rates to a second set of flow rates, wherein the first and second flow rates are different from one another (e.g., greater or lesser than one another). The controlled change in flow rates may also involve a transition between the stoichiometric control mode 822 and the non-stoichiometric control mode 824, or the controlled change in flow rates may involve maintaining the substantially stoichiometric ratio. The controlled change in flow rates also may involve a change in power output (or load) of the SEGR gas turbine system 52 from a first power output (or first load) to a second power output (or second load), wherein the first and second power outputs (e.g., loads) are different from one another (e.g., lesser or greater than one another). For example, the controlled change in power outputs may involve a controlled change in turbine load, e.g., a reduction from a rated or normal load (e.g., 100 percent) to a partial load (e.g., 50 percent). The controlled change in flow rates also may involve maintaining emissions in the exhaust gas within one or more target emissions ranges, wherein the emissions may include carbon monoxide, oxygen, nitrogen oxides, sulfur oxides, unburnt hydrocarbons, hydrogen, or any combination thereof. In certain embodiments, the one or more target emissions ranges may include an oxygen range of less than approximately 50 parts per million by volume (ppmv) and/or a carbon monoxide range of less than approximately 5000 ppmv. In other embodiments, the one or more target emissions ranges comprise an oxygen range of less than approximately 10 ppmv and/or a carbon monoxide range of less than approximately 1000 ppmv.

In some embodiments, the control system 100 in the stoichiometric control mode 822 is configured to maintain the substantially stoichiometric ratio while progressively reducing the flow rates (e.g., oxidant 68 and fuel 70) among a plurality of sets of flow rates, progressively reducing a power output (e.g., load) of the SEGR gas turbine system 52 among a plurality of power outputs (e.g., full load, first partial load, second partial load, etc.), and maintaining emissions in the exhaust gas within one or more target emissions ranges. The control system 100 also may be configured to transition from the stoichiometric control mode 822 to the non-stoichiometric control mode 824 after progressively reducing the flow rates, progressively reducing the power output, and maintaining emissions. After the transition from the stoichiometric control mode 822 to the non-stoichiometric control mode 824, the control system 100 also may be configured to operate in a fuel-rich control mode or a fuel-lean control mode of the non-stoichiometric control mode 824. The control system 100 also may be configured to maintain emissions in the exhaust gas within a first set of target emissions ranges (e.g., while operating in the stoichiometric control mode 822) and a second set of target emissions ranges (e.g., while operating in the non-stoichiometric control mode 824), wherein the first and second sets of target emissions ranges are different from one another. Although the foregoing examples provide a number of control scenarios for the SEGR gas turbine engine 52, it should be understood that any number of control scenarios may be executed by the control system 100 using diffusion fuel nozzles, premix fuel nozzles, or any combination thereof.

Figure 18:
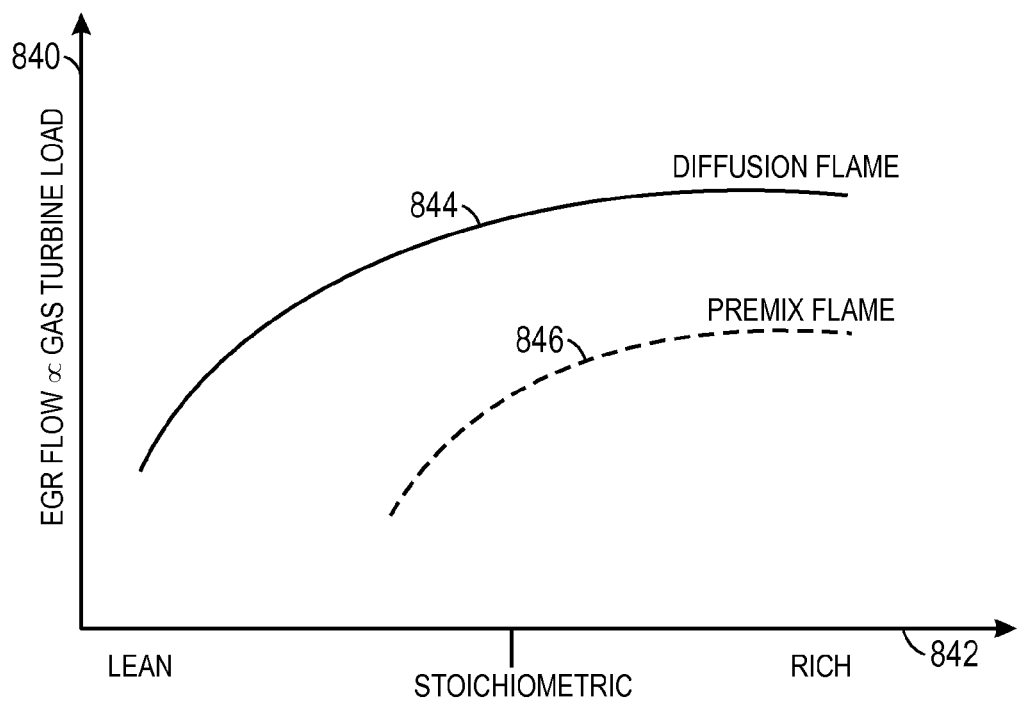
FIG. 18 is a graph of gas turbine load and exhaust gas recirculation (EGR) flow versus fuel/oxidant ratio for a diffusion flame configuration and a premix flame configuration.

FIG. 18 is a graph of exhaust gas recirculation (EGR) flow rate and gas turbine load 840 versus fuel/oxidant ratio 842 for the SEGR gas turbine system 52, illustrating a diffusion flame operability curve 844 and a premix flame operability curve 846. The EGR flow rate through the SEGR gas turbine system 52 is generally proportionally to the load on the gas turbine engine 150, and thus the Y-axis 840 generally indicates both EGR flow rate and gas turbine load. In general, the areas above and to the left of each curve 844 and 846 represent unstable regions for each flame configuration of the SEGR gas turbine system 52. It is noteworthy that the diffusion flame operability curve 844 substantially exceeds the premix flame operability curve 846, indicating a substantially greater EGR flow rate and load range for the SEGR gas turbine system 52 operating with diffusion combustion. As illustrated in FIG. 18, the diffusion flame operability curve 844 may correspond to a combustor 160 equipped with a diffusion fuel nozzle 554, wherein exhaust gas (e.g., diluent) is injected downstream from the diffusion fuel nozzle 554 after the point of combustion and/or downstream from the diffusion flame 556 generated by the nozzle 554. One example of such a diffusion combustion configuration is illustrated in FIG. 16. In contrast, the premix flame operability curve 846 may correspond to a combustor 160 equipped with a premix fuel nozzle 550, wherein the oxidant 68, the fuel 70, and the diluent 514 (e.g., exhaust gas) are premixed prior to the point of combustion (i.e., upstream from the premix flame 552). Again, the diffusion flame operability curves 844 indicates much greater EGR flow rates through the SEGR gas turbine system 52, which also means a greater production of $CO_2$ for use in the target systems 422. The SEGR gas turbine system 52 operating with the foregoing diffusion combustion configuration also may have substantially reduced emissions of oxygen and carbon monoxide. These emissions reductions may be at least partially due to the independent control of the flows of oxidant 68, fuel 70, and diluent 514 (e.g., exhaust gas). It is believed that various configurations of diffusion fuel nozzles 554 and diluent injection (e.g., diluent injection system 770 of FIG. 16) may substantially increase the operable range of gas turbine loads, throughput of exhaust gas, and output of the exhaust gas 42 (e.g., streams 95) for use in the target systems 422, such as the hydrocarbon production system 12.

Additional Description

By way of example, the following clauses are offered as further description of the present disclosure:

Embodiment 1

A system, comprising: a turbine combustor comprising a first diffusion fuel nozzle, wherein the first diffusion fuel nozzle comprises first and second passages that separately inject respective first and second flows into a chamber of the turbine combustor to produce a diffusion flame, wherein the first flow comprises a first fuel and a first diluent, and the second flow comprises a first oxidant; a turbine driven by combustion products from the diffusion flame in the turbine combustor; and an exhaust gas compressor, wherein the exhaust gas compressor is configured to compress and route an exhaust gas from the turbine to the turbine combustor along an exhaust recirculation path.

Embodiment 2

The system of embodiment 1, wherein the first diluent comprises a portion of the exhaust gas, steam, nitrogen, another inert gas, or any combination thereof.

Embodiment 3

The system of any preceding embodiment, wherein the first diluent comprises a portion of the exhaust gas.

Embodiment 4

The system of any preceding embodiment, wherein the first diluent comprises steam.

Embodiment 5

The system of any preceding embodiment, wherein the first diluent comprises an inert gas.

Embodiment 6

The system of any preceding embodiment, wherein the inert gas comprises nitrogen.

Embodiment 7

The system of any preceding embodiment, wherein the first and second passages have respective first and second outlets that are disposed along a downstream end of the first diffusion fuel nozzle, and the first and second passages are isolated from one another along the first diffusion fuel nozzle.

Embodiment 8

The system of any preceding embodiment, wherein the first and second passages are disposed in a concentric arrangement.

Embodiment 9

The system of any preceding embodiment, wherein the first passage extends around the second passage.

Embodiment 10

The system of any preceding embodiment, wherein the second passage extends around the first passage.

Embodiment 11

The system of any preceding embodiment, wherein the first diffusion fuel nozzle comprises a third passage separate from the first and second passages, the third passage is configured to inject a third flow into the chamber separately from the first and second flows, and the third flow comprises a second fuel, a second diluent, or a second oxidant.

Embodiment 12

The system of any preceding embodiment, wherein the third flow comprises the second fuel, and the first and second fuels are the same as one another.

Embodiment 13

The system of any preceding embodiment, wherein the third flow comprises the second fuel, and the first and second fuels are different from one another.

Embodiment 14

The system of any preceding embodiment, wherein the third flow comprises the second fuel and the second diluent.

Embodiment 15

The system of any preceding embodiment, wherein the first and second fuels are the same as one another, or the first and second diluents are the same as one another, or a combination thereof.

Embodiment 16

The system of any preceding embodiment, wherein the first and second fuels are different from one another, or the first and second diluents are different from one another, or a combination thereof.

Embodiment 17

The system of any preceding embodiment, wherein the first and second fuels are different from one another and the first and second diluents are the same as one another, or the first and second fuels are the same as one another and the first and second diluents are different from one another.

Embodiment 18

The system of any preceding embodiment, wherein the first and second diluents comprise portions of the exhaust gas.

Embodiment 19

The system of any preceding embodiment, wherein the first diffusion fuel nozzle comprises a fourth passage separate from the first, second, and third passages, wherein the fourth passage is configured to inject a fourth flow into the chamber separately from the first, second, and third flows, wherein the fourth flow comprises a third fuel, a third diluent, or a third oxidant.

Embodiment 20

The system of any preceding embodiment, wherein the turbine combustor comprises a second diffusion fuel nozzle.

Embodiment 21

The system of any preceding embodiment, wherein the turbine combustor comprises a first premix fuel nozzle.

Embodiment 22

The system of any preceding embodiment, wherein the turbine combustor comprises a diluent injection system disposed downstream from the first diffusion fuel nozzle.

Embodiment 23

The system of any preceding embodiment, wherein the diluent injection system is configured to inject a portion of the exhaust gas, steam, nitrogen, or another inert gas, or a combination thereof, into the chamber of the turbine combustor downstream from the first diffusion fuel nozzle.

Embodiment 24

The system of any preceding embodiment, wherein the diluent injection system comprises a plurality of openings in a liner of the turbine combustor, and the plurality of openings is configured to inject the portion of the exhaust gas into the chamber of the turbine combustor.

Embodiment 25

The system of any preceding embodiment, wherein the turbine combustor comprises a first wall disposed about the chamber, a second wall disposed about the first wall, and an exhaust passage disposed between the first and second walls, wherein the diluent injection system comprises a plurality of diluent injectors extending through the first and second walls of the turbine combustor.

Embodiment 26

The system of any preceding embodiment, wherein the plurality of diluent injectors is configured inject the portion of the exhaust gas, steam, nitrogen, or another inert gas into the chamber of the turbine combustor.

Embodiment 27

The system of any preceding embodiment, comprising a first catalyst unit disposed along the exhaust recirculation path.

Embodiment 28

The system of any preceding embodiment, wherein the first catalyst unit is configured to control concentration levels of carbon monoxide, carbon dioxide, and unburnt hydrocarbons in the exhaust gas.

Embodiment 29

The system of any preceding embodiment, wherein the first catalyst unit comprises an oxidation catalyst, a carbon monoxide catalyst, an aluminum oxide, a zirconium oxide, a silicone oxide, a titanium oxide, a platinum oxide, a palladium oxide, a cobalt oxide, or a mixed metal oxide, or a combination thereof.

Embodiment 30

The system of any preceding embodiment, wherein the oxidation catalyst unit is configured to drive an oxidizing reaction with the exhaust gas and an oxidant fuel.

Embodiment 31

The system of any preceding embodiment, comprising a control system configured to adjust a flow of the oxidant fuel to control the oxidizing reaction.

Embodiment 32

The system of any preceding embodiment, wherein the control system is configured to adjust the flow of the oxidant fuel in response to sensor feedback, and the sensor feedback comprises gas composition feedback indicative of oxygen, carbon monoxide, hydrogen, nitrogen oxides, unburnt hydrocarbons, or any combination thereof.

Embodiment 33

The system of any preceding embodiment, comprising a first heat recovery unit disposed along the exhaust recirculation path.

Embodiment 34

The system of any preceding embodiment, comprising a catalyst and heat recovery system having the first catalyst unit and the first heat recovery unit.

Embodiment 35

The system of any preceding embodiment, wherein the first catalyst unit is disposed upstream, downstream, or integrated with the first heat recovery unit.

Embodiment 36

The system of any preceding embodiment, comprising a second heat recovery unit disposed along the exhaust recirculation path.

Embodiment 37

The system of any preceding embodiment, comprising a second catalyst unit disposed along the exhaust recirculation path.

Embodiment 38

The system of any preceding embodiment, wherein the first heat recovery unit comprises a first heat recovery steam generator.

Embodiment 39

The system of any preceding embodiment, comprising a first steam turbine coupled to the first heat recovery steam generator.

Embodiment 40

The system of any preceding embodiment, wherein the first heat recovery unit comprises a first heat recovery steam generator and the second heat recovery unit comprises a second heat recovery steam generator.

Embodiment 41

The system of any preceding embodiment, comprising a first steam turbine coupled to the first heat recovery steam generator, and a second steam turbine coupled to the second heat recovery steam generator.

Embodiment 42

The system of any preceding embodiment, comprising a moisture removal system disposed along the exhaust recirculation path.

Embodiment 43

The system of any preceding embodiment, wherein the moisture removal system comprises a heat exchanger, a condenser, a water gas separator, a filter, or any combination thereof.

Embodiment 44

The system of any preceding embodiment, comprising a particulate removal system disposed along the exhaust recirculation path.

Embodiment 45

The system of any preceding embodiment, wherein the particulate removal system comprises an inertial separator, a gravity separator, a filter, or any combination thereof.

Embodiment 46

The system of any preceding embodiment, comprising a booster blower disposed along the exhaust recirculation path.

Embodiment 47

The system of any preceding embodiment, comprising a heat recovery unit, a booster blower, a moisture removal unit, and a particulate removal unit disposed along the exhaust recirculation path.

Embodiment 48

The system of any preceding embodiment, comprising an exhaust gas extraction system configured to extract a portion of the exhaust gas.

Embodiment 49

The system of any preceding embodiment, comprising an exhaust gas treatment system configured to treat the portion of the exhaust gas.

Embodiment 50

The system of any preceding embodiment, wherein the exhaust gas treatment system comprises a gas separation system configured to separate the portion of the exhaust gas into a plurality of gas streams.

Embodiment 51

The system of any preceding embodiment, wherein the plurality of gas streams comprises a first stream that is carbon dioxide ($CO_2$) rich and a second stream that is carbon dioxide ($CO_2$) lean.

Embodiment 52

The system of any preceding embodiment, wherein the first stream is nitrogen ($N_2$) lean and the second stream is nitrogen ($N_2$) rich.

Embodiment 53

The system of any preceding embodiment, wherein the exhaust gas treatment system comprises a gas compression system, a moisture removal system, a particulate removal system, or a combination thereof, configured to receive at least one of the first or second streams.

Embodiment 54

The system of any preceding embodiment, wherein the exhaust gas treatment system comprises a gas purification system configured to purify at least one of the plurality of gas streams.

Embodiment 55

The system of any preceding embodiment, comprising a target system configured to receive at least one of the plurality of streams, wherein the target system comprises a hydrocarbon production system, a subterranean reservoir, a carbon sequestration system, a pipeline, a storage tank, or any combination thereof.

Embodiment 56

The system of any preceding embodiment, wherein the exhaust gas treatment system comprises a compression system configured to compress the portion of the exhaust gas.

Embodiment 57

The system of any preceding embodiment, wherein the exhaust gas treatment system comprises a moisture removal system and/or a particulate removal system.

Embodiment 58

The system of any preceding embodiment, comprising a control system responsive to sensor feedback to adjust one or more operating parameters to control an equivalence ratio or emissions levels in the exhaust gas.

Embodiment 59

The system of any preceding embodiment, wherein the one or more operating parameters comprise an oxidant flow rate and/or a fuel flow rate to the turbine combustor.

Embodiment 60

The system of any preceding embodiment, wherein the control system is configured to maintain the equivalence ratio between approximately 0.95 and 1.05.

Embodiment 61

The system of any preceding embodiment, wherein the sensor feedback comprises gas composition feedback relating to oxygen, carbon monoxide, hydrogen, nitrogen oxides, unburnt hydrocarbons, or any combination thereof.

Embodiment 62

The system of any preceding embodiment, wherein the control system is coupled to a plurality of sensors configured to obtain the sensor feedback, and the plurality of sensors are disposed along the exhaust recirculation path, the turbine combustor, the turbine, the exhaust gas compressor, or a combination thereof.

Embodiment 63

The system of any preceding embodiment, comprising a bypass line from the exhaust gas compressor to the turbine, wherein the bypass line comprises a heat exchanger configured to cool a bypass flow of the exhaust gas from the exhaust gas compressor to the turbine.

Embodiment 64

The system of any preceding embodiment, comprising a gas turbine engine having the turbine combustor, the turbine, and the exhaust gas compressor, wherein the gas turbine engine is a stoichiometric exhaust gas recirculation (SEGR) gas turbine engine.

Embodiment 65

The system of any preceding embodiment, comprising an exhaust gas extraction system coupled to the gas turbine engine.

Embodiment 66

The system of any preceding embodiment, comprising an exhaust gas treatment system coupled to the exhaust gas extraction system.

Embodiment 67

The system of any preceding embodiment, comprising a hydrocarbon production system coupled to the exhaust gas extraction system.

Embodiment 68

A method, comprising: injecting first and second flows separately into a chamber of a turbine combustor to produce a diffusion flame, wherein the first flow comprises a first fuel and a first diluent, and the second flow comprises a first oxidant; driving a turbine with combustion products from the diffusion flame, and outputting an exhaust gas; recirculating the exhaust gas along an exhaust recirculation path to an exhaust gas compressor; compressing and routing the exhaust gas to the turbine combustor.

Embodiment 69

The method of any preceding embodiment, wherein the first diluent comprises a portion of the exhaust gas, steam, nitrogen, another inert gas, or any combination thereof.

Embodiment 70

The method of any preceding embodiment, wherein the first diluent comprises a portion of the exhaust gas.

Embodiment 71

The method of any preceding embodiment, wherein injecting comprises separately injecting the first and second flows from respective first and second passages that are isolated from one another along a first diffusion fuel nozzle.

Embodiment 72

The method of any preceding embodiment, wherein the first and second passages are disposed in a concentric arrangement.

Embodiment 73

The method of any preceding embodiment, wherein the first passage extends around the second passage.

Embodiment 74

The method of any preceding embodiment, wherein the second passage extends around the first passage.

Embodiment 75

The method of any preceding embodiment, wherein injecting comprises separately injecting the first flow, the second flow, and a third flow from respective first, second, and third passages that are isolated from one another along a first diffusion fuel nozzle, wherein the third flow comprises a second fuel, a second diluent, or a second oxidant.

Embodiment 76

The method of any preceding embodiment, wherein the third flow comprises the second fuel, and the first and second fuels are the same as one another.

Embodiment 77

The method of any preceding embodiment, wherein the third flow comprises the second fuel, and the first and second fuels are different from one another.

Embodiment 78

The method of any preceding embodiment, wherein the third flow comprises the second fuel and the second diluent.

Embodiment 79

The method of any preceding embodiment, wherein the first and second fuels are the same as one another, or the first and second diluents are the same as one another, or a combination thereof.

Embodiment 80

The method of any preceding embodiment, wherein the first and second fuels are different from one another, or the first and second diluents are different from one another, or a combination thereof.

Embodiment 81

The method of any preceding embodiment, wherein the first and second fuels are different from one another and the first and second diluents are the same as one another, or the first and second fuels are the same as one another and the first and second diluents are different from one another.

Embodiment 82

The method of any preceding embodiment, wherein the first and second diluents comprise portions of the exhaust gas.

Embodiment 83

The method of any preceding embodiment, wherein injecting comprises separately injecting the first flow, the second flow, a third flow, and a fourth flow from respective first, second, third, and fourth passages that are isolated from one another along a first diffusion fuel nozzle, wherein the third flow comprises a second fuel, a second diluent, or a second oxidant, wherein the fourth flow comprises a third fuel, a third diluent, or a third oxidant.

Embodiment 84

The method of any preceding embodiment, comprising injecting a diluent flow into the chamber downstream from the first diffusion fuel nozzle.

Embodiment 85

The method of any preceding embodiment, comprising injecting the diluent flow through a plurality of openings in a liner of the turbine combustor, and the diluent flow comprises a portion of the exhaust gas.

Embodiment 86

The method of any preceding embodiment, comprising injecting the diluent flow through a plurality of diluent injectors extending through at least one wall of the turbine combustor, and the diluent flow comprises a portion of the exhaust gas, steam, nitrogen, or another inert gas.

Embodiment 87

The method of any preceding embodiment, comprising treating the exhaust gas with a first catalyst unit along the exhaust recirculation path; and

Embodiment 88

The method of any preceding embodiment, wherein treating comprises controlling concentration levels of carbon monoxide, carbon dioxide, and unburnt hydrocarbons in the exhaust gas.

Embodiment 89

The method of any preceding embodiment, wherein treating comprises driving an oxidizing reaction with the exhaust gas and an oxidant fuel.

Embodiment 90

The method of any preceding embodiment, comprising controlling a flow of the oxidant fuel to the first catalyst unit to control the oxidizing reaction.

Embodiment 91

The method of any preceding embodiment, comprising controlling the flow of the oxidant fuel in response to sensor feedback, and the sensor feedback comprises gas composition feedback indicative of oxygen, carbon monoxide, hydrogen, nitrogen oxides, unburnt hydrocarbons, or any combination thereof.

Embodiment 92

The method of any preceding embodiment, comprising recovering heat from the exhaust gas along the exhaust recirculation path using a first heat recovery unit, a second heat recovery unit, or a combination thereof.

Embodiment 93

The method of any preceding embodiment, comprising driving a first catalytic reaction with a first catalyst unit within, upstream, or downstream of the first or second heat recovery unit.

Embodiment 94

The method of any preceding embodiment, comprising driving a second catalytic reaction with a second catalyst unit within, upstream, or downstream of the first or second heat recovery unit.

Embodiment 95

The method of any preceding embodiment, comprising generating a first steam with a first heat recovery steam generator of the first heat recovery unit, generating a second steam with a second heat recovery steam generator of the second heat recovery unit, or a combination thereof.

Embodiment 96

The method of any preceding embodiment, comprising driving a first steam turbine with the first steam or driving a second steam turbine with the second steam.

Embodiment 97

The method of any preceding embodiment, comprising removing moisture from the exhaust gas with a moisture removal system disposed along the exhaust recirculation path, or removing particulate from the exhaust gas with a particulate removal system disposed along the exhaust recirculation path, or a combination thereof.

Embodiment 98

The method of any preceding embodiment, wherein the moisture removal system comprises a heat exchanger, a condenser, a water gas separator, a first filter, or any combination thereof, wherein the particulate removal system comprises an inertial separator, a gravity separator, a second filter, or any combination thereof.

Embodiment 99

The method of any preceding embodiment, comprising boosting a flow of the exhaust gas with a booster blower disposed along the exhaust recirculation path.

Embodiment 100

The method of any preceding embodiment, comprising treating the exhaust gas with a heat recovery unit, a catalyst unit, a booster blower, a moisture removal unit, and a particulate removal unit disposed along the exhaust recirculation path.

Embodiment 101

The method of any preceding embodiment, comprising extracting a portion of the exhaust gas with an exhaust gas extraction system.

Embodiment 102

The method of any preceding embodiment, comprising treating the portion of the exhaust gas with an exhaust gas treatment system.

Embodiment 103

The method of any preceding embodiment, wherein treating the portion of the exhaust gas comprises separating the portion of the exhaust gas into a plurality of gas streams.

Embodiment 104

The method of any preceding embodiment, wherein the plurality of gas streams comprises a first stream that is carbon dioxide ($CO_2$) rich and a second stream that is carbon dioxide ($CO_2$) lean.

Embodiment 105

The method of any preceding embodiment, wherein treating the portion of the exhaust gas comprises compressing the portion of the exhaust gas, the first stream, or the second steam with a gas compression system.

Embodiment 106

The method of any preceding embodiment, wherein treating the portion of the exhaust gas comprises removing moisture from the portion of the exhaust gas, the first stream, or the second steam with a moisture removal system.

Embodiment 107

The method of any preceding embodiment, wherein treating the portion of the exhaust gas comprises removing particulate from the portion of the exhaust gas, the first stream, or the second steam with a particulate removal system.

Embodiment 108

The method of any preceding embodiment, comprising routing the portion of the exhaust gas, the first stream, or the second steam to a target system, wherein the target system comprises a hydrocarbon production system, a subterranean reservoir, a carbon sequestration system, a pipeline, a storage tank, or any combination thereof.

Embodiment 109

The method of any preceding embodiment, comprising adjusting one or more operating parameters in response to sensor feedback to control an equivalence ratio or emissions levels in the exhaust gas.

Embodiment 110

The method of any preceding embodiment, wherein adjusting the one or more operating parameters comprises controlling an oxidant flow rate and/or a fuel flow rate to the turbine combustor.

Embodiment 111

The method of any preceding embodiment, wherein adjusting the one or more operating parameters comprises maintaining the equivalence ratio between approximately 0.95 and 1.05.

Embodiment 112

The method of any preceding embodiment, comprising obtaining the sensor feedback by monitoring a gas composition of the exhaust gas relating to oxygen, carbon monoxide, hydrogen, nitrogen oxides, unburnt hydrocarbons, or any combination thereof.

Embodiment 113

The method of any preceding embodiment, wherein obtaining the sensor feedback comprises monitoring a plurality of sensors disposed along the exhaust recirculation path, the turbine combustor, the turbine, the exhaust gas compressor, or a combination thereof.

Embodiment 114

The method of any preceding embodiment, comprising routing a bypass flow of the exhaust gas along a bypass line from the exhaust gas compressor to the turbine.

Embodiment 115

The method of any preceding embodiment, comprising cooling the bypass flow of the exhaust gas along the bypass line, and cooling the turbine using the bypass flow of the exhaust gas.

Embodiment 116

The method of any preceding embodiment, comprising operating a gas turbine engine having the turbine combustor, the turbine, and the exhaust gas compressor to achieve substantially stoichiometric combustion based on sensor feedback.

Embodiment 117

The method of any preceding embodiment, comprising extracting a portion of the exhaust gas with an exhaust gas extraction system coupled to the gas turbine engine, and routing the portion of the exhaust gas to a hydrocarbon production system, a carbon sequestration system, a pipeline, a storage tank, or any combination thereof.

Embodiment 118

A method, comprising: introducing an oxidant to at least one oxidant compressor to produce a compressed oxidant stream; introducing a recirculated low oxygen content gas stream to a compressor section of a gas turbine engine to produce a compressed low oxygen content gas stream; mixing a first portion of the compressed low oxygen content gas stream with a fuel stream and producing a diluted fuel stream; introducing a first portion of the compressed oxidant stream and the diluted fuel stream in a substantially stoichiometric ratio to at least one turbine combustor and mixing the first portion of the compressed oxidant stream and the diluted fuel stream at the point of combustion and combusting the mixture of the first portion of the compressed oxidant stream and the diluted fuel stream; introducing a second portion of the compressed low oxygen content gas stream to the at least one turbine combustor and mixing it with the combusting streams of the first portion of the compressed oxidant stream and the diluted fuel after the point of combustion and producing a high temperature high pressure low oxygen content stream; introducing the high temperature high pressure low oxygen content stream to an expander section of the gas turbine engine and expanding the high temperature high pressure low oxygen content stream to produce mechanical power and a recirculated low oxygen content gas stream; using a first portion of the mechanical power to drive the compressor section of the gas turbine engine; using a second portion of the mechanical power to drive at least one of: a generator, the at least one oxidant compressor or at least one other mechanical device; recirculating the recirculated low oxygen content gas stream in a recirculation loop from the outlet of the expander section to the inlet of the compressor section of the gas turbine engine; and extracting at least a third portion of the compressed low oxygen content gas stream from the gas turbine engine and delivering the at least a third portion of the compressed low oxygen content gas stream to the first at least one oxidation catalyst unit and producing a low oxygen content product stream.

Embodiment 119

The method of any preceding embodiment, comprising introducing a second portion of the compressed oxidant stream to the first at least one oxidation catalyst unit to oxidize at least a portion of the at least one of carbon monoxide, hydrogen, unburned hydrocarbons or similar products of incomplete combustion contained in the third portion of the compressed low oxygen content gas stream.

Embodiment 120

The method of any preceding embodiment, comprising introducing an oxidation fuel to the first at least one oxidation catalyst unit and reducing at least a portion of the residual oxygen contained in the third portion of the compressed low oxygen content gas stream.

Embodiment 121

The method of any preceding embodiment, wherein the oxidant consists of essentially ambient air and the recirculated low oxygen content gas stream comprising comprises nitrogen.

Embodiment 122

The method of any preceding embodiment, wherein the equivalence ratio (phi, $\phi$) is equal to (mol % fuel/mol % oxidant)actual/(mol % fuel/mol % oxidant)stoichiometric.

Embodiment 123

The method of any preceding embodiment, comprising controlling the flow rate of at least one of the first portion of the compressed oxidant stream and the fuel stream to achieve a combustion equivalence ratio of about 1 and producing a substantially stoichiometric ratio of the first portion of the compressed oxidant stream and the fuel stream.

Embodiment 124

The method of any preceding embodiment, comprising sensors installed in the recirculation loop and measuring the constituents within the recirculated low oxygen content stream.

Embodiment 125

The method of any preceding embodiment, wherein the measured constituents are at least one of: oxygen, carbon monoxide, hydrogen, nitrogen oxides, and unburned hydrocarbons.

Embodiment 126

The method of any preceding embodiment, comprising determining the equivalence ratio by analyzing the constituent measurements.

Embodiment 127

The method of any preceding embodiment, comprising at least one sensor installed and measuring the constituents within the extracted third portion of the compressed low oxygen content gas stream upstream of the first at least one oxidation catalyst unit, downstream of the first at least one oxidation catalyst unit or both.

Embodiment 128

The method of any preceding embodiment, wherein the measured constituents are at least one of: oxygen, carbon monoxide, hydrogen, nitrogen oxides, and unburned hydrocarbons.

Embodiment 129

The method of any preceding embodiment, comprising at least one controller adjusting at least one of the combustion equivalence ratio, the flow rate of the second portion of the compressed oxidant stream or the flow rate of the oxidation fuel and achieving a desired level of at least one of the measured constituents downstream of the first at least one oxidation catalyst unit.

Embodiment 130

The method of any preceding embodiment, comprising a first heat recovery unit downstream of the first at least one oxidation catalyst unit.

Embodiment 131

The method of any preceding embodiment, wherein the first heat recovery unit comprises a steam generator.

Embodiment 132

The method of any preceding embodiment, comprising producing steam by the steam generator that is delivered to at least one steam turbine and driving at least one of a generator to produce electrical power or another mechanical device.

Embodiment 133

The method of any preceding embodiment, comprising a second heat recovery unit in the recirculation loop between the outlet of the expander section and the inlet to the compressor section of the gas turbine engine and removing heat from the recirculated low oxygen content gas stream.

Embodiment 134

The method of any preceding embodiment, wherein the second heat recovery unit comprises a steam generator.

Embodiment 135

The method of any preceding embodiment, comprising producing steam by the steam generator that is delivered to at least one steam turbine and driving at least one of a generator to produce electrical power or another mechanical device.

Embodiment 136

The method of any preceding embodiment, comprising a secondary flow path delivering a fourth portion of the compressed low oxygen content gas stream from the compressor section of the gas turbine engine to the turbine as a secondary flow and after cooling and sealing the turbine delivering the fourth portion of the compressed low oxygen content gas stream into the recirculation loop.

Embodiment 137

The method of any preceding embodiment, comprising a booster blower in the recirculation loop increasing the pressure of the recirculated low oxygen content gas stream downstream of the second heat recovery unit.

Embodiment 138

The method of any preceding embodiment, comprising a heat exchanger within the recirculation loop upstream of the compressor section of the gas turbine engine cooling the recirculated low oxygen content gas stream before entering the inlet of the compressor section of the gas turbine engine.

Embodiment 139

The method of any preceding embodiment, comprising condensing and removing water from the recirculated low oxygen content gas stream with the heat exchanger.

Embodiment 140

The method of any preceding embodiment, comprising delivering at least a portion of the low oxygen content product stream to a subterranean reservoir for enhanced hydrocarbon recovery.

Embodiment 141

The method of any preceding embodiment, comprising compressing the at least a portion of the low oxygen content product stream with at least one inert gas product compressor prior to delivering the at least a portion of the low oxygen content product stream to a subterranean reservoir for enhanced hydrocarbon recovery.

Embodiment 142

The method of any preceding embodiment, comprising cooling the low oxygen content product stream by the first heat recovery unit.

Embodiment 143

The method of any preceding embodiment, comprising delivering the at least a portion of the low oxygen content product stream to a gas dehydration unit.

Embodiment 144

The method of any preceding embodiment, comprising delivering at least a portion of the low oxygen content product stream to a carbon dioxide separation unit to produce a lean carbon dioxide stream and a rich carbon dioxide stream.

Embodiment 145

The method of any preceding embodiment, comprising delivering at least a portion of the lean carbon dioxide stream to a subterranean reservoir for enhanced hydrocarbon recovery.

Embodiment 146

The method of any preceding embodiment, comprising delivering at least a portion of the rich carbon dioxide stream to a subterranean reservoir for enhanced hydrocarbon recovery.

Embodiment 147

The method of any preceding embodiment, comprising delivering at least a portion of the rich carbon dioxide stream to a carbon sequestration unit.

Embodiment 148

The method of any preceding embodiment, comprising compressing the at least a portion of the lean carbon dioxide stream to at least one lean product compressor prior to delivering the lean carbon dioxide stream to a subterranean reservoir for enhanced hydrocarbon recovery.

Embodiment 149

The method of any preceding embodiment, comprising compressing the at least a portion of the rich carbon dioxide stream to at least one rich product compressor prior to delivering the rich carbon dioxide stream to a subterranean reservoir for enhanced hydrocarbon recovery.

Embodiment 150

The method of any preceding embodiment, comprising compressing the at least a portion of the rich carbon dioxide stream to at least one rich product compressor prior to delivering the rich carbon dioxide stream to a carbon sequestration unit.

Embodiment 151

The method of any preceding embodiment, comprising delivering at least a portion of the lean carbon dioxide stream to a gas dehydration unit.

Embodiment 152

The method of any preceding embodiment, comprising delivering at least a portion of the rich carbon dioxide stream to a gas dehydration unit.

Embodiment 153

The method of any preceding embodiment, comprising introducing at least a portion of the low oxygen content product stream to an expander and expanding the at least a portion of the low oxygen content product stream, driving at least one of a generator or another mechanical device and producing a vent stream.

Embodiment 154

The method of any preceding embodiment, comprising introducing at least a portion of the lean carbon dioxide stream to an expander and expanding the at least a portion of the lean carbon dioxide stream, driving at least one of a generator or another mechanical device and producing a vent stream.

Embodiment 155

The method of any preceding embodiment, comprising a second at least one oxidation catalyst unit located within the recirculation loop and oxidizing at least a portion of the at least one of carbon monoxide, hydrogen, unburned hydrocarbons or similar products of incomplete combustion contained in the recirculated low oxygen content gas stream.

Embodiment 156

The method of any preceding embodiment, wherein the second at least one oxidation catalyst unit is located upstream of the second heat recovery unit.

Embodiment 157

The method of any preceding embodiment, wherein the second at least one oxidation catalyst unit is located downstream of the second heat recovery unit.

Embodiment 158

The method of any preceding embodiment, wherein the second at least one oxidation catalyst unit is located within the second heat recovery unit at a location providing a suitable operating temperature and providing a suitable heat sink for the heat generated by the catalytic reactions.

Embodiment 159

The method of any preceding embodiment, comprising controlling the flow rate of the at least a second portion of the compressed low oxygen content gas stream.

Embodiment 160

The method of any preceding embodiment, wherein the flow rate of the at least a second portion of the compressed low oxygen content gas stream is adjusted to maintain the pressure at a location within the recirculation loop within a desired range.

Embodiment 161

The method of any preceding embodiment, wherein the flow rate of the at least a second portion of the compressed low oxygen content gas stream is adjusted by means of at least one of an extraction valve, extraction vent valve, product compressor operating speed, product compressor inlet guide vane position or product compressor recycle valve.

Embodiment 162

The method of any preceding embodiment, comprising at least one of an inertial separator, coalescing filter and a water impermeable filter downstream of the heat exchanger and improving the effectiveness of removing the condensed water.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a turbine combustor, comprising:
      a first diffusion fuel nozzle, wherein the first diffusion fuel nozzle comprises first, second, and third passages that separately inject respective first, second, and third flows into a chamber of the turbine combustor to produce a diffusion flame, wherein the first flow comprises a first fuel and a first diluent, the second flow comprises a first oxidant, the third flow comprises a second diluent, and the first, second, and third passages extend along an entire axial length of the first diffusion fuel nozzle;
      a diluent injection system disposed downstream from the first diffusion fuel nozzle;
      a first wall disposed about the chamber, a second wall disposed about the first wall, and an exhaust passage disposed between the first and second walls;
      a turbine driven by combustion products from the diffusion flame in the turbine combustor;
      an exhaust gas compressor, wherein the exhaust gas compressor is configured to compress and route an exhaust gas from the turbine to the turbine combustor along an exhaust recirculation path; and
      a control system responsive to sensor feedback to adjust one or more operating parameters to control an equivalence ratio, wherein the one or more operating parameters comprise an oxidant flow rate and/or a fuel flow rate to the turbine combustor, and wherein the control system is configured to maintain the equivalence ratio between 0.95 and 1.05;
   wherein the diluent injection system comprises a plurality of diluent injectors wherein at least one diluent injector of the plurality of diluent injectors comprises a conduit extending through the first wall, the second wall, and the exhaust passage of the turbine combustor, such that the at least one diluent injector of the plurality of diluent injectors is configured to directly inject steam, nitrogen, a first portion of the exhaust gas, or another inert gas, or a combination thereof, into the chamber of the turbine combustor;
   wherein the diluent injection system comprises a first plurality of openings in the first wall of the turbine combustor configured to inject a second portion of the exhaust gas into the chamber of the turbine combustor; and
   wherein the diluent injection system comprises a second plurality of openings in the second wall of the turbine combustor configured to inject the second portion of the exhaust gas into the exhaust passage disposed between the first and second walls.

2. The system of claim 1, wherein the first diluent comprises steam, nitrogen, another inert gas, a third portion of the exhaust gas, or any combination thereof.

3. The system of claim 1, wherein the first, second, and third passages have respective first, second, and third outlets that are disposed along a downstream end of the first diffusion fuel nozzle, and the first, second, and third passages are isolated from one another along the entire axial length of the first diffusion fuel nozzle.

4. The system of claim 1, wherein the first passage extends around the second passage, or the second passage extends around the first passage.

5. The system of claim 1, wherein the first and second diluents are different from one another.

6. The system of claim 1, wherein the first and second diluents comprise portions of the exhaust gas.

7. The system of claim 1, wherein the first diffusion fuel nozzle comprises a fourth passage separate from the first, second, and third passages, wherein the fourth passage is configured to inject a fourth flow into the chamber separately from the first, second, and third flows, wherein the fourth flow comprises a second fuel, a third diluent, or a second oxidant.

8. The system of claim 1, wherein the third flow comprises a second oxidant.

9. The system of claim 8, wherein the first oxidant and the second oxidant are the same as one another.

10. The system of claim 1, wherein the second diluent comprises the exhaust gas.

11. The system of claim 1, wherein the first portion of the exhaust gas and the second portion of the exhaust gas are the same.

12. A method, comprising:
injecting first, second, and third flows separately through respective first, second, and third passages of a first diffusion fuel nozzle into a chamber of a turbine combustor to produce a diffusion flame, wherein the first flow comprises a first fuel and a first diluent, the second flow comprises a first oxidant, the third flow comprises a second diluent, and the first, second, and third passages extend along an entire axial length of the first diffusion fuel nozzle;
injecting steam, nitrogen, a first portion of exhaust gas, or another inert gas, or a combination thereof, into the chamber of the turbine combustor downstream from the first diffusion fuel nozzle using a diluent injection system disposed downstream from the first diffusion fuel nozzle, wherein the turbine combustor comprises a first wall disposed about the chamber, a second wall disposed about the first wall, and an exhaust passage disposed between the first and second walls, wherein the diluent injection system comprises a plurality of diluent injectors, wherein at least one diluent injector of the plurality of diluent injectors comprises a conduit extending through the first wall, the second wall, and the exhaust passage of the turbine combustor, such that the at least one diluent injector of the plurality of diluent injectors is configured to directly inject the steam, nitrogen, the first portion of the exhaust gas, or another inert gas, or combination thereof, into the chamber;
injecting a second portion of exhaust gas into the chamber of the turbine combustor using the diluent injection system, wherein the diluent injection system comprises a first plurality of openings in the first wall of the turbine combustor configured to inject the second portion of the exhaust gas into the chamber of the turbine combustor, wherein diluent injection system comprises a second plurality of openings in the second wall of the turbine combustor configured to inject the second portion of the exhaust gas into the exhaust passage disposed between the first and second walls;
driving a turbine with combustion products from the diffusion flame, and outputting the exhaust gas;
recirculating the exhaust gas along an exhaust recirculation path to an exhaust gas compressor;
compressing and routing the exhaust gas to the turbine combustor; and
adjusting one or more operating parameters to maintain an equivalence ratio between 0.95 and 1.05 using a control system, wherein the one or more operating parameters comprise an oxidant flow rate and/or a fuel flow rate to the turbine combustor.

13. The method of claim 12, wherein the first diluent comprises steam, nitrogen, another inert gas, a third portion of the exhaust gas, or any combination thereof.

14. The method of claim 12, wherein injecting comprises separately injecting the first, second, and third flows from the respective first, second, and third passages that are isolated from one another along the first diffusion fuel nozzle.

15. The method of claim 12, wherein the respective first, second, and third passages are isolated from one another along the entire axial length of the first diffusion fuel nozzle.

16. The method of claim 12, wherein the first and second diluents are different from one another.

17. The method of claim 12, wherein the first and second diluents comprise portions of the exhaust gas.

18. The method of claim 12, wherein injecting comprises separately injecting the first flow, the second flow, the third flow, and a fourth flow through respective first, second, third and fourth passages of the first diffusion fuel nozzle, wherein the first, second, third, and fourth passages are isolated from one another along the entire axial length of the first diffusion fuel nozzle, and wherein the fourth flow comprises a second fuel, a third diluent, or a second oxidant.

19. The method of claim 12, wherein the third flow comprises a second oxidant.

20. The method of claim 12, wherein the second diluent comprises the exhaust gas.

21. The system of claim 12, wherein the first portion of the exhaust gas and the second portion of the exhaust gas are the same.

* * * * *